United States Patent
Nakayama et al.

(10) Patent No.: US 8,843,095 B2
(45) Date of Patent: Sep. 23, 2014

(54) ELECTRONIC CIRCUIT SYSTEM, ELECTRONIC CIRCUIT DEVICE, AND WIRELESS COMMUNICATION DEVICE IN WHICH ANTENNAS ARE SELECTED TO BE PAIRED FOR WIRELESS COMMUNICATION AND THE SELECTED ANTENNAS ARE CONNECTED TO THE ELECTRONIC CIRCUITS

(75) Inventors: Takeshi Nakayama, Hyogo (JP); Masahiro Ishii, Hyogo (JP)

(73) Assignee: Panasonic Corporation, Osaka (JP)

(*) Notice: Subject to any disclaimer, the term of this patent is extended or adjusted under 35 U.S.C. 154(b) by 232 days.

(21) Appl. No.: 13/498,404
(22) PCT Filed: Mar. 7, 2011
(86) PCT No.: PCT/JP2011/001339
§ 371 (c)(1),
(2), (4) Date: Mar. 27, 2012
(87) PCT Pub. No.: WO2011/111369
PCT Pub. Date: Sep. 15, 2011

(65) Prior Publication Data
US 2012/0258661 A1    Oct. 11, 2012

(30) Foreign Application Priority Data
Mar. 12, 2010 (JP) .................... 2010-055711

(51) Int. Cl.
*H04B 5/00* (2006.01)
*H01Q 1/12* (2006.01)
*H04B 7/06* (2006.01)
*H01Q 3/24* (2006.01)
*H01Q 1/24* (2006.01)

(52) U.S. Cl.
CPC ............ *H04B 7/0691* (2013.01); *H04B 5/0081* (2013.01); *H01Q 1/1257* (2013.01); *H01Q 3/24* (2013.01); *H01Q 1/243* (2013.01)
USPC ...................... 455/277.1; 455/41.1

(58) Field of Classification Search
USPC ............... 455/41.1, 41.2, 272, 273, 274, 275, 455/277.1, 277.2
See application file for complete search history.

(56) References Cited

U.S. PATENT DOCUMENTS

2005/0040997 A1    2/2005  Akiho et al.
2007/0211689 A1    9/2007  Campero et al.
(Continued)

FOREIGN PATENT DOCUMENTS

CN    100388304    5/2008
CN    101458761    6/2009
(Continued)

OTHER PUBLICATIONS
International Search Report issued Jun. 7, 2011 in International (PCT) Application No. PCT/JP2011/001339.
(Continued)

Primary Examiner — Blane J Jackson
(74) Attorney, Agent, or Firm — Wenderoth, Lind & Ponack, L.L.P.

(57) ABSTRACT

Provided is an electronic circuit system that reduces at least one of a constraint on a positional relation between two electronic circuit devices and a constraint on the number and an arrangement of coils included in each device, when close-coupled wireless communication is established. In the electronic circuit system, wireless communication utilizing inductive coupling between antennas is established between first and second electronic circuit devices. The second electronic circuit device includes an electronic circuit, a plurality of antennas, a connection information generation unit and a connection switching unit. The connection information generation unit selects one of the plurality of antennas to be paired with an antenna included in the first electronic circuit device for use in wireless communication, and the connection switching unit switches one or more of the plurality of antennas to be connected to the electronic circuit.

13 Claims, 31 Drawing Sheets

(56) References Cited

U.S. PATENT DOCUMENTS

| | | |
|---|---|---|
| 2008/0094221 A1 | 4/2008 | Sugano et al. |
| 2009/0146796 A1 | 6/2009 | Goto et al. |
| 2009/0168753 A1 | 7/2009 | Campero et al. |
| 2010/0040123 A1 | 2/2010 | Iwata et al. |

FOREIGN PATENT DOCUMENTS

| | | |
|---|---|---|
| JP | 2005-149523 | 6/2005 |
| JP | 2007-81709 | 3/2007 |
| JP | 2008-107917 | 5/2008 |
| JP | 2009-147423 | 7/2009 |
| JP | 2009-169602 | 7/2009 |
| JP | 2009-529294 | 8/2009 |
| WO | 2008/056739 | 5/2008 |

OTHER PUBLICATIONS

Chinese Office Action issued Dec. 10, 2013 in Chinese Application No. 201180004203.2 along with partial English translation.

ELECTRONIC CIRCUIT SYSTEM, ELECTRONIC CIRCUIT DEVICE, AND WIRELESS COMMUNICATION DEVICE IN WHICH ANTENNAS ARE SELECTED TO BE PAIRED FOR WIRELESS COMMUNICATION AND THE SELECTED ANTENNAS ARE CONNECTED TO THE ELECTRONIC CIRCUITS

TECHNICAL FIELD

The present invention relates to an electronic circuit system and an electronic circuit device using close-coupled contactless interface technology.

BACKGROUND ART

As close-coupled contactless interface technology, a device having a close-coupled wireless communication interface utilizing magnetic field coupling between coils has been proposed (see, for example, Patent Literature 1). FIG. 30 illustrates a configuration of a conventional device having a close-coupled wireless communication interface disclosed in Patent Literature 1. It is often difficult to establish wireless communication utilizing magnetic field coupling between coils unless the coils are close to each other and face each other.

In FIG. 30, a target system 912 includes a microcomputer 913 having coils 99 for a close-coupled wireless communication interface. On the other hand, a host device for debugging the target system 912 includes a host computer 91, a debugger 93 and a wireless communication interface IC 97 having coils 98 for a wireless communication interface. By being controlled by the host computer 91, the debugger 93 establishes data connection with the IC 97 and debugs the target system 912 through wireless communication established between the coils 98 and 99.

The IC 97 has three coils 98, and the microcomputer 913 has three coils 99. To the three coils, respective functions, such as a clock function, a signal transmission function and a signal reception function, are assigned. By appropriately setting a positional relation between the coils 99 and 98 so that the coils 99 and 98 can transmit/receive respective signals assigned thereto, data communication is established between the debugger 93 and the target system 912. That is to say, in order to establish close-coupled wireless communication, it is necessary that a coil included in the debugger 93 having the clock function and a coil included in the target system 912 having the clock function face each other, and a coil included in one of the debugger 93 and the target system 912 having the transmission function and a coil included in the other one of the debugger 93 and the target system 912 having the reception function face each other.

CITATION LIST

Patent Literature

[Patent Literature 1]
WO 2008/056739

SUMMARY OF INVENTION

Technical Problem

With the conventional configuration described above, it is necessary that the positional relation between the three coils 98 and the three coils 99 be set so that they can communicate with each other.

As a result, a positional relation between the debugger 93 and the target system 912 is set accordingly. Therefore, there is such a problem that a relative position and a relative angle of the debugger 93 and the target system 912 cannot be changed even though it is required to change the relative position and the relative angle for any reason. Note that there may not be any good reason to change the positional relation between the debugger 93 and the target system 912. In the case where two wireless communication interfaces are attached to respective members moving or turning relative to each other, however, it is desirable that wireless communication be established both before and after the relative movement and the like. The same is true in the case where one of the debugger 93 and the target system 912 has a single coil for use in communication.

In addition, the arrangement and the number of coils can vary according to the type of the microcomputer 913 due to a difference in size and communication configuration (e.g. the number of communication lines). In such a case, if the IC 97 having the coils 98 is changed for each type of the microcomputer 913, many problems occur as a great number of components are required and debugging becomes complex.

The present invention has been conceived in view of the above problems. A purpose of the present invention is to provide an electronic circuit system, an electronic circuit device and a wireless communication device that reduce at least one of a constraint on the positional relation between two devices and a constraint on the number and the arrangement of coils included in each device when the close-coupled wireless communication is established.

Solution to Problem

In order to solve the above-presented problems, one aspect of the present invention is an electronic circuit system comprising a first electronic circuit device and a second electronic circuit device, the first electronic circuit device including a first antenna and a first electronic circuit connected to the first antenna, the second electronic circuit device including a plurality of second antennas and a second electronic circuit connected to one or more of the plurality of second antennas, the first and second electronic circuit devices establishing close-coupled wireless communication with each other in such a state that a part of the first electronic circuit device in which the first antenna is positioned and a part of the second electronic circuit device in which the plurality of second antennas are positioned face each other, wherein the second electronic circuit device further includes: a connection information generation unit configured to select one of the plurality of second antennas to be paired with the first antenna for use in close-coupled wireless communication, and generate connection information indicating that the selected second antenna is to be connected to the second electronic circuit; and a connection switching unit configured to switch the one or more second antennas connected to the second electronic circuit in accordance with the connection information.

Advantageous Effects of Invention

The electronic circuit system and the electronic circuit device of the present invention reduce at least one of the constraint on the positional relation between two devices establishing close-coupled wireless communication and the constraint on the number and the arrangement of coils included in one of the devices.

DESCRIPTION OF EMBODIMENTS

The following describes embodiments of the present invention, with reference to the drawings.

Embodiment 1

Figure 1:
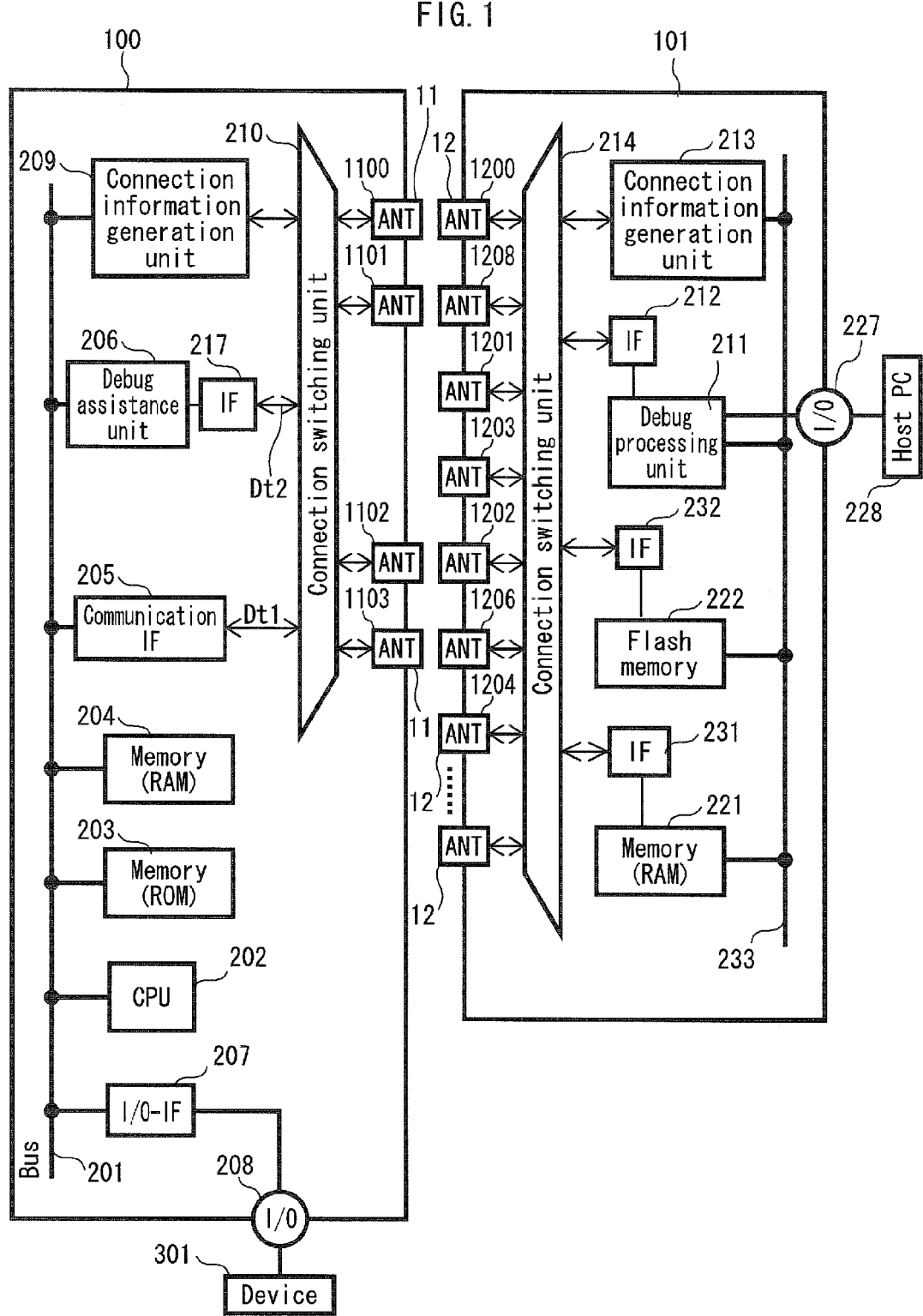
FIG. 1 is a block diagram of an electronic circuit system in Embodiment 1.

FIG. 1 is a block diagram of an electronic circuit system in Embodiment 1 of the present invention. In the present embodiment, an electronic circuit system composed of a first electronic circuit device 100 and a second electronic circuit device 101 is taken as an example of the electronic circuit system.

More specifically, taken as an example is a case where the first electronic circuit device 100 is an electronic circuit device, such as an LSI (Large Scale Integration), that includes an electronic circuit constituting a microcomputer, and the second electronic circuit device 101 is an electronic circuit device, such an LSI, that includes an electronic circuit constituting a debugger used to debug the first electronic circuit device 100. Note that hereinafter the first electronic circuit device 100 and the second electronic circuit device 101 are also abbreviated to a "first device" and a "second device", respectively.

<<Configuration>>

<Outline of Configurations of First and Second Electronic Circuit Devices>

The following describes an outline of configurations of the first device 100, the second device 101 and antennas.

Figure 2:
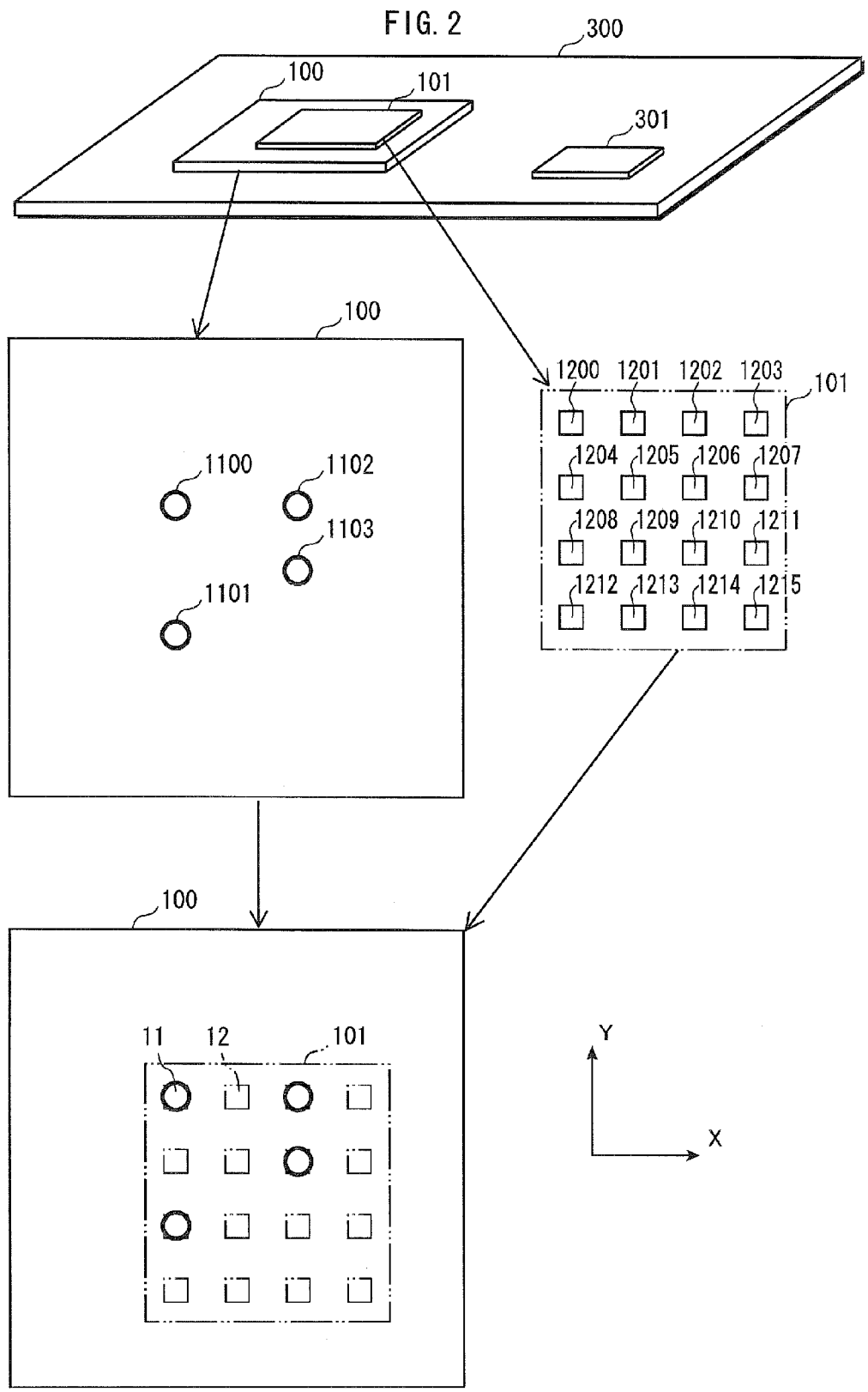
FIG. 2 is an overview diagram of the electronic circuit system.
Figure 3:
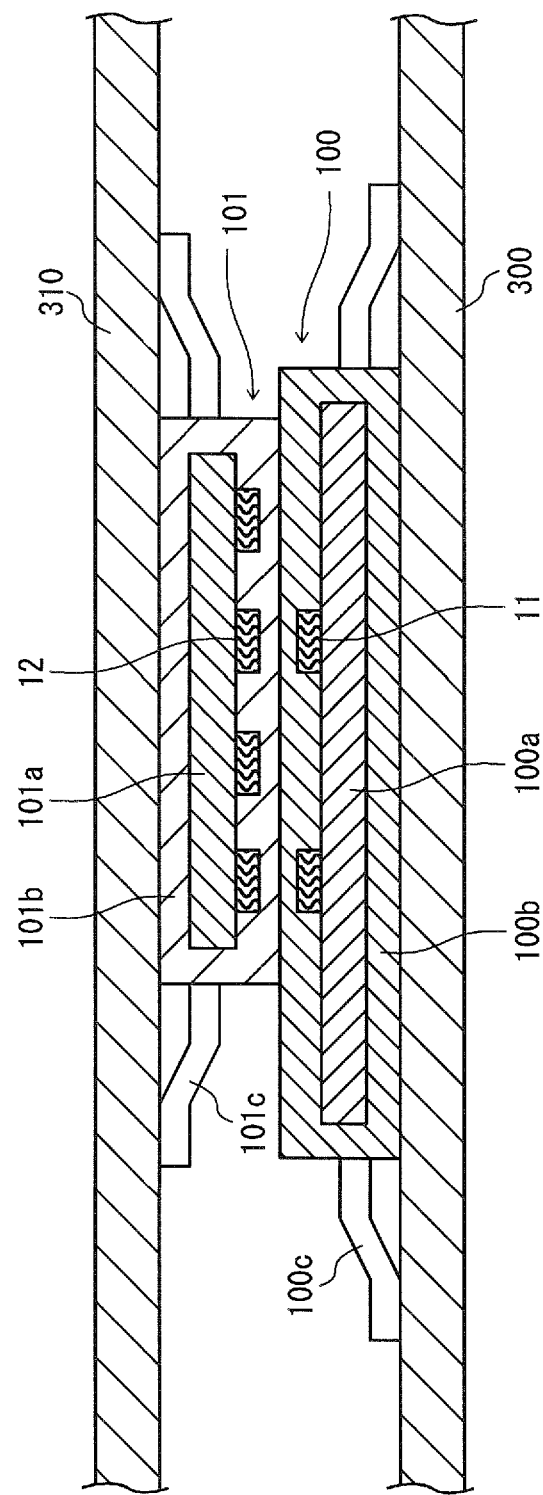
FIG. 3 is a sectional view of the electronic circuit system.

An upper diagram of FIG. 2 schematically illustrates a state where the second device 101 is placed on the first device 100 during debugging. FIG. 3 schematically illustrates a cross-section of the first device 100 and the second device 101.

The first device 100 includes a plurality of antennas 11 formed on a semiconductor circuit board 100a. The semiconductor circuit board 100a and the antennas 11 are coated with a resin package 100b. The first device 100 includes a lead 100c connected to wiring on the semiconductor circuit board 100a. The lead 100c extends to the outside of the resin package 100b and is soldered to a circuit board 300.

Note that a plurality of antennas 12, a semiconductor circuit board 101a, a resin package 101b, a lead 101c and a circuit board 310 included in the second device 101 are similar to respective components included in the first device 100. Note that power is supplied to the first device 100 and the second device 101 via the circuit boards 300 and 310, respectively.

The semiconductor circuit boards 100a and 101a are positioned so that the antennas 11 and 12 face each other. A distance between the semiconductor circuit boards 100a and 101a is set to be sufficiently smaller than a width of a principal surface of the semiconductor circuit board 100a and the like. This means that the semiconductor circuit boards 100a and 101a are positioned close to each other, and the antennas 11 and 12 are positioned close to each other.

Figure 4:
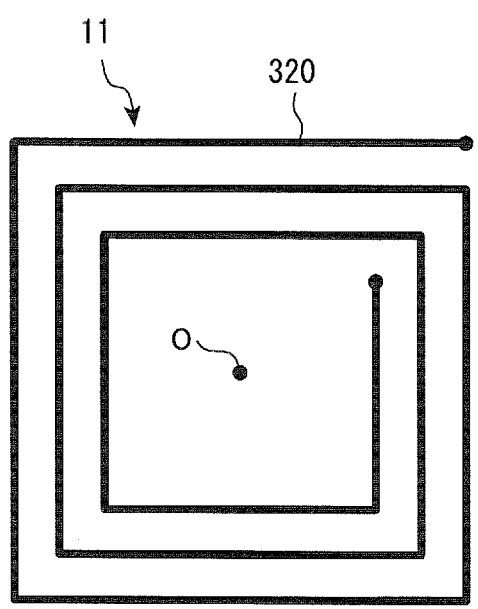
FIG. 4 is a plan view of an antenna included in the electronic circuit system.

FIG. 4 is a plan view schematically illustrating each of the antennas 11 and 12. Each of the antennas 11 and 12 has a square outline and includes a coil 320 that is a spiral conductive line. The antennas 11 and 12 are formed along the principal surfaces of the semiconductor circuit boards 100a and 101a, respectively. Note that a straight line passing through a center O of the coil 320 and being perpendicular to each of the principal surfaces of the semiconductor circuit boards 100a and 101a (a straight line perpendicular to the plane of FIG. 4) is a center line of the coil 320.

In FIG. 3, the center line of the coil constituting each of the antennas 11 is configured to be approximately parallel to the center line of the coil constituting each of the antennas 201.

A middle diagram of FIG. 2 illustrates the first device 100 and the second device 101 separately. A lower diagram of FIG. 2 is a perspective view illustrating a state where the second device 101 is laid on the first device 100 viewed from above. As illustrated in FIG. 2, the electronic circuit system includes a layer of the first device 100 and second device 101 implemented on the circuit board 300 so as to be in close contact with the circuit board 300.

The plurality of antennas 11 (antennas 1100, 1101, 1102 and 1103) included in the first electronic circuit device 100 are arranged as illustrated in the middle diagram of FIG. 2. The plurality of antennas 12 (antennas 1200 to 1215) included in the second device 101 are arranged in a matrix as illustrated in the middle diagram of FIG. 2. Note that, in order to distinguish the antennas 11 from the antennas 12, the antennas 11 are represented by circles. In the drawings other than FIG. 2, some antennas are also represented by circles.

Here, an arrangement pattern of the antennas 12 illustrated in FIG. 2 is an arrangement pattern viewed from the bottom of the second device 101 (an upper side of the second device 101 opposite to the first device 100 in the upper diagram of FIG. 2). Therefore, an arrangement pattern of the antennas 12 viewed from the top of the second device 101 (a lower side of the second device 101 facing the first device 100 in the upper diagram of FIG. 2) corresponds to a mirror image of the arrangement pattern illustrated in FIG. 2. In order to facilitate understanding of the drawings, an arrangement of antennas is illustrated in a similar manner also in other embodiments and modifications.

The first electronic circuit device 100 and the second electronic circuit device 101 described above have wireless communication functions so that they communicate with each other using antennas. By establishing wireless communication in a state where the first electronic circuit device 100 and the second electronic circuit device 101 are in contact with each other or are close to each other, the second electronic circuit device 101 debugs the first electronic circuit device 100. Note that signals transmitted in close-coupled wireless communication include data and a control signal output from the electronic circuit.

In the example illustrated in the lower diagram of FIG. 2, antennas 1100 and 1200, antennas 1101 and 1208, antennas 1102 and 1202, and antennas 1103 and 1206 are each close to each other and face each other. Wireless communication is established between the antennas 11 and 12 facing each other.

As described above, the electronic circuit system in the present embodiment establishes communication between devices by utilizing a close-coupled wireless communication function, and debugs an electronic circuit device formed on an integrated circuit and the like.

Note that close-coupled wireless communication (or wireless transmission) may be wireless communication established utilizing inductive coupling (magnetic field coupling) between antennas included in the electronic circuit devices 100 and 101. Since a communication distance is very short in close-coupled wireless communication, wireless communication is established in a state where a part of the electronic circuit device 100 in which antennas are arranged and a part of the electronic circuit device 101 in which antennas are arranged are in contact with each other or are close to each other. Here, the state where the two parts are close to each other may be a state where a distance between the two electronic circuit devices 100 and 101 is equal to or shorter than 3 mm, or is equal to or shorter than 1 mm. Note that, when the two parts are in contact with each other or are close to each other, a distance between antennas may be equal to or shorter than 5 mm, or be equal to or shorter than 3 mm.

<First Electronic Circuit Device>

As illustrated in FIG. 1, the first electronic circuit device 100 includes a bus 201, which is a component of the electronic circuit, and a plurality of electronic circuit modules each connected to the bus 201. The plurality of electronic circuit modules include a CPU 202, a memory (Read Only Memory) 203, a memory (Random Access Memory) 204, a wireless communication IF (Interface) 205, a debug assistance unit 206 and an I/O-IF (Input/Output-Interface) 207. The CPU 202 is a central processing unit such as a microprocessor. The CPU 202 performs various types of control and processing within the first device 100.

The debug assistance unit 206 performs processing to assist debugging when the first electronic circuit device 100 is debugged. An IF (Interface) 217 is connected to the debug assistance unit 206.

The I/O-IF 207 is connected between the bus 201 and a relay terminal 208. The I/O-IF 207 performs processing (interface processing) to relay signals transmitted/received between the bus 201 and a device 301 connected to the first electronic circuit device 100.

The wireless communication IF 205 and the IF 217 each perform interface processing such as serial-parallel conversion and buffering of data.

<Antenna>

The first electronic circuit device 100 includes the plurality of antennas 11 described above. FIG. 1 illustrates an example in which the first electronic circuit device 100 includes the plurality of antennas 11 (antennas 1100, 1101, 1102 and 1103). A driver 151 is connected to each of the antennas 11 (see FIG. 5).

Each of the antennas 11 includes a coil as describe above, and generates a magnetic field in response to supply power or generates received power in response to a change of the magnetic field.

The driver 151 supplies power to each of the antennas 11 based on transmitting signals at the time of transmission, and obtains receiving signals based on power generated in each of the antennas 11 and outputs the obtained signals at the time of reception. The driver 151 is equipped with a voltage detection unit 152 (represented as "V" in FIG. 5) for detecting a value of voltage produced in each of the antennas 11. The voltage detection unit 152 is connected to the connection information generation unit 209, and transmits data on the detected value of voltage to the connection information generation unit 209.

As described above, in the present embodiment, close-coupled wireless communication is established by utilizing inductive coupling (or magnetic field coupling) between antennas included in the first device and antennas included in the second device facing each other, without utilizing a carrier wave.

During debugging, a signal to be transmitted within the first electronic circuit device 100 is wirelessly transmitted from each of the antennas 11 to the second electronic circuit device 101, and a signal wirelessly transmitted from the second electronic circuit device 101 is received through each of the antennas 11. The signals transmitted in wireless communication include data and a control signal within the electronic circuit. As described above, each of the antennas 11 included in the first electronic circuit device 100 functions as a contactless interface, and establishes wireless communication with each of the antennas 12 included in the second electronic circuit device 101.

The first electronic circuit device 100 further includes the connection information generation unit 209 and a connection switching unit 210.

<Connection Switching Unit>

Figure 5:
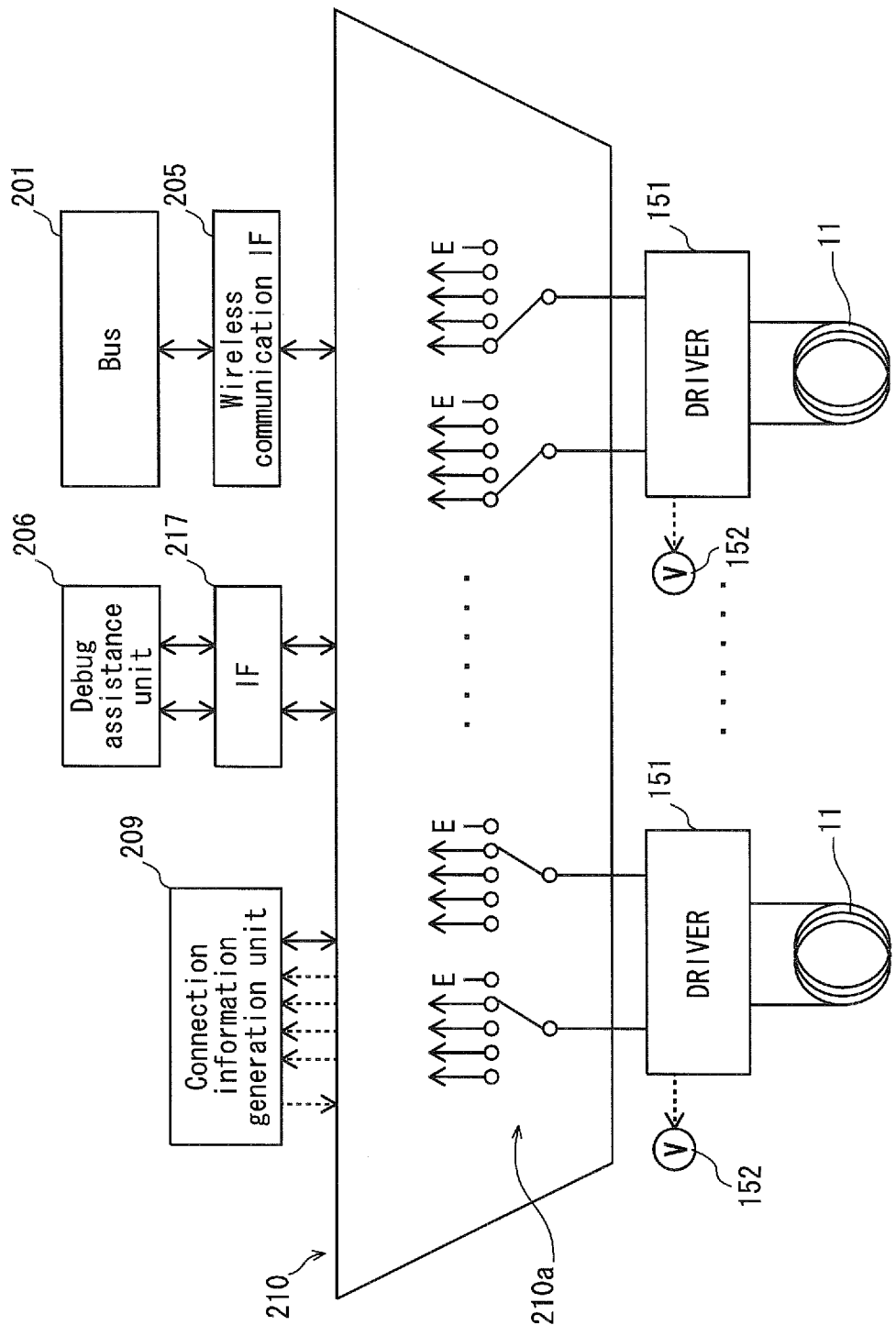
FIG. 5 schematically illustrates a connection switching unit 210 included in the electronic circuit system.

FIG. 5 schematically illustrates the connection switching unit 210.

The connection switching unit 210 is connected to the IF 217 (debug assistance unit 206), the wireless communication IF 205 and the connection information generation unit 209 via a plurality of signal lines. Here, the connection switching unit 210 and each of the IF 217 and the like are serially connected. On the other hand, the IF 217 and the debug assistance unit 206, and the wireless communication IF 205 and the bus 201 are each connected in parallel.

The connection switching unit 210 is connected to the antennas 11 via the driver 151.

The connection switching unit 210 includes a changeover switch 210a for switching one or more of the antennas 11. The switch 210a selects, from the IF 217 (debug assistance unit 206), the wireless communication IF 205 and the connection information generation unit 209, one or more modules connected to respective one or more of the antennas 11, or selects no module (in the state where each of the antennas 11 is connected to no module, and represented as "E" in FIG. 5). More specifically, one or more signal lines are connected to respective one or more modules, and the connection switching unit 210 switches one or more of the signal lines via which one or more of the antennas 11 are connected to the respective one or more modules.

In the present embodiment, the connection switching unit 210 is configured so that two of the antennas 11 can be connected to the IF 217 (debug assistance unit 206). The IF 217 includes two interface circuits, and each of the interface circuits is connected to the connection switching unit 210 via a signal line.

When receiving instruction information (described later) from the connection information generation unit 209, the connection switching unit 210 switches one or more of the antennas 11 connected to respective one or more modules in accordance with the received instruction information.

A signal Dt1 is supplied to the connection switching unit 210 via the wireless communication IF 205, which is one of the modules included in the electronic circuit. Furthermore, a signal Dt2 output from the debug assistance unit 204, which is one of the modules included in the electronic circuit, is supplied to the connection switching unit 210 via the IF 217. Signals within the first electronic circuit device 100 separated into two classes are supplied to the connection switching unit 210 in the above-mentioned manner. Here, the signals Dt1 and Dt2 are signals to be transmitted from the first electronic circuit device 100 to the second electronic circuit device 101.

<Connection Information Generation Unit>

The connection information generation unit 209 is connected to each of the antennas 11 via the connection switching unit 210.

Figure 6:
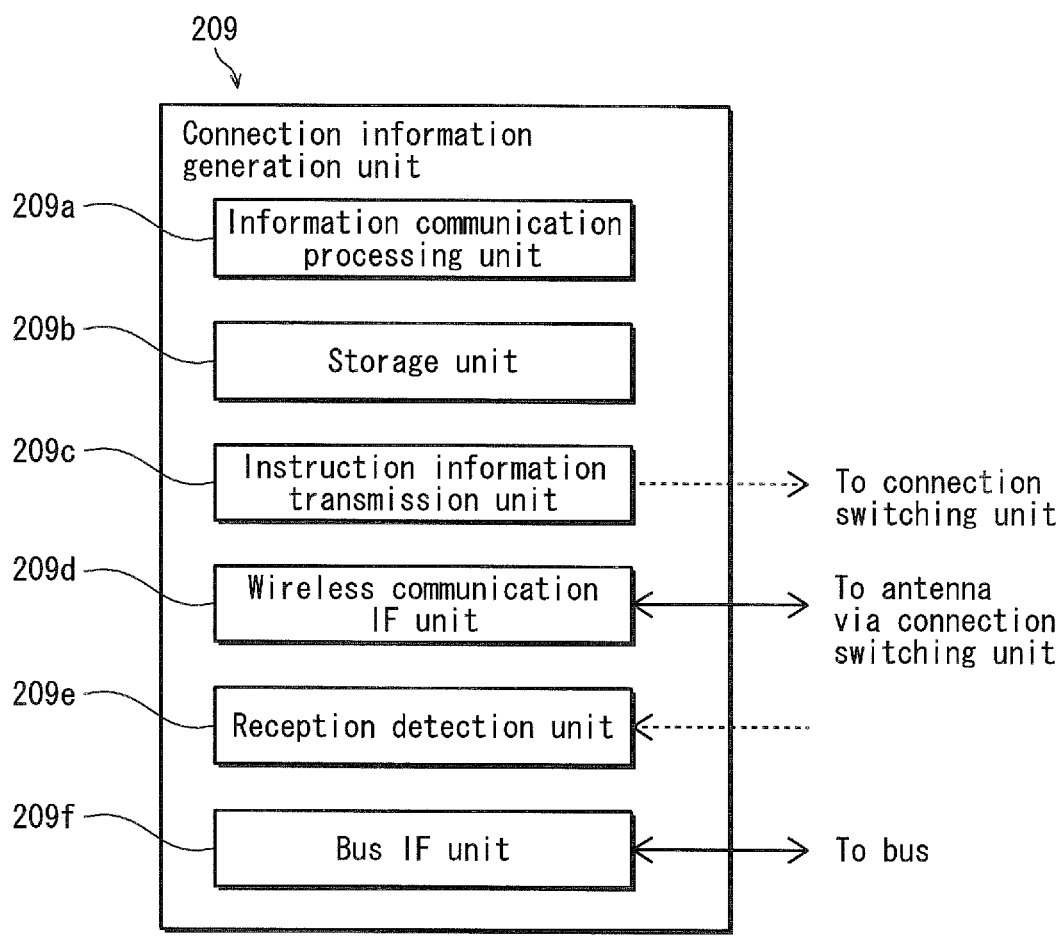
FIG. 6 schematically illustrates a connection information generation unit 209 included in the electronic circuit system.

FIG. 6 is a block diagram schematically illustrating a configuration of the connection information generation unit 209.

The connection information generation unit 209 includes an information communication processing unit 209a, a storage unit 209b, a connection information transmission unit, a wireless communication IF unit 209d, a reception detection unit 209e and a bus IF unit 209f. The connection information generation unit 209 is composed, for example, of an electronic circuit for performing predetermined processing or a microcomputer including a processor for executing a control program.

The information communication processing unit 209a performs test communication processing and generates connection information and instruction information through processing described later. The connection information indicates a connection relation between the antennas 11 and the modules such as the debug assistance unit 206. That is to say, the connection information indicates whether or not one or more of the antennas 11 are connected to respective one or more modules. More specifically, the connection information indicates one or more signal lines via which the one or more of the antennas 11 are connected to the one or more modules. The instruction information is a control signal generated based on the connection information to cause the connection switching unit 210 to perform switching.

Stored in the storage unit 209b are identification information of each of the antennas 11 (antenna identification information) and identification information of each of the electronic circuit modules (hereinafter, simply referred to as "modules") such as the debug assistance unit 206 and the wireless communication IF 205 (module identification information). The antenna identification information is, for example, an identification number assigned to each of the antennas 11, and differs among the antennas 11. The module identification information is, for example, an identification number assigned to each of the modules.

Connection patterns of the antennas 11 and the modules are also stored in the storage unit 209b. For example, when N antennas 11 are available for wireless communication, the connection patterns indicate one or more modules connected to each of the N antennas 11. The connection patterns are used to generate the connection information.

The instruction information transmission unit 209c transmits, to the connection switching unit 210, the instruction information that is for causing the connection switching unit 210 to perform switching and is generated based on the connection information. The information communication processing unit 209a generates the instruction information each time the connection information is generated. Each time the instruction information is generated, the instruction information transmission unit 209c transmits the generated instruction information. The connection switching unit 210 switches one or more of the antennas 11 connected to respective one or more modules in accordance with the instruction information.

The wireless communication IF unit 209d is connected to each of the antennas 11 (driver 151) via the connection switching unit 210, and performs a similar function to the wireless communication IF 205. The reception detection unit 209e detects reception of signals based on the value of voltage produced in each of the antennas 11, which is detected by the voltage detection unit 152. The bus IF unit 209f is connected to the bus 201, and transmits/receives signals to/from the debug assistance unit 206, the CPU 202 and the like via the bus 201.

The following describes an example of one or more of the antennas 11 connected to respective one or more modules. For example, when the connection information generation unit 209 instructs, by using the instruction information, the connection switching unit 210 to connect a debug IF 247 (signal Dt2) to the antenna 1100 and to connect a memory IF 245 (signal Dt1) to the antenna 1103, the connection switching unit 210 performs switching accordingly. As a result, the signal Dt2 output from the debug IF 247 is transmitted from the antenna 1100, and the signal Dt1 output from the memory IF 245 is transmitted from the antenna 1103. As described above, the connection switching unit 210 switches one or more of the antennas 11 from each of which a signal within the first electronic circuit device 100 is transmitted in accordance with the connection information.

<Second Electronic Circuit Device>

The second electronic circuit device 101 includes the plurality of antennas 12 described above, a debug processing unit 211, a connection information generation unit 223, a connection switching unit 224, an IF 231, an IF 232 and a bus 233.

The antennas 12 and a driver 161 respectively have similar functions to the antennas 11 and the driver 151. Each of the antennas 12 and the driver 161 receives a signal wirelessly transmitted from the antennas 11 included in the first electronic circuit device 100, and wirelessly transmits a signal received within the second electronic circuit device 101 to the antennas 11 included in the first device 100. As described above, each of the antennas 12 and the driver 161 included in the second electronic circuit device 101 functions as a wireless communication interface, and establishes wireless communication with the first device 100.

The connection switching unit 214 connected to each of the antennas 12 via the driver 161 has a similar function to the connection switching unit 210. Note that the connection switching unit 214 is configured to handle more antennas than the antennas connected to the connection switching unit 210.

The connection information generation unit 213 has a similar configuration and a similar function to the connection information generation unit 209. Information similar to the information stored in the storage unit 209b included in the connection information generation unit 209 is stored in a storage unit (not illustrated) included in the connection information generation unit 213. That is to say, the identification information of each of the antennas 12 (antenna identification information), the module identification information and connection patterns are stored in the storage unit included in the connection information generation unit 213.

Furthermore, the module identification information of each of the modules included in the first device 100 and module correspondence information indicating correspondence between the modules included in the first device 101 and the modules included in the second device 101 are stored in the storage unit included in the connection information generation unit 213. The module correspondence information is used, for example, when the identification information of each of the antennas 11 included in the first device 100 and the connection information are obtained in the communication connection update processing described later. Specifically, the connection information is generated based on the module correspondence information so that one or more modules connected to respective one or more of the antennas 11 included in the first device 100 are appropriately paired with respective one or more modules included in the second device 101.

The second electronic circuit device 102 also includes the debug processing unit 211 for transmitting instructions to the debug assistance unit 204, and an IF (interface) 212 connecting the debug processing unit 211 and the connection switching unit 214. The debug processing unit 211 is connected to an external host PC (host personal computer) 228 via a relay terminal 227.

The second electronic circuit device 102 further includes a RAM (Random Access Memory) 221 (hereinafter, simply referred to as a "memory 221"), which is a readable/writable volatile memory, and a flash memory 222 (hereinafter, simply referred to as a "memory 222"), which is a readable/writable non-volatile memory. In each of the memory 221 and the memory 222, data used for processing within the second electronic circuit device 101, data transmitted from the first electronic circuit device 100 and data to be transmitted to the first electronic circuit device 100 are stored.

The debug processing unit 211, the connection information generation unit 213, the memory 221 and the memory 222 are connected to the bus 233.

<Arrangement Patterns of Antennas>

As illustrated in FIG. 4, the antennas 12 are arranged in a matrix. Specifically, the antennas 12 are arranged at equal intervals in two directions crossing each other, i.e. in a longitudinal direction and in a transverse direction. Note that the longitudinal direction is a direction parallel to a longitudinal side of a square outlining the antennas 12, and the transverse direction is a direction parallel to a transverse side of the square outlining the antennas 12. On the other hand, the antennas 11 are arranged in a longitudinal direction and in a transverse direction such that a distance between any two adjacent antennas 11 is equal to the natural number multiple of a distance D between any two adjacent antennas 12.

With such an arrangement pattern, wireless communication is established while changing the positional relation between the first device 100 and the second device 101, for example, by relatively moving the first device 100 and the second device 101 in the longitudinal direction or in the transverse direction, and by relatively turning the first device 100 and the second device 101 by 90 degrees.

<<Operations>>

The following describes operations of the first electronic circuit device 100 and the second electronic circuit device 101. First, the communication connection update processing for appropriately connecting one or more of the antennas to respective one or more modules in each of the first device 100 and the second device 101 is described.

Assume that four antennas 11 included in the first device 100 and four antennas 12 (1200, 1202, 1206, 1208) included in the second device 101 face each other as illustrated in the lower diagram of FIG. 2.

The first device 100 and the second device 101, however, cannot learn about which of the antennas 11 and the antennas 12 are paired up and face each other. Therefore, by performing the communication connection update processing between the connection information generation units 209 and 213, one or more pairs of the antennas 11 and 12 facing each other are found.

<Communication Connection Update Processing>

The communication connection update processing is processing of experimentally establishing wireless communication (test communication) between the first device 100 and the second device 101, newly generating connection information based on the results of the test communication, and appropriately connecting one or more of the antennas to respective one or more modules.

The communication connection update processing includes the test communication processing for selecting one or more antennas 11 and 12 for use in wireless communication, and connection processing for appropriately connecting the selected one or more of the antennas 11 and 12 to respective one or more modules. In brief, the test communication processing is processing of transmitting a test signal either from antennas included in the first device 100 or from antennas included in the second device 101 and receiving the transmitted test signal through the other antennas. The connection information generation processing is processing of generating the connection information based on the results of the test communication processing.

Here, assume that the connection information generation units 209 and 213 perform the communication connection update processing when receiving instructions to start the communication connection update processing via the buses 201 and 233, respectively. The instruction to start the communication connection update processing is transmitted from the external device 301 to the connection information generation unit 209 via the relay terminal 208 and the I/O-IF 207. To the connection information generation unit 213, the instruction to start the communication connection update processing is transmitted from the host PC 228 via the relay terminal 227 and the debug processing unit 211.

Figure 7:
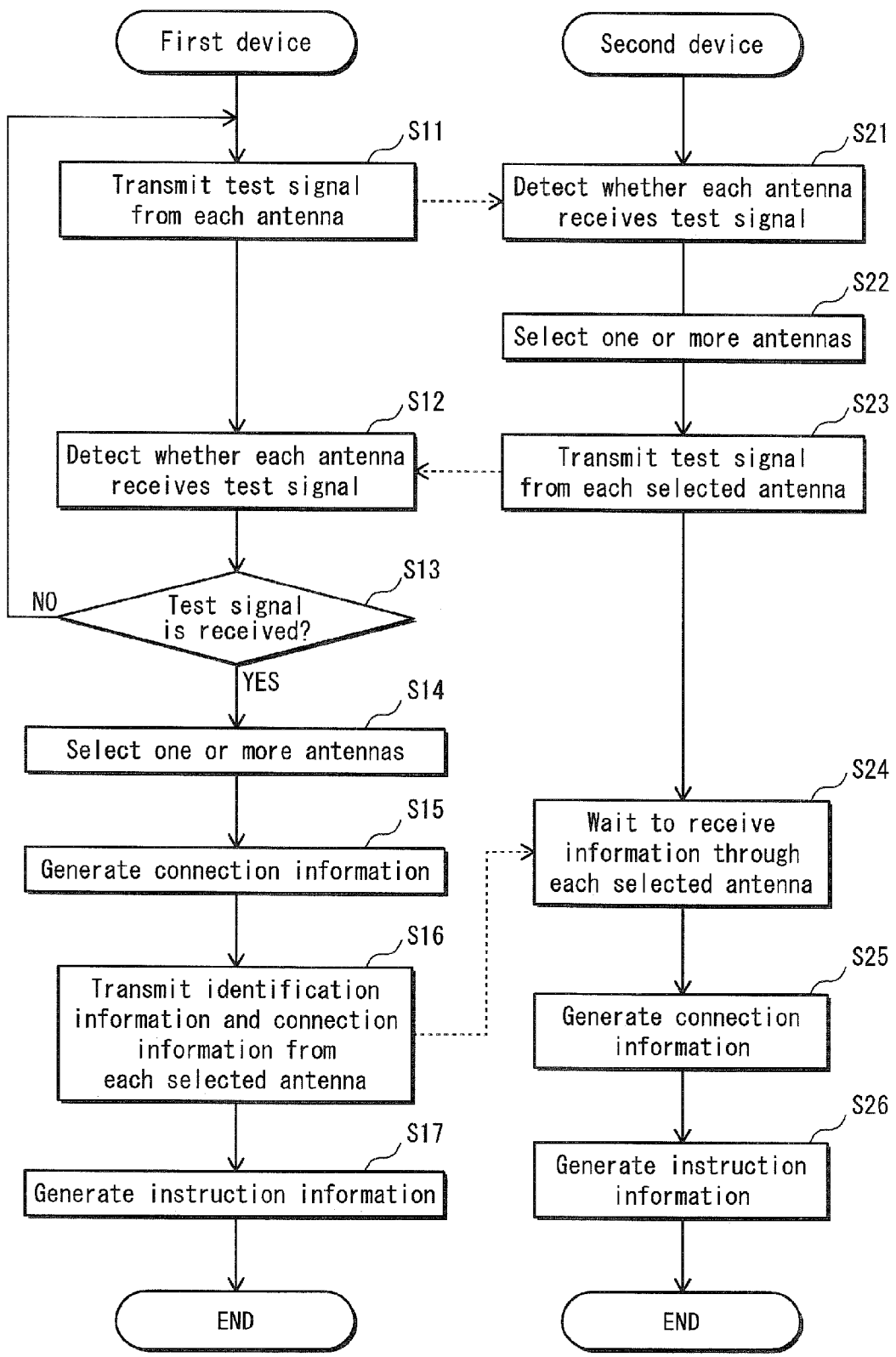
FIG. 7 is a flow chart showing communication connection update processing performed by the electronic circuit system.

FIG. 7 is a flow chart showing the communication connection update processing.

In brief, the test communication processing is processing of transmitting/receiving a test signal between the antennas 11 and 12 respectively included in the first device 100 and the second device 101, and selecting one or more antennas for use in wireless communication. In FIG. 7, the test communication processing performed by the first device 100 corresponds to processing in steps S11, S12, S13, S14 and S16, and the test communication processing performed by the second device 100 corresponds to processing in steps S21, S22, S23 and S24.

Also, in FIG. 7, the connection processing performed by the first device 100 corresponds to processing in steps S15 and S17, and the connection processing performed by the second device 100 corresponds to processing in steps S24, S25 and S26.

(a) Processing Performed by Connection Information Generation Unit 209 Included in First Device 100

Processing performed by the connection information generation unit 209 is described first.

In the step S11, a test signal is transmitted from each of the antennas 11. In the present embodiment, one of the antennas 11 transmitting the test signal is connected to the connection information generation unit 209, and switching transmission processing of switching the one of the antennas 11 is performed at set time Ta (e.g. 0.1 second) intervals. For example, the one of the antennas 11 connected to the connection information generation unit 209 is cyclically switched in ascending order, for example, in order of the antennas 1100, 1101, 1102, 1103, 1100, 1101 and so on.

The switching transmission processing terminates after a test signal is transmitted from each of the antennas 11 the set number of times (e.g. three times).

The selection and the switching of the one of the antennas 11 are performed by the connection information generation unit 209 generating the instruction information, and then by the connection switching unit 210 performing switching in accordance with the instruction information. One or more of the antennas 11 that are not selected are each in a non-connection state.

The test signal is generated by the information communication processing unit 209a included in the connection information generation unit 209, and transmitted to the connection switching unit 210 via the wireless communication IF unit 209d. The test signal is, for example, a signal repeating a value "110".

In the step S12, reception detection processing of detecting whether or not each of the antennas 11 receives the test signal is performed by the reception detection unit 209e. The reception detection processing is performed to receive the test signal transmitted from the second device 101 in a step S23 described later.

Receiving signal intensity is indicated by the value of voltage produced in each of the antennas 11, which is detected by the voltage detection unit 152. Each of the antennas 11 having receiving signal intensity higher than a threshold during a time period Tb, which is shorter than the set time Ta, is judged to have received the test signal.

The reception detection processing terminates after the elapse of a set time Tc from the start of the reception detection processing. For example, the set time Tc may be longer than a time period for which the test signal is transmitted from the second device 101 in the step S23 described later.

When the number of one or more of the antennas 11 having receiving signal intensity higher than the threshold is smaller than a set number (e.g. three) in the judgment processing in the step S13, the processing in the steps S11 and S12 is repeated. When the number of one or more of the antennas 11 having receiving signal intensity higher than the threshold is equal to or greater than the set number, the processing in the step S14 is performed.

In the step S14, selection processing of selecting one or more of the antennas 11 for use in wireless communication is performed. In the selection processing, one or more of the antennas 11 having receiving signal intensity higher than the threshold are basically selected. When a plurality of the antennas 11 simultaneously receive the test signal transmitted from one of the antennas 12 included in the second device 101, one of the plurality of the antennas 11 of high communication quality, for example, one of the plurality of the antennas 11 having high receiving signal intensity, is selected. Here, assume that all the antennas 11 (1100, 1101, 1102 and 1103) are selected.

In the step S15, the connection information is generated based on the connection patterns described above, and the connection relation between the one or more selected the antennas 11 and respective one or more modules is defined. For example, the connection information indicates that the antennas 1100 and 1101 are each to be connected to the debug assistance unit 206 (IF 217), the antenna 1102 is to be connected to the connection information generation unit 209, and the antenna 1103 is to be connected to the wireless communication IF 205. Note that, as described above, the IF 217 connected to the debug assistance unit 206 includes two interface circuits, and is capable of establishing communication using two of the antennas 11.

In the step S16, the identification information of each of the one or more selected antennas 11 and the connection information are transmitted from each of the one or more selected antennas 11 in a similar manner to the switching transmission processing in the step S11. Here, the connection information indicates each of modules to be connected to the antennas 11, and is, for example, the identification information of each of modules to be connected to the antennas 11. Specifically, since the antenna 1100 is to be connected to the debug assistance unit 206, the identification information of the debug assistance unit 206 is the connection information of the antenna 1100. In this case, the identification information of the antenna 1100 and the identification information of the debug assistance unit 206 are transmitted from the antenna 1100. That is to say, transmission of the identification information of each of the antennas 11 and the connection information indicates transmission of the identification information of each of the antennas 11 and the identification information of each of modules to be connected to the antennas 11.

Similarly, the identification information of each of the antennas 11 and the identification information of each of modules to be connected to the antennas 11 (e.g. the connection information generation unit 209) are transmitted from the other antennas 1101, 1102 and 1103. Since two of the antennas 11 can be connected to the IF 217 connected to the debug assistance unit 206, two pieces of identification information are assigned to the debug assistance unit 206.

In the step S17, the instruction information is generated based on the connection information generated in the step S15. The generated instruction information is transmitted to the connection switching unit 210, and the connection switching unit 210 performs switching.

(b) Processing Performed by Connection Information Generation Unit 213 Included in Second Device 101

On the other hand, in the step S21, the reception detection unit 209e included in the connection information generation unit 213 performs reception detection processing of detecting the receiving signal intensity of each of the antennas 12, similarly to the processing in the step S12 as described above. In the reception detection processing, one or more of the antennas 12 receiving the test signal transmitted from the first device 100 are detected. The reception detection processing does not end until the number of one or more of the antennas 12 having receiving signal intensity higher than the threshold becomes equal to or greater than a set number (e.g. three) (step S22). In addition, the reception detection processing does not end unless a set time Td has passed since the receiving signal intensity of any one of the antennas 12 exceeds the threshold, even if the number of one or more of the antennas 12 having receiving signal intensity higher than the threshold is equal to or greater than the set number (e.g. three). Here, the set time Td is set to be longer than a time period for which the first device 100 performs the processing in the steps S11 and S12.

In the step S22, the selection processing of selecting one or more of the antennas 12 for use in wireless communication is performed, similarly to the processing in the step S14 as described above. Here, assume that four of the antennas 12 (1200, 1202, 1206 and 1208) are selected.

In the step S23, the switching transmission processing, which is similar to the processing in the step S11 as described above, is performed by transmitting the test signal from each of the three selected antennas 12. The time period for which the switching transmission processing is performed is longer than the time period for which the processing in the steps S11 and S12 is performed.

In the step S24, the connection information generation unit 213 waits to receive information transmitted from the first device 100. At this time, switching reception processing of switching one of the selected antennas 12 connected to the connection information generation unit 213 is performed at set time intervals. In the switching reception processing, the one of the selected antennas 12 is switched so that, within the time period Ta for which one of the antennas 11 included in the first device 100 transmits the information, all of the selected antennas 12 can receive the transmitted information at least once. Specifically, when the number of the selected antennas 12 is N, the one of the selected antennas 12 is switched at time intervals each equal to or shorter than a time obtained by dividing the time period Ta by N+1. The above-mentioned time interval is set to be equal to or longer than a time period for which the identification information and the connection information transmitted from the first device 100 can be obtained. With this configuration, all of the selected antennas 12 can surely receive the transmitted information at least once during the time period Ta.

Note that the switching reception processing is performed by the connection information generation unit 213 transmitting, to the connection switching unit 213, the instruction information for instructing the connection switching unit 213 to switch one of the antennas 12 connected to the connection information generation unit 213 at set time intervals (described later). For example, the one of the antennas 12 connected to the connection information generation unit 213 is cyclically switched in ascending order, similarly to the switching transmission processing in the step S11. One or more of the antennas 12 other than the selected antennas 12 are each in a non-connection state.

Here, in the switching reception processing, via one of the selected antennas 12, the identification information and the connection information transmitted from one of the antennas 11 facing the one of the selected antennas 12 are received. The identification information and the connection information transmitted from the one of the antennas 11 and the identification information of the one of the antenna 12 receiving these pieces of information are associated with each other, and stored in the storage unit 209b. By associating these pieces of information, one of the antennas 11 and one of the antennas 12 facing each other are paired up.

In the step S25, the connection information of the second device 101 is generated based on the identification information and the connection information transmitted from the first device 100. At this time, by referring to the module correspondence information stored in the storage unit, the connection relation (connection relation between the antennas 12 and the modules) for appropriately connecting the modules included in the first device 100 to the modules included in the second device 101 is defined and stored.

Specifically, for example, assume that the identification information of the antenna 1100 and the connection information are received through the antenna 1200. Since the debug assistance unit 206 is connected to the antenna 1100, the connection relation is defined so as to indicate that the antenna 1200 is to be connected to the debug processing unit 211. Furthermore, the connection relation is defined so as to indicate that the antenna 1208 to be paired with the antenna 1101 is to be connected to the memory 222, the antenna 1202 to be paired with the antenna 1102 is to be connected to the connection information generation unit 213 itself, and the antenna 1206 facing the antenna 1103 is to be connected to the memory 221. One or more of the antennas 12 other than these four antennas 12 are each in a non-connection state.

In the step S26, the instruction information is generated based on the above-mentioned connection information. Once the generated instruction information is transmitted to the connection switching unit 214, the connection switching unit 214 performs switching.

(c) In the above-mentioned processing, the antennas and the modules are appropriately connected in each of the first device 100 and the second device 101. Then, the connection information generation units 209 and 213 respectively notify, via the buses 201 and 233, the debug assistance unit 206 and the debug processing unit 211 that it becomes possible to establish wireless communication. The debug processing unit 211 then performs debugging. Since the antennas and modules are appropriately connected, it becomes possible to establish data communication, for example, between the debug assistance unit 206 and the debug processing unit 211 or between the debug assistance unit 206 and the memory 222 during debugging. Also, it becomes possible to establish data communication between the wireless communication IF 205 and the memory 221.

In this case, for example, the wireless communication IF 205 and the memory 221 (IF231) establish half duplex communication using a pair of antennas. Therefore, the wireless communication IF 205 and the like are connected to the driver 151 via a switch (not illustrated) similar to the switch 210a, and may switch between a transmission state and a reception state of the driver 151.

Explanation on the debugging is omitted.

<Positional Change Detection Processing>

The following describes positional change detection processing performed by the connection information generation units 209 and 213, for example, during debugging.

In the above-mentioned communication connection update processing, the antennas 11 and 12 are each appropriately connected to modules. Even after the first device 100 and the second device 101 are placed and the connection relation is set, however, the positional relation can be changed.

In such a case, although the host PC 228 and the external device 301 can issue instructions to perform the communication connection update processing again, the electronic circuit system becomes more convenient if the communication connection update processing is automatically performed.

To automatically perform the communication connection update processing, positional change detection processing of detecting a change in positional relation between the first device 100 and the second device 101 is performed.

The positional change detection processing is processing of intermittently transmitting/receiving a confirmation signal for connection confirmation between the first device 100 and the second device 101 using one or more pairs of antennas to confirm connection between the first device 100 and the second device 101. The positional change detection processing is continuously performed, after the communication connection update processing is performed, by the information communication processing unit included in each of the connection information generation units 209 and 213 to monitor connection between the first device 100 and the second device 101.

Here, as taken as an example in description on the communication connection update processing, assume that the connection information generation units 209 and 213 can establish wireless communication using the antennas 1102 and 1202 before the positional relation is changed. The connection information generation units 209 and 213 alternately transmit/receive the confirmation signal at set time Te (e.g. 0.1 second) intervals. The connection information generation units 209 and 213 each judge that the positional relation is changed when intensity of the confirmation signal is equal to or lower than a threshold of the confirmation signal after a set time Tf (e.g. twice as long as the set time Te) has passed since the transmission of the confirmation signal, and perform the communication connection update processing. Note that, when the confirmation signal is not transmitted from a device targeted for communication even after the set time Tf has passed since the transmission of the confirmation signal, the connection information generation units 209 and 213 each judge that the intensity of the confirmation signal is equal to or lower than the threshold of the confirmation signal.

When the change in positional relation is detected, the connection information generation units 209 and 213 each perform the communication connection update processing. The following describes a specific example of a case where the change in positional relation occurs.

Figure 8A:
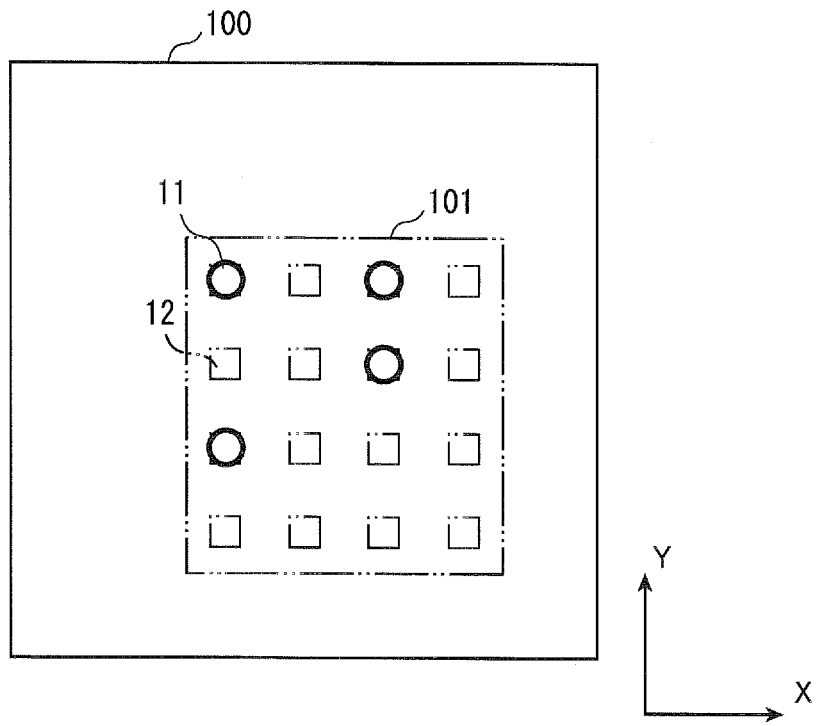
FIGS. 8A and 8B illustrate a change in positional relation between electronic circuit devices included in the electronic circuit system.
Figure 8B:
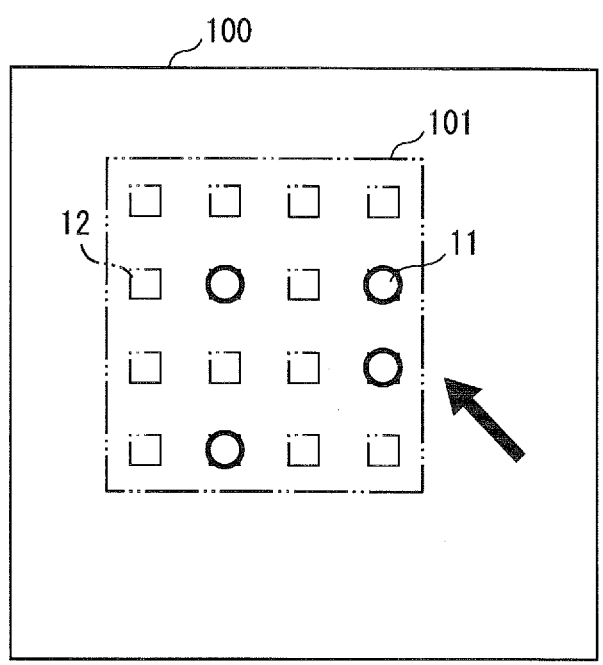

For example, as illustrated in FIGS. 8A and 8B, assume that the positional relation illustrated in FIG. 8A is changed to the positional relation illustrated in FIG. 8B by the second device 101 being shifted upwardly in FIG. 8B. The positional relation between the antennas 11 included in the first device 100 and the antennas 12 included in the second device 101 is changed accordingly. For example, the positional relation is changed such that the antenna 1100 and the antenna 1204 face each other. Connection state in communication between the antennas 11 and the antennas 12 is changed accordingly. Therefore, the intensity of the confirmation signal becomes equal to or lower than the threshold, and thus the change in positional relation is detected in the positional change detection processing. Therefore, the communication connection update processing is performed, and the connection information generation units 209 and 223 each update the connection information based on the detected change. Since the connection information is updated, the connection switching units 210 and 224 respectively switch one or more of the antennas 11 and 12 from each of which a signal is transmitted.

By the above-mentioned operation, for example, when the second electronic circuit device 101 is shifted upwardly, the signal Dt2 transmitted from the IF 217 included in the first electronic circuit device 100 is stored in the memory 222 included in the second electronic circuit device 101 using a new pair of the antenna 1100 and the antenna 1212. In particular, in the present embodiment, since the number of antennas included in the second electronic circuit device 101 is set to be greater than the number of classes to which signals to be transmitted belong, even if the positional relation between the first electronic circuit device 100 and the second electronic circuit device 101 is changed, occurrence of such a problem that the wireless communication cannot be established is reduced.

<Others>

In the present embodiment, the number of the antennas 11 included in the first device 100 is set to be equal to or greater than the number of signals to be transmitted. On the other hand, the number of the antennas 12 included in the second device 101 is set to be greater than the number of the antennas 11 included in the first device 100. With such a configuration, the electronic circuit system can perform close-coupled wireless communication between electronic circuit devices without uniquely specifying an antenna for use in wireless connection between the electronic circuit devices. Therefore, the electronic circuit system is less likely to be limited by the positional relation between electronic circuit devices and the number and the arrangement of antennas.

As described above, the electronic circuit system operates so as to update a pair of antennas even when the positional relation between the first device 100 and the second device 101 is changed. Therefore, the electronic circuit system can easily establish contactless data communication between devices without being affected by the positional relation between devices.

Note that, in the present embodiment, the two signals Dt1 and Dt2 are taken as examples of the signals to be transmitted. The number of signals to be transmitted, however, may be one or more than one. The number of signals within the electronic circuit may be set based on classification according to characteristics of the signals.

The electronic circuit system may have a configuration in which the connection information generation unit determines the number of classes to which the signals belong based on the number of antennas included in each of the first device 100 and the second device 101. That is to say, if the number of antennas is great enough to transmit signals, the electronic circuit system may have a configuration in which, for example, the signal Dt1 is transmitted in parallel using a plurality of pairs of antennas.

As describe above, the electronic circuit system in the present embodiment is composed of the first device 100 and the device 101. The first device 100 includes: the antennas 11; the connection information generation unit 209 for determining one or more pairs of antennas included in the electronic circuit devices and generating the connection information on the determined pairs; and the connection switching unit 210 for switching one or more of the antennas 11 from each of which a signal is transmitted based on the connection information. The second device 101 includes: the antennas 12; the connection information generation unit 223 for determining one or more pairs of antennas included in the electronic circuit devices and generating the connection information on the determined pairs; and the connection switching unit 224 for switching one or more of the antennas 12 from each of which a signal is transmitted based on the connection information. With such a configuration, even when the positional relation between the first device 100 and the second device 101 is changed, a pair of antennas is updated by the operations performed by the connection information generation units 209 and 223, and the connection switching units 210 and 224. Therefore, the electronic circuit system can easily establish contactless data communication between devices without being affected by the positional relation between devices and sizes of devices.

The above-mentioned positional change detection processing is also effective when the positional relation between the first device 100 and the second device 101 is changed during debugging by such an accident that the first device 100 and the second device 101 are not firmly fastened or a user collides with the debugger. Note that, when there is no pair of antennas capable of communicating with each other in the communication connection update processing, an error may be output to an external device and the like.

[Modification 1]

In the above-mentioned embodiment, the number of the antennas 11 is four. The number of the antennas 11, however, may be equal to or smaller than three, or may be equal to or greater than five.

Figure 9A:
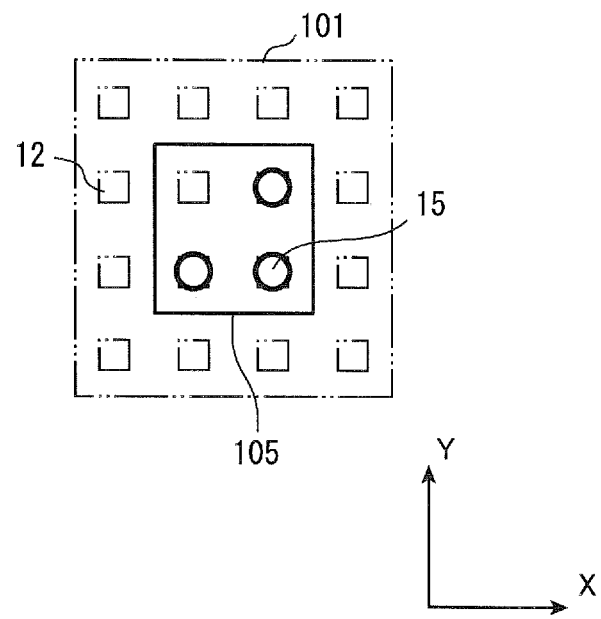
FIGS. 9A and 9B schematically illustrate arrangement patterns of antennas in Modification 1 of Embodiment 1.
Figure 9B:
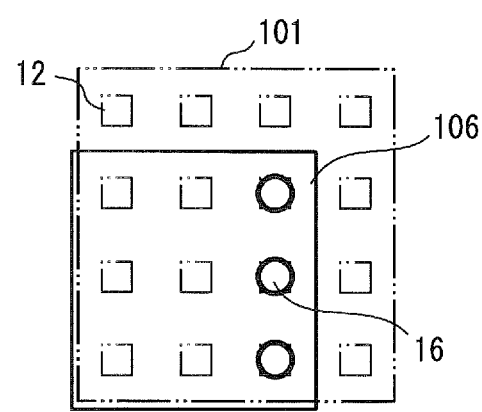

FIGS. 9A and 9B illustrate a modification in which the number of the antennas 11 included in the first device 100 is three. Note that first electronic circuit devices 105 and 106 in the present modification are each similar to the first device 100 except that the number and the arrangement of antennas are different from those of the antenna 11. Therefore, description is made on that difference.

As illustrated in FIG. 9A, the first electronic circuit device 105 (hereinafter, referred to as a "first device 105") includes three antennas 15. The three antennas 15 are arranged so as to be at respective three out of four vertices of a square. The three antennas 15 face respective three of the antennas 12 included in the second device 101.

In this example, both in a longitudinal direction and in a transverse direction, a distance between any two adjacent antennas of the antennas 15 is set to be equal to a distance between any two adjacent antennas of the antennas 12.

Also as illustrated in FIG. 9B, the first electronic circuit device 106 (hereinafter, referred to as a "first device 106") includes three antennas 16. The three antennas 16 are arranged in series in a longitudinal direction. The three antennas 16 face respective three of the antennas 12 included in the second device 101.

In this example, in a longitudinal direction, a distance between any two adjacent antennas of the antennas 15 is set to be equal to a distance between any two adjacent antennas of the antennas 12.

In the above-mentioned two first devices 105 and 106, it is possible to automatically set the connection relation between modules and each of the antennas 15 and 16 by performing the communication connection update processing, similarly to Embodiment 1. It is also possible to detect a change in positional relation between the second device 101 and each of the first devices 105 and 106 by performing the positional change detection processing, and to perform the communication connection update processing again.

Since the number of antennas included in the second device 101 is set to be greater than the number of antennas included in each of the first devices 100, 105 and 106, it is possible to establish wireless communication by updating the connection information even if the first device 100 is changed. That is to say, in the present embodiment, the number and the arrangement of antennas included in the first electronic circuit device are changed with respect to the second electronic circuit device, it is possible to establish wireless communication between the first and second electronic circuit devices. Therefore, it is possible to easily establish close-coupled wireless communication between electronic circuit devices without being affected by a size and a type of an electronic circuit device.

[Modification 2]

In above-mentioned Embodiment 1 and Modification 1, the antennas 12 are arranged in a matrix. The antennas 12, however, may be arranged in other arrangement patterns.

Figure 10A:
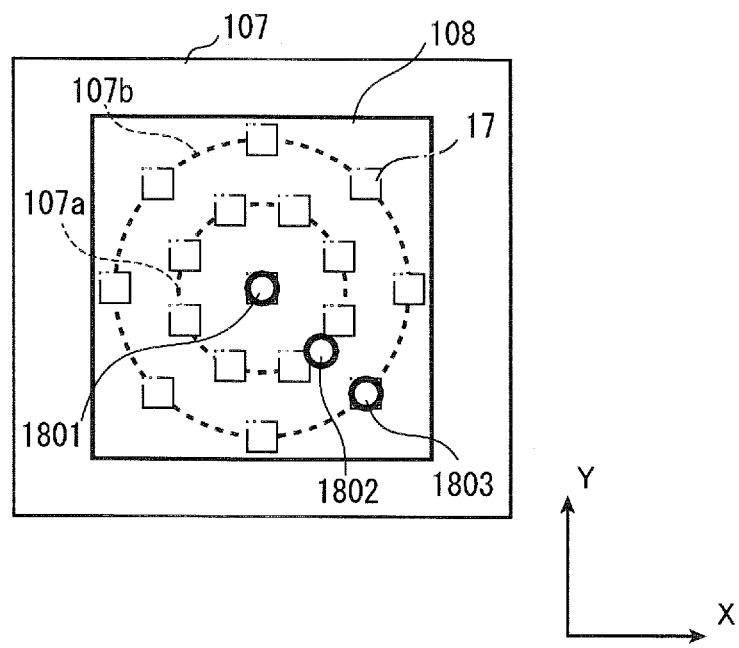
FIGS. 10A and 10B schematically illustrate arrangement patterns of antennas in Modification 2 of Embodiment 1.
Figure 10B:
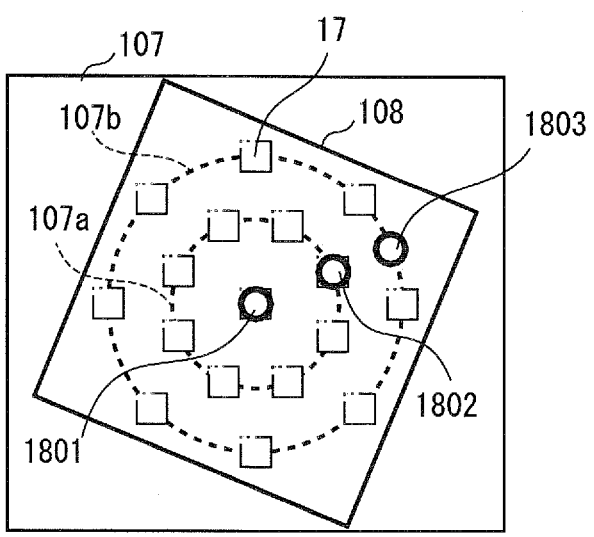

FIGS. 10A and 10B each illustrate an arrangement pattern of antennas included in a first electronic circuit device (hereinafter, referred to as a "first device") 108 and a second electronic circuit device (hereinafter, referred to as a "second device") 107. Note that first device 108 in the present modification is similar to the first device 100 except for the number and the arrangement of antennas. Therefore, description is made on that difference.

As illustrated in FIG. 10A, a plurality of antennas 17 included in the second device 107 are arranged at a center of two concentric circles and on the two concentric circles.

On the other hand, a plurality of antennas 18 included in the first device 108 are three antennas 1801, 1802 and 1803 arranged in series. The antennas 1801 and 1803 face respective two antennas of the antennas 17. In this case, when the communication connection update processing is performed, the antennas 1801 and 1803 are connected to respective modules, and close-coupled wireless communication is established using the two of the antennas 18.

Here, a distance between the antennas 1801 and 1802 is set to be equal to a radius of a smaller circle 107a of the two concentric circles. A distance between the antennas 1801 and 1803 is set to be equal to a radius of a larger circle 107b of the two concentric circles.

With such a configuration, when the first device 108 and the second device 107 are turned relative to each other around the antennas 1801 and 1701, respectively, the antenna 1802 moves along the smaller circle 107a and the antenna 1803 moves along the larger circle 107b. When the first device 108 and the second device 107 are stopped at such a position that one of the antennas 1802 and 1803 faces one of the antennas 17, wireless communication is established using two of the antennas 18.

FIG. 10B illustrates a state after the first device 108 and the second device 107 are turned relative to each other around the antennas 1801 and 1701, respectively. In this state, the antennas 1801 and 1802 respectively face the antennas 1701 and 1702. As described above, the electronic circuit system in the present modification can establish wireless communication using two pairs of antennas even after the first device 108 and the second device 107 are turned relative to each other to change the positional relation.

[Modification 3]

In the communication connection update processing in Embodiment 1 described above, one or more antennas for use in wireless communication are selected through transmission/reception of the test signal. The test signal may be the identification information of each antenna. In Embodiment 1 described above, the connection information generation units 209 and 213 each transmit the test signal from one of the antennas. The connection information generation units 209 and 213, however, may each transmit the test signal from each of the antennas at a time.

The first electronic circuit device (hereinafter, referred to as a "first device") and the second electronic circuit device (hereinafter, referred to as a "second device") in the present modification are respectively similar to the first device 100 and the second device 101. Therefore, description is made on a difference therebetween. Note that, although the first device and the second device in the present modification are partially different from the first device 100 and the second device 101 described above, respectively, there is no large difference between them in the drawings. For the above-mentioned reason, the same reference numbers 100 and 101 as those used in Embodiment 1 are respectively assigned to the first and second devices in the present modification.

<Configuration>

Figure 11:
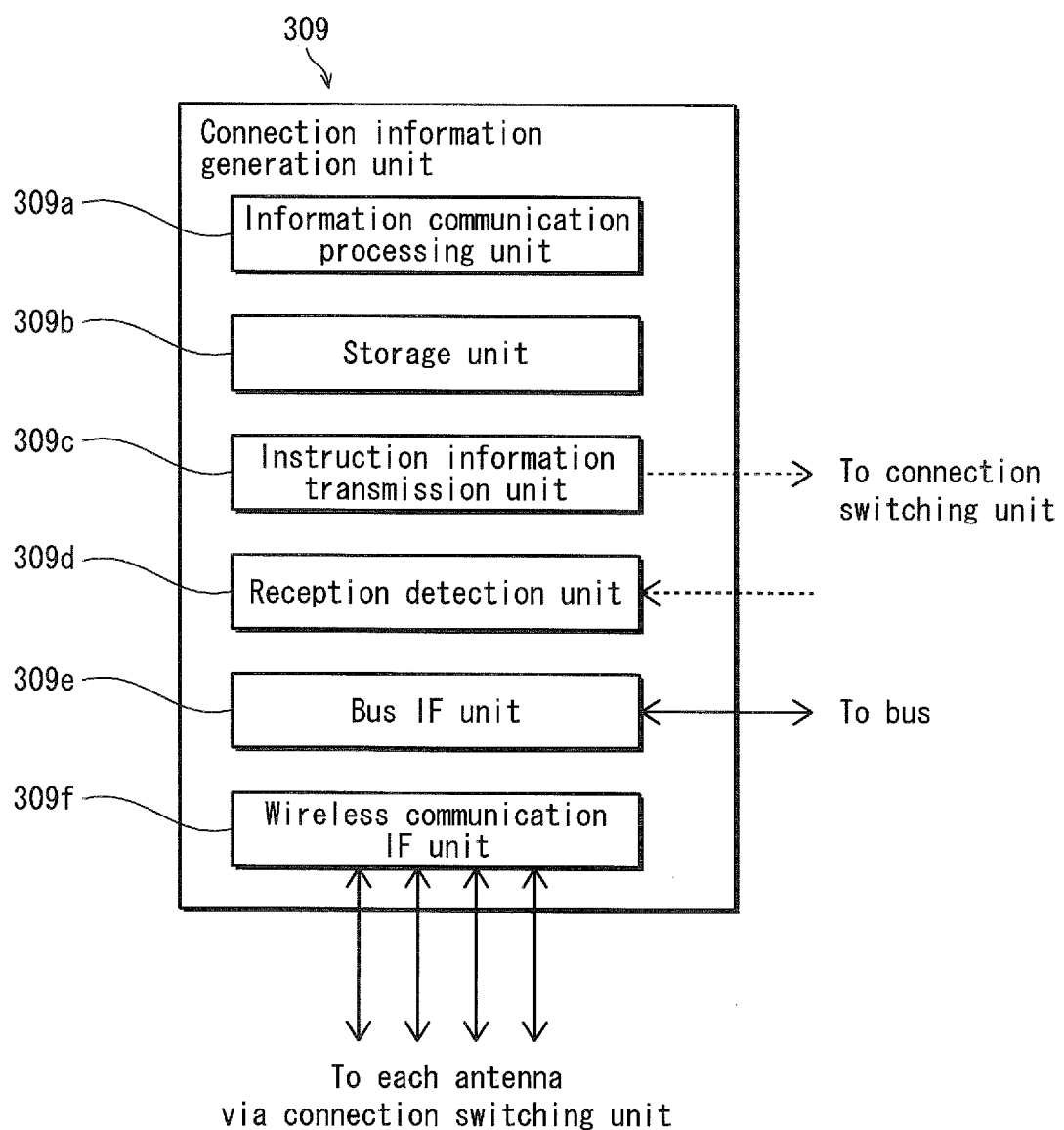
FIG. 11 schematically illustrates a connection information generation unit 309 in Modification 3 of Embodiment 1.

FIG. 11 is a block diagram schematically illustrating a configuration of a connection information generation unit 309 (or a connection information generation unit 313).

The connection information generation units 309 and 313 in the present modification each have a similar configuration to the connection information generation unit 209 in Embodiment 1 described above. However, a wireless communication IF unit 309d includes the same number (four, in this example) of interface circuits as the antennas 11. Each of the interface circuits is connected to a corresponding one of the antennas 11. Therefore, the wireless communication IF unit 309d is capable of separately transmitting/receiving signals to/from all of the antennas 11. A wireless communication IF unit included in the connection information generation unit 313 also includes the same number of interface circuits as the antennas 12, and thus is capable of separately transmitting/receiving signals to/from all of the antennas 11.

An information communication processing unit 309a included in the connection information generation unit 309 is capable of generating a signal to be transmitted to each of the four antennas 11, or is capable of handling a signal received through each of the four antennas 11. The connection information generation unit 313 included in the second device 101 is capable of separately transmitting/receiving signals to/from sixteen antennas 12, similarly to the connection information generation unit 309.

The connection information generation units 309 and 313 respectively transmit, to the connection switching units 210 and 213, pieces of instruction information for instructing the connection switching units 210 and 213 to connect each of the antennas to the connection information generation units 309 and 313 to cause the connection switching units 210 and 213 to perform switching.

<Communication Connection Update Processing 2>

The following describes communication connection update processing 2 performed by the above-mentioned connection information generation units 309 and 313. The number "2" is attached to the communication connection update processing in the present modification to distinguish the communication connection update processing in the present modification from the communication connection update processing in Embodiment 1 described above.

Figure 12:
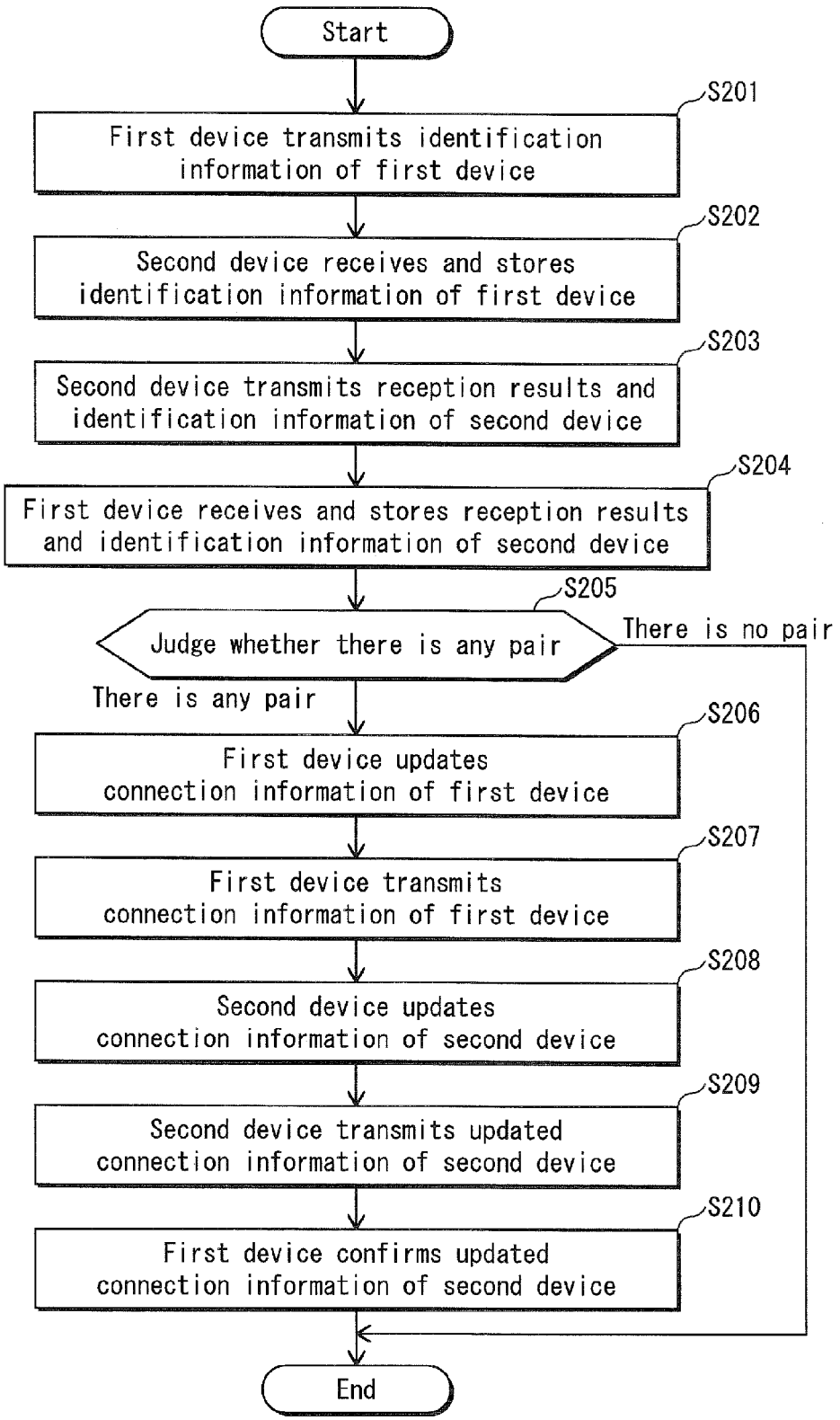
FIG. 12 is a flow chart showing communication connection update processing 2 in Modification 3.

FIG. 12 is a flow chart showing the communication connection update processing 2 performed in the electronic circuit system in the present Modification 3.

The connection information generation units 309 and 313 each perform the communication connection update processing 2, for example, immediately after power-on, immediately after the microcomputer is operated or at set time intervals to confirm the connection relation between antennas. Here, each of the plurality of antennas constituting the antennas 11 has identification information. Similarly, each of the plurality of antennas constituting the antennas 12 has identification information. Each of the connection information generation units 309 and 313 has stored the identification information of each antenna in each of the storage units 209b. The connection information generation units 309 and 313 each confirm the connection relation and generate the connection information using the identification information. Note that, since the communication connection update processing is described in detail in Embodiment 1, the communication connection update processing 2 is briefly described.

The communication connection update processing 2 progresses while signals are transmitted/received between the first device 100 and the second device 101. Accordingly, the flow chart of FIG. 12 includes processing performed by the connection information generation unit 309 included in the first device 100 and processing performed by the connection information generation unit 313 included in the second device 101. The processing performed by the connection information generation unit 309 corresponds to processing in steps S201, S204, S205, S206, S207 and S210. The processing performed by the connection information generation unit 313 corresponds to processing in steps S202, S203, S208 and S209.

First, the connection information generation unit 309 included in the first device 100 transmits, from each of the antennas 11, the identification information of the each of the antennas 11 to the second device 101. Here, if the positional relation between the first device 100 and the second device 101 is as illustrated in FIG. 2, the identification information is transmitted from the antennas 1100, 1101, 1102 and 1103 to the facing antennas 1200, 1208, 1202, 1206 included in the second device 101, respectively (step S201).

Next, the connection information generation unit 313 included in the second device 101 stores information about which of the antennas 12 has received the identification information transmitted from the first device 100 (step S202). Furthermore, the connection information generation unit 313 transmits, to the antennas 11 included in the first device 100, reception results of the identification information as reception results of the second device 101, along with the identification information of each of the antennas 12 included in the second device 101 (step S203).

The connection information generation unit 309 included in the first device 100 then stores the reception results of the second device 101 and the identification information of each of the antennas 12 transmitted from the second device 101, along with reception results of each of the antennas 11 included in the first device 100 as reception results of the first device 100 (step S204). The connection information generation unit 309 included in the first device 100 then judges whether or not there is any pair of the antennas 11 and the antennas 12. When the connection information generation unit 309 judges that there is no pair, the processing ends (step S205).

The connection information generation unit 309 judges whether or not there is any pair of the antennas 11 and the antennas 12 based on quality of communication established using the antennas 11 and 12. More specifically, when a signal transmitted from a single antenna is received by a plurality of antennas, one of the plurality of antennas of the highest communication quality is uniquely selected and adopted. Examples of the antenna of the highest communication quality are the antenna having the highest sensitivity (e.g. the antenna having the highest receiving signal intensity) and the antenna with the lowest error rate.

When judging that there is any pair of the antennas 11 and the antennas 12, the connection information generation unit 309 updates the connection information indicating one or more of the antennas 11 from each of which a signal within the first device 100 is to be transmitted (step S206). Next, the connection information generation unit 309 included in the first device 100 transmits the connection information of the first device 100 to the second device 101 (step S207).

The connection information generation unit 313 included in the second device 101 receives the transmitted connection information of the first device 100. The connection information generation unit 313 allocates the selected antennas 1200, 1208, 1202 and 1206 to the memories 221 and 222 by referring to the received connection information of the first device 100. The connection information generation unit 313 then updates the connection information of the second device 101 according to the allocation (step S208). The connection information generation unit 313 then transmits the updated connection information of the second device 101 to the first device 100 (step S209).

Finally, the connection information generation unit 309 included in the first device 100 receives the updated connection information of the second device 101, and terminates the communication connection update processing (step S210).

In the above-mentioned communication connection update processing 2, antennas are quickly and easily connected to respective modules in an appropriate manner.

Note that, in order to transmit information when one or more pairs of the antennas 11 and 12 have not yet determined at the time of power-on and at the beginning of debugging, the same desired information may be transmitted from each of the antennas, and any one or more of the antennas may receive the transmitted information.

Embodiment 2

In Embodiment 1 described above, the second device 101 is an electronic circuit device for performing debugging. The second device 101, however, may be a memory device.

FIG. 11 is a block diagram illustrating a configuration of an electronic circuit system composed of a first electronic circuit device (hereinafter, referred to as a "first device") 110 and a second electronic circuit device (hereinafter, referred to as a "second device") 111 in Embodiment 2. Note that the first device 110 and the first device 100 have a common configuration, and the second device 111 and the first device 101 have a common configuration. Therefore, the same reference number is assigned to the same component as those illustrated in FIGS. 1 and 2, and description thereof is omitted or simplified.

In the present embodiment, the first device 110 is an integrated circuit, such as an LSI, that includes an electronic circuit constituting a microcomputer. The second device 111 is an integrated circuit, such as an LSI, that includes an electronic circuit constituting a memory device.

The following describes the first device 110 and the second device 111.

<<Configuration>>

<First Electronic Circuit Device>

Figure 13:
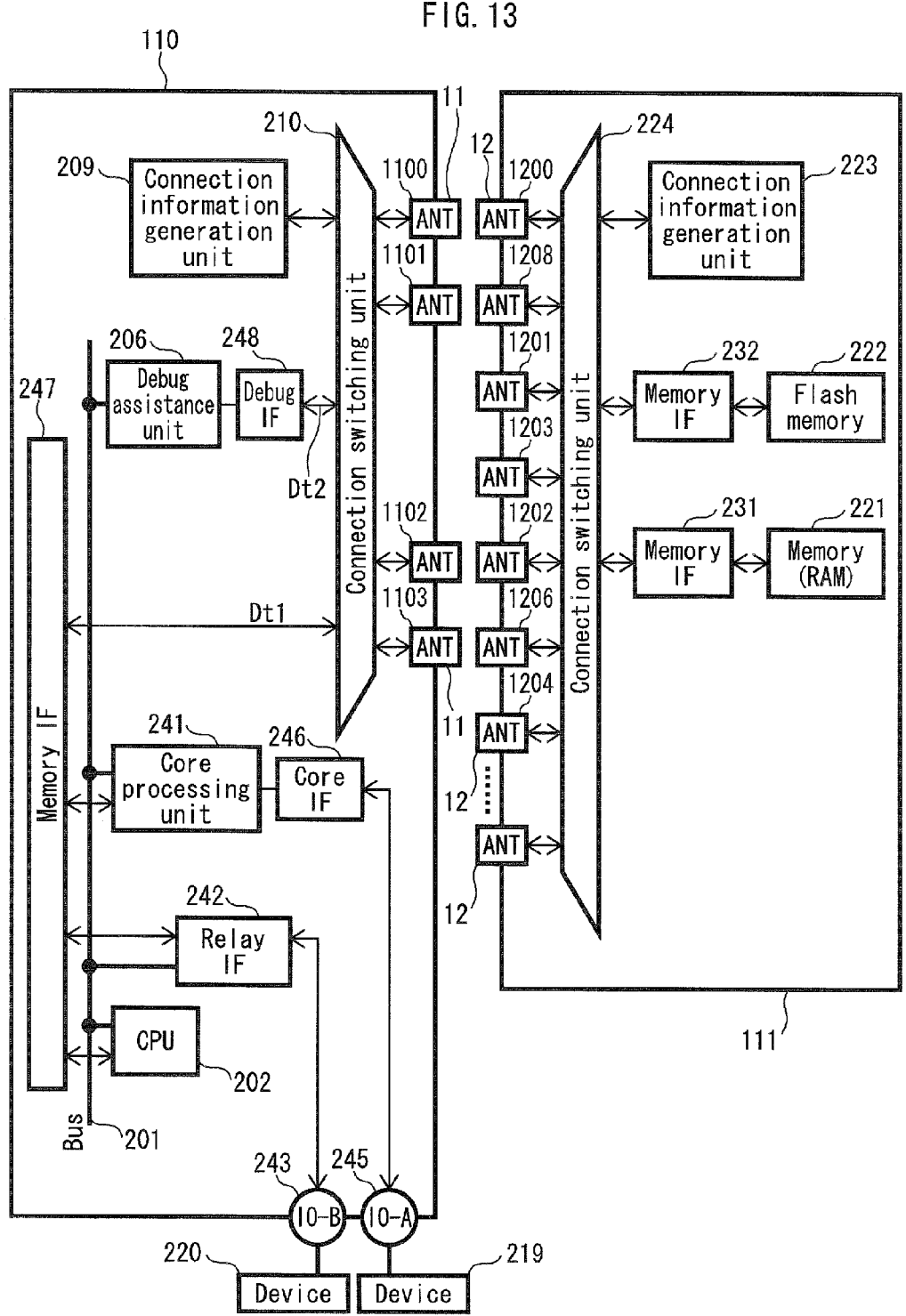
FIG. 13 is a block diagram of an electronic circuit system in Embodiment 2.

As illustrated in FIG. 13, in the first device 110, the CPU 202, a core processing unit 241, the debug assistance unit 206 and a relay IF 242 are each connected to the bus 201. The CPU 202 and the debug assistance unit 206 here are respectively the same as the CPU 202 and the debug assistance unit 206 in Embodiment 1. Although not performing debugging in the present embodiment, the debug assistance unit 206 is used for establishing communication with the second device 111. The core processing unit 241 writes/reads data to/from a memory (not illustrated) provided within the core processing unit 241. The relay IF 242 is connected between the bus 201 and a relay terminal 243. The relay IF 242 performs processing (interface processing) to relay signals transmitted/received between the bus 201 and a device 220 connected to the first device 110.

The first device 110 further includes a relay terminal 245. A core IF 246 is connected between the core processing unit 241 and the relay terminal 245. The core IF 246 performs processing (interface processing) to relay signals transmitted/received between the core processing unit 241 and a device 219 connected to the first device 110. A memory IF 247 performs processing (interface processing) to relay signals transmitted/received when the CPU 202 and the like access the memory provided within the core processing unit 241.

The first device 110 further includes a debug IF (interface) 248 via which the debug assistance unit 206 is connected to the connection switching unit 210.

The memory IF 247 and the debug IF 248 described above each perform processing to relay transmitted/received signals such as serial-parallel conversion and buffering of data.

In the present embodiment, one or more of the antennas 11 connected to respective one or more modules (the memories 221 and 222) are switched by transmitting the instruction information generated by the connection information generation unit 209 to the connection switching unit 210, similarly to Embodiment 1.

For example, when the connection information generation unit 209 instructs, by using the instruction information, the connection switching unit 210 to connect the debug IF 248 (signal Dt2) to the antenna 1100 and to connect the memory IF 247 (signal DU) to the antenna 1103, the connection switching unit 210 performs switching accordingly. As a result, the signal Dt2 output from the debug IF 247 is transmitted from the antenna 1100, and the signal Dt1 output from the memory IF 245 is transmitted from the antenna 1103. As described above, the connection switching unit 210 switches one or more of the antennas 11 from each of which a signal within the first device 100 is transmitted in accordance with the connection information. In other words, the connection switching unit 210 switches one or more of the antennas 11 connected to respective one or more electronic circuit modules (the debug assistance unit 206, the memory IF 247 and the like) included in the first device 100.

<Second Electronic Circuit Device>

Also, the second device 111 includes the antennas 12, a connection information generation unit 223, a connection switching unit 224, a memory IF 231 and a memory IF 232. In FIG. 13, reference numbers are assigned to the antennas 1200, 1201, 1202, 1203, 1204, 1206 and 1208 from among the antennas 12.

The antennas 12 and the connection switching unit 224 are respectively the same as the antennas 12 and the connection switching unit in Embodiment 1. The memory IFs 231 and 232 respectively have the same functions as those of the IFs 231 and 232 in Embodiment 1.

<<Operations>>

In the present embodiment, the communication connection update processing is performed to update one or more antennas connected to respective one or more modules, similarly to Embodiment 1 described above. Since the communication connection update processing in the present embodiment is the same as that in Embodiment 1, the following describes a flow of a signal after the communication connection update processing.

The connection switching unit 224 is connected to each of the antennas 12. A signal transmitted from each of the antennas 12 is supplied to the connection switching unit 224. Furthermore, the connection switching unit 224 is connected to the memory 221 via the memory IF 231, which is a memory interface. The connection switching unit 224 supplies a signal to the memory 221. The connection switching unit 224 is further connected to the memory 222 via the memory IF 232, which is a memory interface. The connection switching unit 224 supplies a signal to the memory 222.

As described above, a memory and an IF are respectively separated into two memories and two IFs. Therefore, different types of signals are separately transmitted to and stored in the memories 221 and 222. For example, it is possible to separately transmit signals from different modules to memories 221 and 222.

Note that signals to be transmitted are transmitted to the antennas 12, the connection switching unit 224 and the memory IFs 231 and 232 in this order. By the connection switching unit 224 appropriately connecting the antennas 12 to the memory IFs 231 and 232, an appropriate signal is transmitted to each of the memories 221 and 222. Note that the connection switching unit 224 switches the antennas 12 connected to the memories 221 and 222 in accordance with the instruction information transmitted from the connection information generation unit 223.

For example, when the connection information generation unit 223 instructs, by using the instruction information, the connection switching unit 224 to connect the antenna 1200 to the memory 221 (via the memory IF 231) and to connect the antenna 1206 to the memory 222 (via the memory IF 232), the connection switching unit 224 performs switching accordingly. As a result, the signal Dt1 received through the antenna 1200 is stored in the memory 221, and the signal Dt2 received through the antenna 1206 is stored in the memory 222. As described above, the connection switching unit 224 switches one or more of the antennas 12 from each of which a signal within the second device 101 is transmitted in accordance with the instruction information.

In FIG. 13, a case where the antennas 1100 and 1200, the antennas 1101 and 1208, the antennas 1102 and 1202, and the antennas 1103 and 1206 are each paired up and are close to each other is taken as an example of the positional relation between the first device 100 and the second device 101.

The connection switching unit 210 included in the first device 100 performs switching in accordance with the instruction information, for example, such that the signal Dt2 output from the debug IF 248 is transmitted to the antenna 1100. The connection switching unit 224 included in the second device 101 performs switching in accordance with the instruction information, for example, such that the signal transmitted from the antenna 1200 is stored in the memory 222 via the memory IF 232. The signal Dt2, which is a signal for debugging output from the debug IF 248 included in the first device 100, is stored in the memory 222 included in the second device 101 through wireless communication in the above-mentioned manner, for example.

Note that, although the above description is made by taking, as an example, a case where data is transmitted from the first device 100 to the second device 101, the present invention may have a configuration in which data is transmitted from the second device 101 to the first device 100, or data is transmitted from/to the first device 100 to/from the second device 101. For example, the present invention is applicable to a configuration in which data for debugging in the first device 100 is stored in the memory 221 included in the second device 101, and data obtained as a result of debugging and stored in the memory 222 included in the second device 101 is transmitted to the debug assistance unit 206 included in the first device 100.

In the above-mentioned example, the connection information may include information about one or more pairs of antennas. Specifically, for example, the connection information generation unit 209 generates connection information indicating results of communication performed by the antennas 1100, 1101, 1102 and 1103, i.e. indicating that the antennas 1100 and 1200, the antennas 1101 and 1208, the antennas 1102 and 1202, and the antennas 1103 and 1206 are each paired up and connected to each other. On the other hand, the connection information generation unit 223 generates connection information indicating results of communication performed by the antennas 1200, 1208, 1202 and 1206, i.e. indicating that the antennas 1200 and 1100, the antennas 1208 and 1101, the antennas 1202 and 1102, and the antennas 1206 and 1103 are each paired up and connected to each other.

When the connection information includes the above-mentioned information about one or more pairs of antennas, one of the connection information generation units 209 and 223 may request the other one of the connection information generation units 209 and 223 to change the connection relation. For example, the connection information generation unit 209 may request the connection information generation unit 223 to perform processing to connect the antenna 1208 to the memory 222. In this case, the connection information generation unit 209 has stored the identification information of the memory 222.

This concludes the description of Embodiment 2.

Embodiment 3

In Embodiment 1 described above, the first device 100 and the second device 101 are connected to each other on a one-to-one basis. A plurality of electronic circuit devices, however, may be connected to one of the first device 100 and the second device 101 through close-coupled wireless communication.

Figure 14:
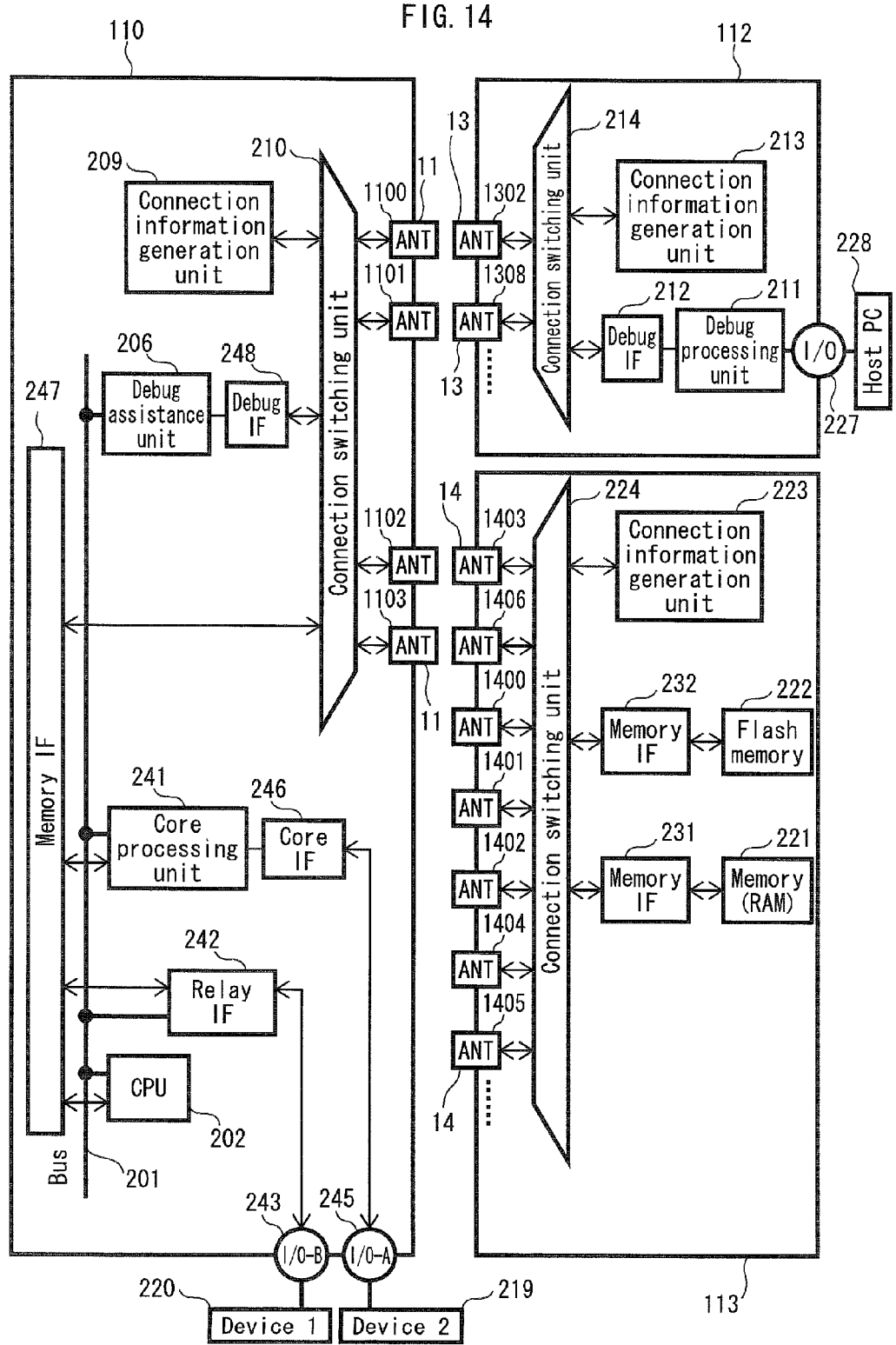
FIG. 14 is a block diagram of an electronic circuit system in Embodiment 3.

FIG. 14 is a block diagram illustrating a configuration of an electronic circuit system composed of a first electronic circuit device (hereinafter, referred to as a "first device") 110, a second electronic circuit device (hereinafter, referred to as a "second device") 112 and a third electronic circuit device (hereinafter, referred to as a "third device") 113 in Embodiment 3. The second device 112 and the third device 113 are each embodied as an integrated circuit such as an LSI.

Note that the first device 110 here is the same as the first device 110 in Embodiment 2, and the second device 112 and the third device 113 each have a similar configuration to the first device 111. Therefore, the same reference numbers are assigned to the same configurations as those in Embodiment 2, and the description thereof is omitted. Description is made mainly on the difference between Embodiment 2 and Embodiment 3.

Figure 15:
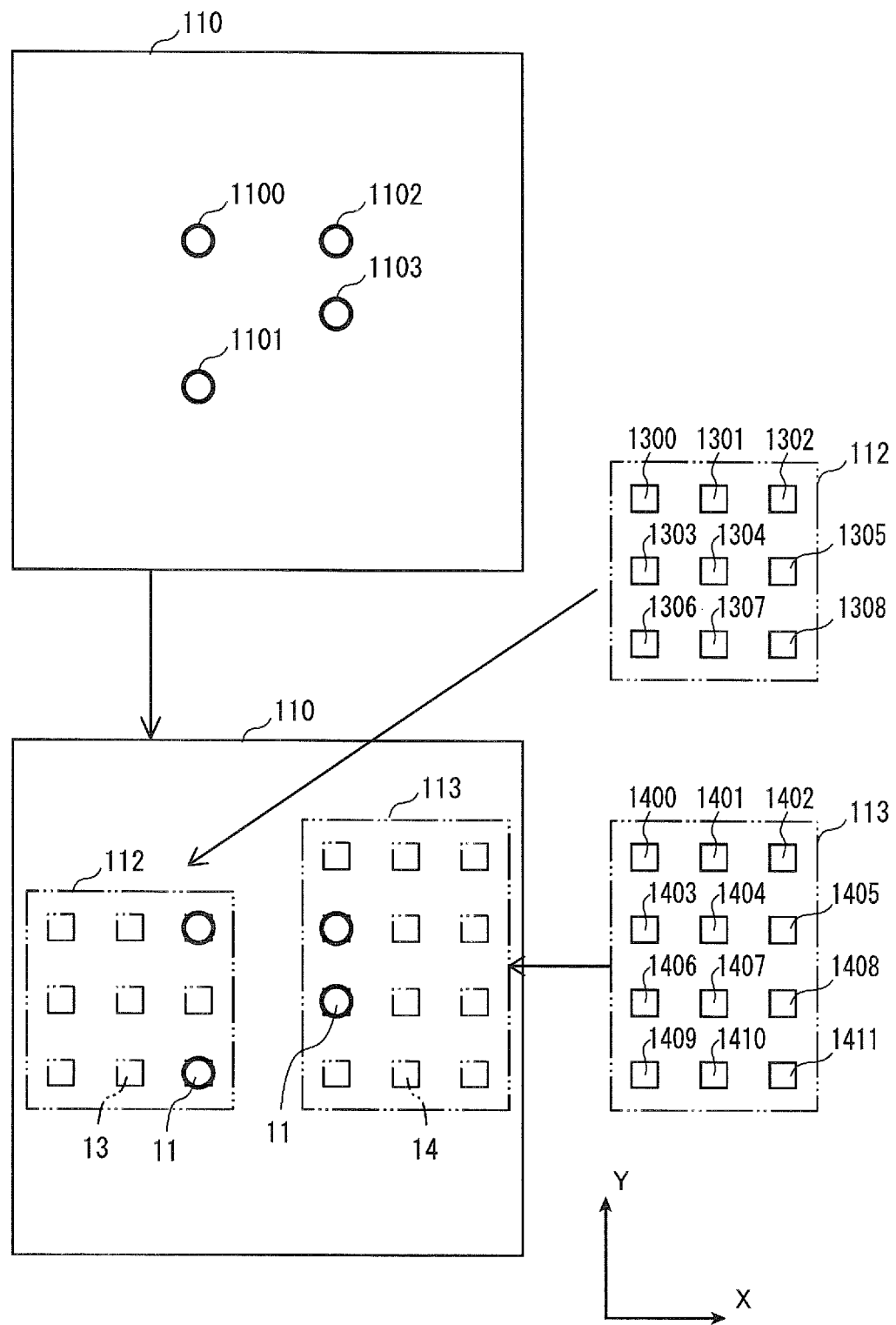
FIG. 15 schematically illustrates an arrangement pattern of antennas included in the electronic circuit system in Embodiment 3.

FIG. 15 schematically illustrates an arrangement pattern of antennas included in each of the first device 110, the second device 112 and the third device 113.

The second device 112 includes a plurality of antennas 13 including antennas 1302 and 1308. The antennas 13 have similar functions to each of the antennas 11 and 12 in Embodiment 1. The connection information generation unit 213 generates the connection information and the instruction information, and the connection switching unit 214 switches one or more of the antennas 13 connected to the debug processing unit 211 via the debug IF 212 in accordance with the instruction information.

The third device 113 includes a plurality of antennas 14 including antennas 1400 to 1411. The antennas 14 have similar functions to each of the antennas 11 and 12 in Embodiment 1. Similarly to the second electronic circuit device 101 in each of Embodiment 1 and 2, the connection information generation unit 223 generates the connection information and the instruction information, and the connection switching unit 224 switches one or more of the antennas 14 connected to the memories 221 and 222 in accordance with the instruction information.

The first device 110, the second device 112 and the third device 113 each having the above-mentioned configuration are positioned as illustrated in the lower diagram of FIG. 15. In this case, the antennas 1102 and 1103 included in the first device 110 face respective two of the antennas 13 included in the second device 112. Furthermore, the antennas 1100 and 1101 included in the first device 110 face respective two of the antennas 14 included in the third device 113.

Under this condition, the first device 110 performs the communication connection update processing with the second device 112 and the third device 113 to set the connection relation in turn. As a result, the first device 110 and the second device 112 are wirelessly connected using a pair of the antennas 1100 and 1302, and a pair of the antennas 1101 and 1308. Furthermore, the first device 110 and the third device 113 are wirelessly connected using a pair of the antennas 1102 and 1403, and a pair of the antennas 1103 and 1406.

As described above, the first device 110 is capable of establishing wireless communication with each of the second device 112 and the third device 113 at a time.

Even when the present invention has such a configuration, the first device 110 and the third device 113 each perform the communication connection update processing similarly to Embodiment 1. Therefore, even when the positional relation among the first device 110, the second device 112 and the third device 113 is changed, the first device 110 and the third device 113 each operate so as to update one or more pairs of antennas. Therefore, it is possible to easily establish contactless data communication between devices without being affected by the positional relation between devices and the difference of the number and the arrangement of antennas between devices. As described above, it is possible to combine a single electronic circuit device with a plurality of electronic circuit devices.

The first device 110 may have a configuration in which a signal output from the debug IF 248 included in the first device 110 is transmitted to the first device 110 by separating the signal into a signal transmitted using a pair of the antennas 1100 and 1302 and a signal transmitted using a pair of the antennas 1101 and 1308, and a signal output from the memory IF 247 included in the first device 110 is transmitted to the third device 113 by separating the signal into a signal transmitted using a pair of the antennas 1102 and 1313 and a signal transmitted using a pair of the antennas 1103 and 1316.

Embodiment 4

In each of the above-mentioned embodiments, each electronic circuit device has a function of establishing close-coupled wireless communication. In place of the electronic circuit device, a wireless communication device obtained by separating the wireless communication function from the electronic circuit device may be used.

Figure 16:
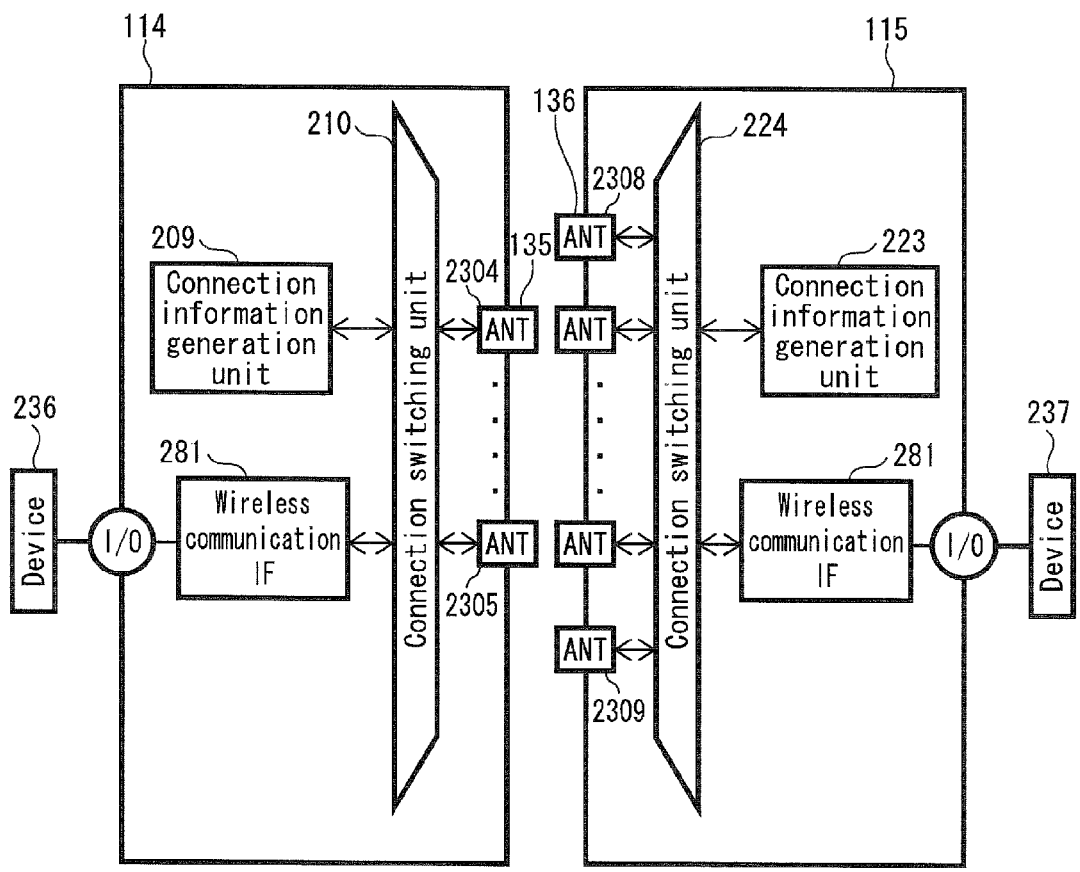
FIG. 16 is an overview diagram of a wireless communication system in Embodiment 4.

FIG. 16 is a block diagram illustrating a configuration of a wireless communication system composed of two wireless communication devices 114 and 115. In FIG. 16, the same reference numbers are assigned to the same components as those illustrated in FIG. 1, and description thereof is omitted.

In the present embodiment, a wireless communication system composed of a first wireless communication device 114 and a second wireless communication device 115 is taken as an example of the wireless communication system. The first wireless communication device 114 and the second wireless communication device 115 are each embodied as an integrated circuit such as an LSI.

The first wireless communication device 114 includes a plurality of antennas 135 including antennas 2304 and 2305. The antennas 135 have similar functions to the antennas 11 in Embodiment 1. The connection switching unit 210 is connected to an external device 236 via a wireless communication IF 281.

The second wireless communication device 115 includes a plurality of antennas 136 including antennas 2308 and 2309. The antennas 136 have similar functions to the antennas 12 in Embodiment 1. The connection switching unit 224 is connected to an external device 237 via a wireless communication IF 281.

According to this configuration, the devices 236 and 237 each not having a wireless communication interface can establish wireless communication with each other using the electronic circuit system.

The first wireless communication device 114 and the second wireless communication device 115 are used, for example, by being incorporated into electronic equipment such as a mobile phone and a display device as described later.

Embodiment 5

In each of the above embodiments, the antennas included in two electronic circuit devices, or two wireless communication devices are configured to have the same size. The size of the antennas, however, may differ between devices.

Figure 17A:
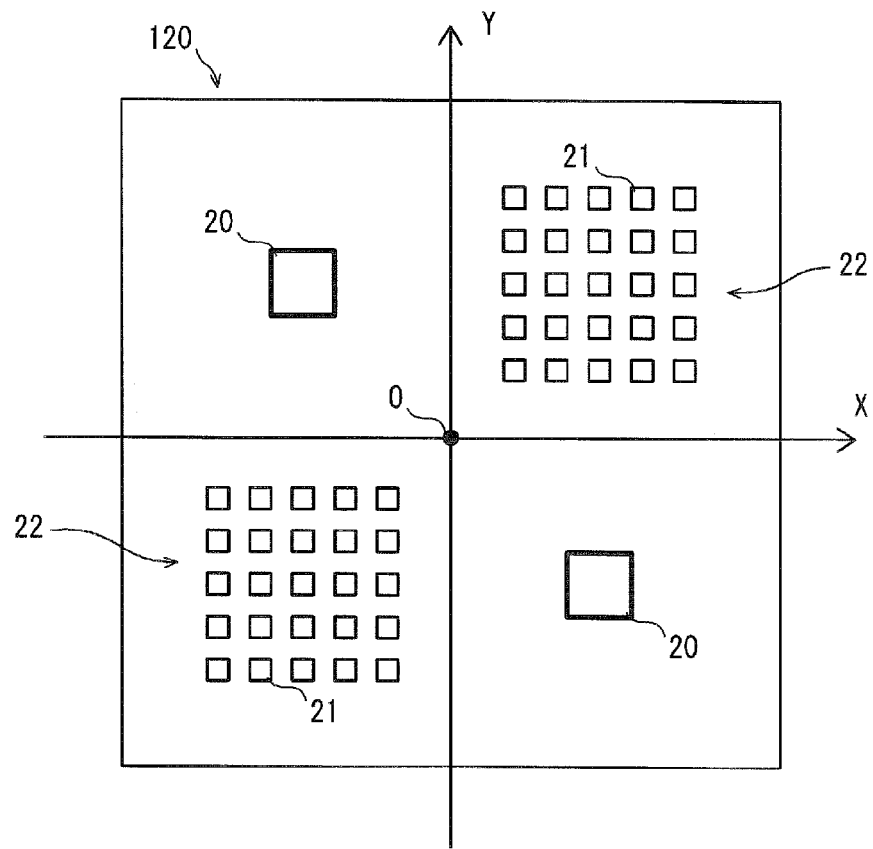
FIGS. 17A and 17B schematically illustrate arrangement patterns of antennas included in an electronic circuit system in Embodiment 5.
Figure 17B:
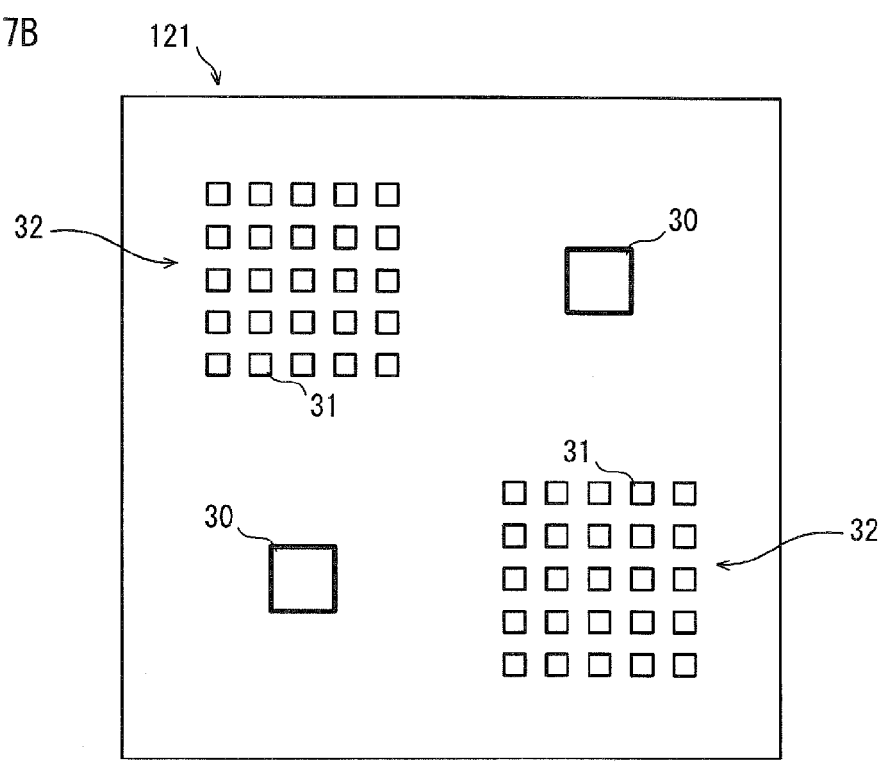
Figure 18A:
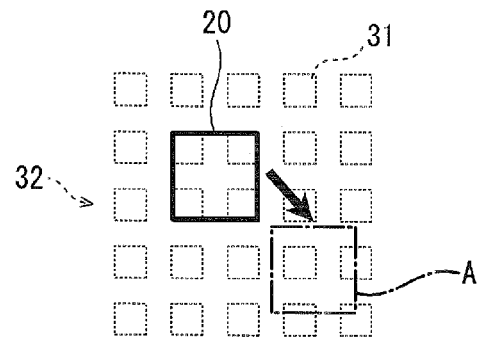
FIGS. 18A and 18B schematically illustrate arrangement patterns of antennas included in the electronic circuit system in Embodiment 5.
Figure 18B:
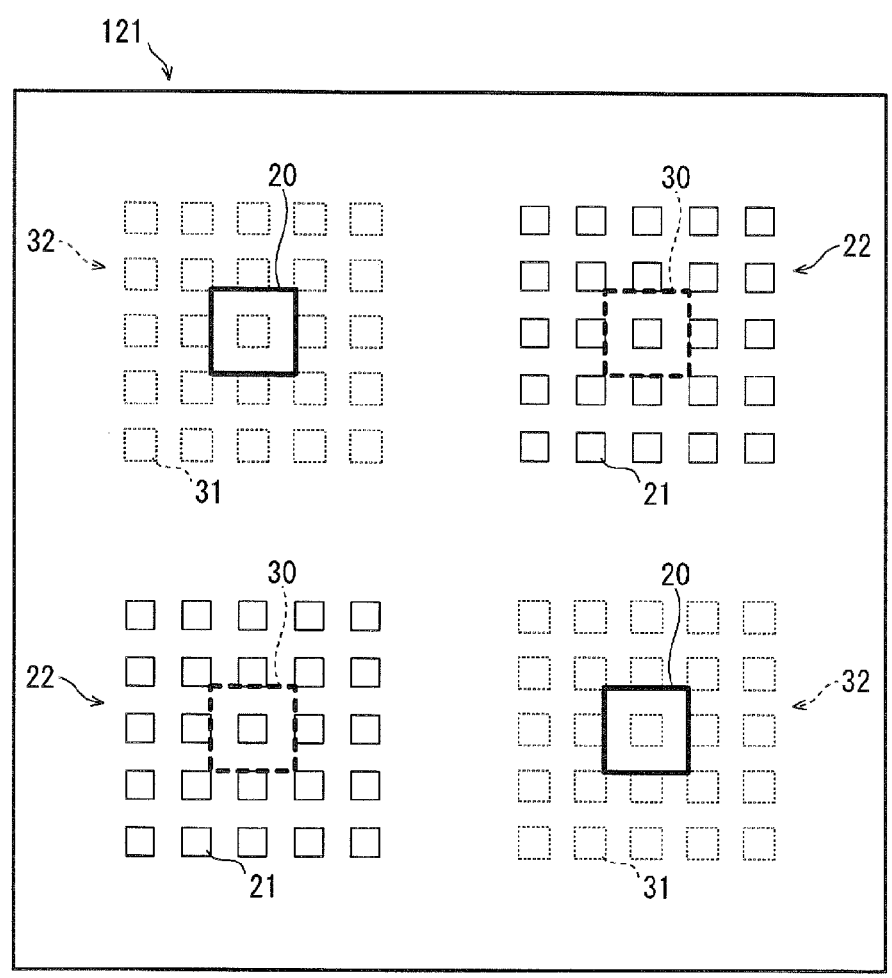

FIG. 17A schematically illustrates an arrangement pattern of antennas included in a first wireless communication device 120. FIG. 17B schematically illustrates an arrangement pattern of antennas included in a second wireless communication device 121. The first wireless communication device 120 and the second wireless communication device 121 constitute a wireless communication system. FIGS. 18A and 18B schematically illustrate arrangement patterns of antennas in a state where the first wireless communication device 120 is superimposed on the second wireless communication device 121. Note that FIG. 17B illustrates the arrangement pattern viewed from the bottom of the second wireless communication device 121 (a side on which the antennas are not arranged). Therefore, the arrangement pattern viewed from the top of the second wireless communication device 121 (a side on which the antennas are arranged) corresponds to a mirror image of the arrangement pattern illustrated in FIG. 17B.

The first wireless communication device 120 and the second wireless communication device 121 have similar configurations to those in Embodiment 4 illustrated in FIG. 16 except for the sizes and the number of antennas. Therefore, description thereof is omitted. Note that the first wireless communication device 120 and the second wireless communication device 121 are each embodied as an integrated circuit such as an LSI.

<Configuration>

The first wireless communication device 120 includes two large transmission antennas 20 and a plurality of small receiving antennas 21. Assume that the first wireless communication device 120 is a coordinate system with the center of the first wireless communication device 120 as an origin, the two transmission antennas 20 are positioned in quadrant II and in quadrant IV. The plurality of receiving antennas 21 are arranged in a matrix in quadrant I and in quadrant III so as to form an antenna group 22 in each of quadrant I and quadrant III. The antennas included in the second wireless communication device 121 are similar to the antennas included in the first wireless communication device 120 except that two transmission antennas 30 and a plurality of receiving antennas 31 (or two receiving antenna groups 32) are arranged in different positions.

Note that the transmission antennas 20 and 30 are respectively connected to the connection switching units 210 and 224 via drivers for transmission. The receiving antennas 21 and 31 are respectively connected to the connection switching units 210 and 224 via drivers for reception.

As illustrated in FIG. 18A, each of the transmission antennas 20 is large enough to overlap four of the receiving antennas 21 arranged in a matrix. With such a configuration, when a part of the first wireless communication device 120 in which any one of the transmission antennas 20 is positioned and a part of the second wireless communication device 121 in which the plurality of receiving antennas 21 are positioned face each other, the one of the transmission antennas 20 surely faces one or more of the plurality of receiving antennas 21. For example, when the one of the transmission antennas 20 is in a position shown as A in FIG. 18A, the one of the transmission antennas 20 overlaps one of the receiving antennas 21.

Therefore, when the transmission antennas 20 and the respective receiving antenna groups 32 face each other and the transmission antennas 30 and the respective receiving antenna groups 22 face each other as illustrated in FIG. 18B, wireless communication is established even if positioning accuracy is low. That is to say, in the present embodiment, wireless communication is established without precisely adjusting the positional relation between the first wireless communication device 120 and the second wireless communication device 121. The present embodiment is suited for a case where it is difficult to precisely position devices.

<Operations>

The connection information generation units 209 and 223 respectively included in the first wireless communication device 120 and the second wireless communication device 121 perform communication connection update processing 3 similar to the communication connection update processing 1 in Embodiment 1. Note that, in the present embodiment, the wireless communication IF unit included in each of the connection information generation units 209 and 223 includes a transmission IF unit to which a transmission antenna is to be connected and a reception IF unit to which a receiving antenna is to be connected, and thus is capable of transmitting and receiving a signal at a time.

Figure 19:
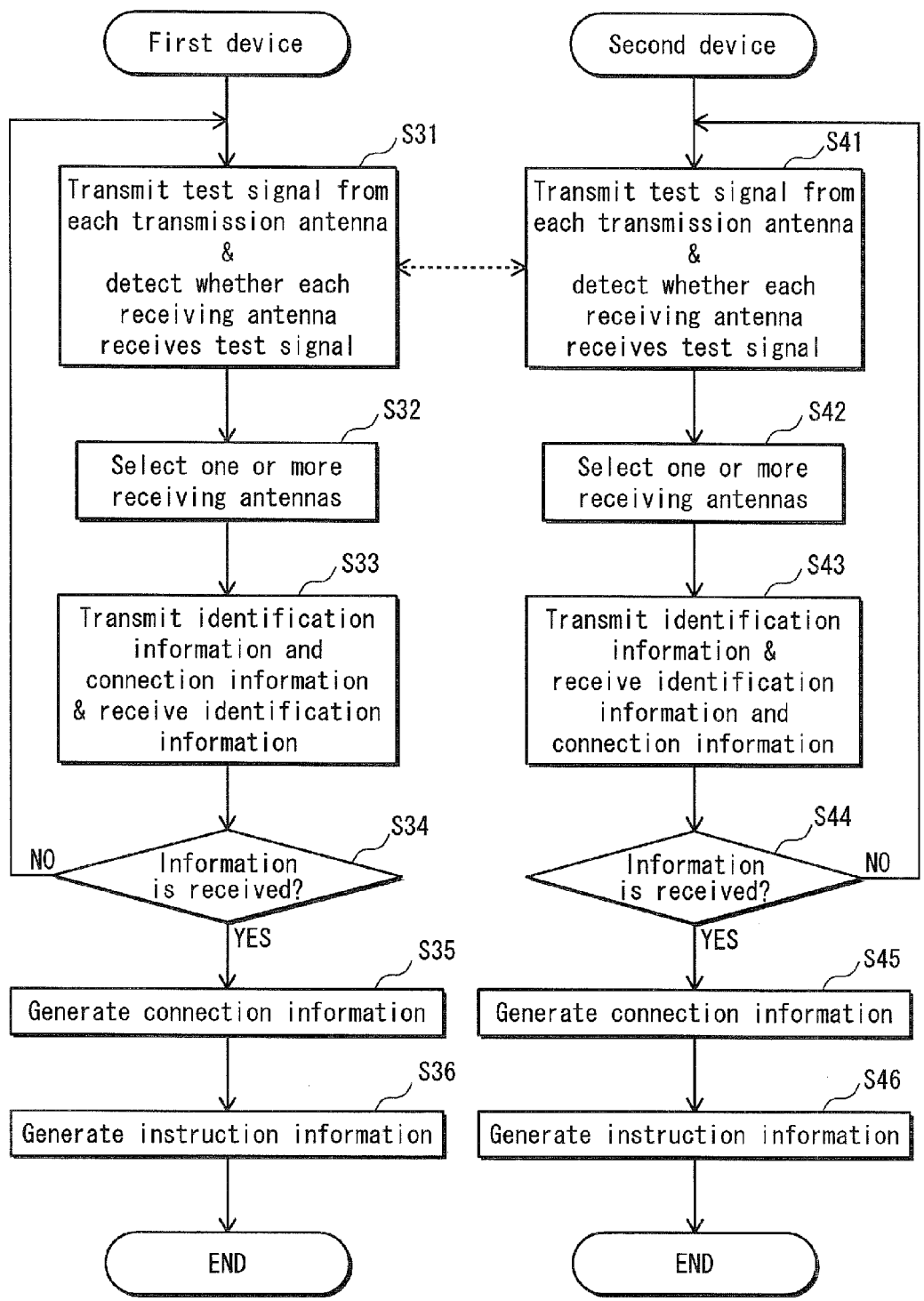
FIG. 19 is a flow chart showing communication connection update processing 3 in Embodiment 5.

FIG. 19 is a flow chart showing the communication connection update processing 3. The following describes processing performed by the first wireless communication device 120 and processing performed by the second wireless communication device 121 in parallel while comparing them with each other, with reference to FIG. 19. The communication connection update processing 3 is automatically performed upon powering on the first wireless communication device 120 and the second wireless communication device 121.

In a step S31, the first wireless communication device 120 transmits a test signal from each of the transmission antennas 20 and detects whether each of the receiving antennas 21 receives a signal. In a step S41, the second wireless communication device 121 transmits a test signal from each of the transmission antennas 30 and detects whether each of the receiving antennas 31 receives a signal. Here, the two transmission antennas 20 are each connected to the connection information generation unit 209 and simultaneously transmit test signals. The same applies to the two transmission antennas 30 included in the second wireless communication device 121.

Processing in the step S31 is performed until, in each of the two receiving antenna groups 22, any of the receiving antennas 21 receives a test signal. The same applies to processing in the step S41.

In a step S32, any receiving antenna receiving the test signal is selected based on the communication quality, and the selected receiving antenna is connected to the connection information generation unit 209. In a step S42, any receiving antenna receiving the test signal is selected based on the communication quality, and the selected receiving antenna is connected to the connection information generation unit 223.

In a step S33, the first wireless communication device 120 transmits the identification information of each of the transmission antennas 20 and the connection information of each of the transmission antennas 20 (identification information of each of modules connected to the transmission antennas 20). Here, the identification information and the connection information are transmitted alternately from the two transmission antennas 20 a plurality of times through the switching transmission processing described in Embodiment 1.

Also in the step S33, the selected receiving antenna 21 receives information.

In a step S43, the identification information of each of the transmission antennas 30 is transmitted through the switching transmission processing. Furthermore, the selected receiving antenna 31 receives information.

In judgment in a step S34, when the first wireless communication device 120 judges that the identification information is not received, processing returns to the step S31. In judgment in a step S44, when the second wireless communication device 121 judges that the identification information is not received, processing returns to the step S41.

When the identification information is received, the connection information and the instruction information are generated (S35, S36, S45, S46). The instruction information is then transmitted to the connection switching unit 210 or the connection switching unit 224 so that switching is performed.

By the above-mentioned processing, one or more antennas for use in wireless communication are connected to respective one or more modules in an appropriate manner.

Note that, in the present modification, in order for the connection information generation units 209 and 223 to perform the positional change detection processing, a confirmation signal may be transmitted/received using one of the transmission antennas 20 and the receiving antennas 31 corresponding to the one of the transmission antennas 20, and using one of the transmission antennas 30 and the receiving antennas 21 corresponding to the one of the transmission antennas 30.

[Modification 1]

Figure 20:
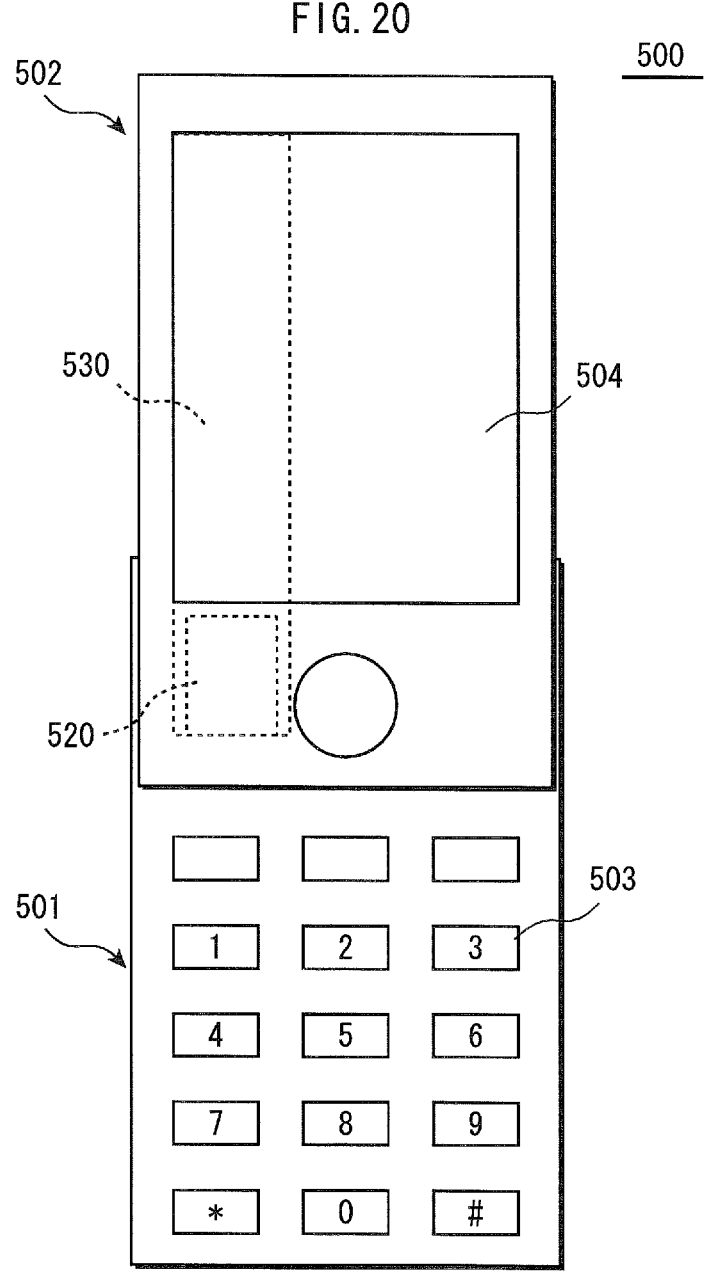
FIG. 20 is an outline view of a sliding-type mobile phone having a wireless communication system in Modification 1 of Embodiment 5.
Figure 21:
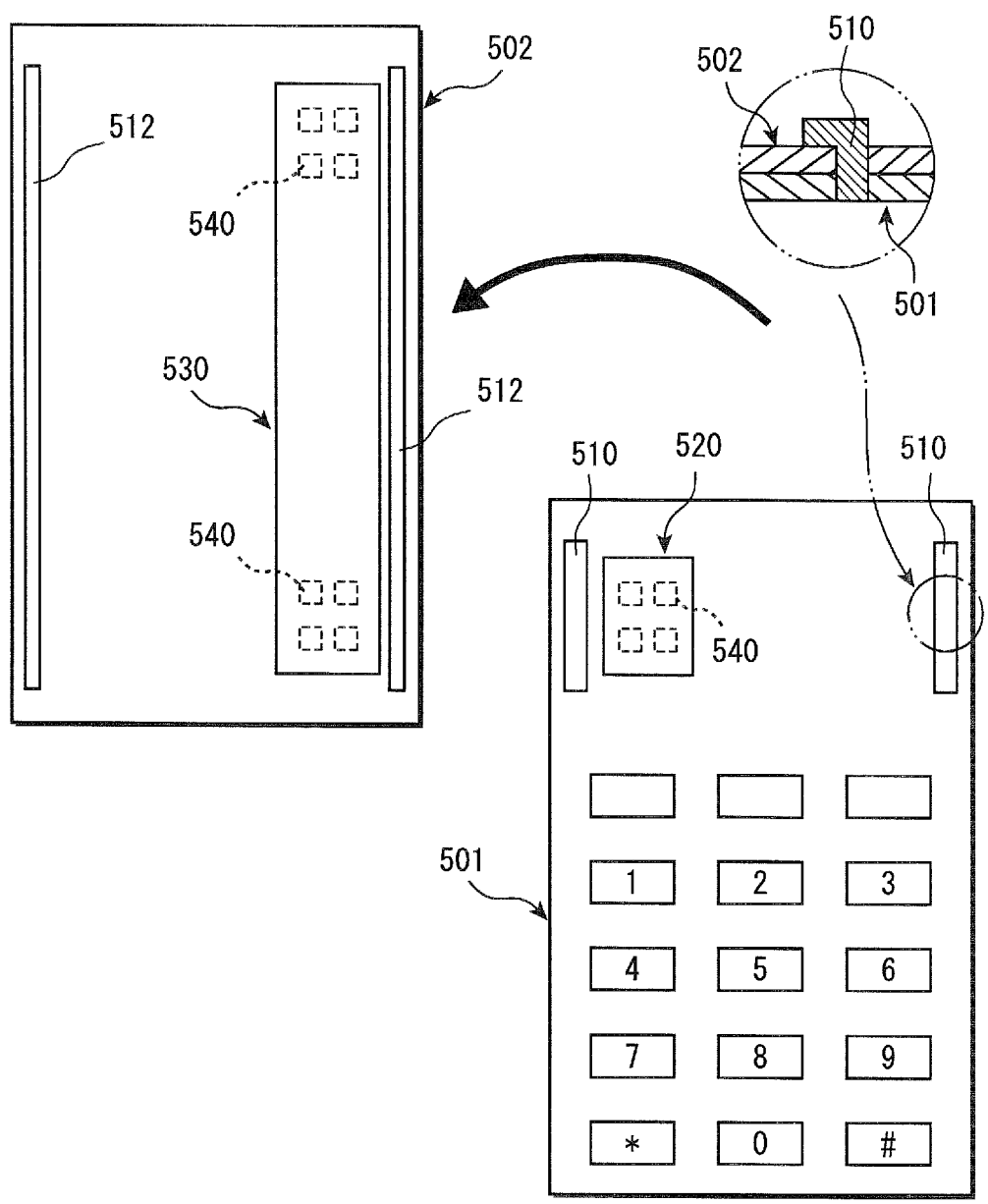
FIG. 21 illustrates the mobile phone having been separated into two parts.

FIG. 20 illustrates an example in which the wireless communication device in Embodiment 5 described above is applied to a mobile phone. FIG. 21 illustrates a state where the mobile phone is separated into a first housing 501 and a second housing 502.

A mobile phone 500 is a sliding-type mobile phone and includes the first housing 501 and the second housing 502.

The first housing 501 is provided with operation keys 503, and the second housing 502 is provided with a display panel 504.

The first housing 501 is further provided with a guide member 510 that is L-shaped in cross-section. The guide member 510 fits in a groove 512 formed in the second housing 502 to connect the first housing 501 and the second housing 502 in a slidable manner. As described above, the first housing 501 and the second housing 502 are connected to each other by a guide mechanism composed of the guide member 510 and the groove 512 so that the first housing 501 and the second housing 502 are movable relative to each other.

A first wireless communication device 520 is provided in a part of the first housing 501 facing the second housing 502. A second wireless communication device 530 is provided in a part of the second housing 502 facing the first housing 501. The second wireless communication device 530 is elongated in a direction in which the second housing 502 slides. Therefore, the second wireless communication device 520 is configured to keep facing the first wireless communication device 520 even when the first housing 501 and the second housing 502 slide up and down relative to each other so that the size of the mobile phone 500 changes.

There is an antenna arrangement area 540 in each of the first wireless communication device 520 and the second wireless communication device 530. In the antenna arrangement area 540, the transmission antennas and the receiving antenna groups are arranged so that the transmission antennas and the receiving antenna groups included in the first wireless communication device 520 and the transmission antennas and the receiving antenna groups included in the second wireless communication device 530 face each other before and after the sliding motion, as illustrated in FIGS. 18A and 18B.

Figure 22:
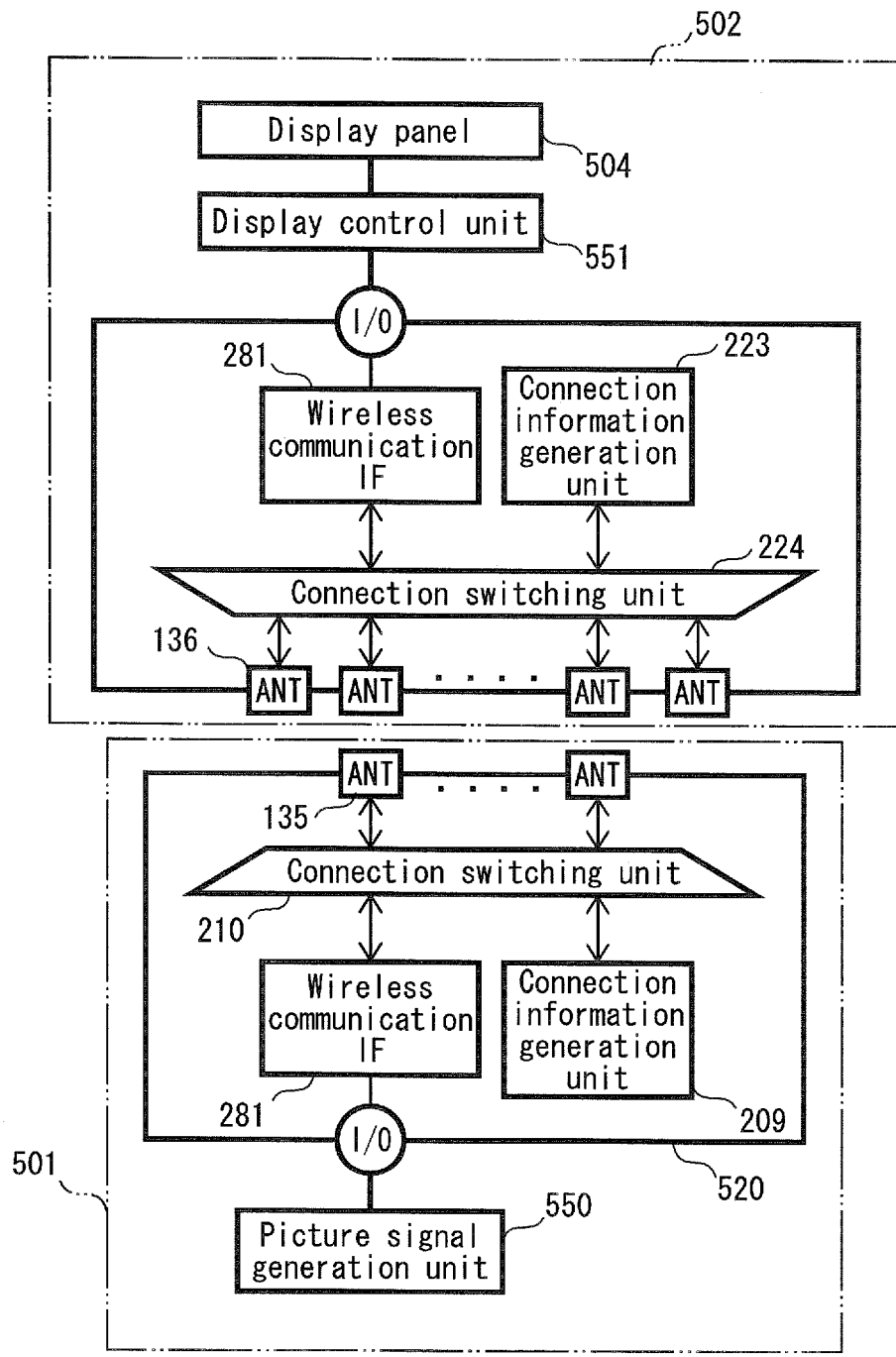
FIG. 22 is a block diagram of the wireless communication system in Modification 1 of Embodiment 5.

FIG. 22 shows a relation among the first wireless communication device 520, the second wireless communication device 520 and peripheral components included in the mobile phone 500. The first housing 501 includes a picture signal generation unit 550 for generating a signal of a picture to be displayed on the display panel 504. The picture signal generation unit 550 is connected to a relay terminal included in the first wireless communication device 520. The second housing 502 includes the display panel 504, and a display control unit 551 for controlling the display panel 504 so that a picture is displayed on the display panel 504. The display control unit 551 is connected to a relay terminal included in the second wireless communication device 520.

With the above-mentioned configuration, the picture signal output from the picture signal generation unit 550 is input into the display control unit 551 via the first wireless communication device 520 and the second wireless communication device 530. As a result, a picture is displayed on the display panel 504.

As described above, at least part of cable (signal lines) included in the mobile phone 500 can be replaced with two wireless communication devices.

Note that technology of establishing communication between circuit boards using a wireless communication interface is applicable to, in addition to the sliding-type mobile phone, a clamshell mobile phone, a wireless communication connector for connecting movable parts of equipment such as a robot and the like.

[Modification 2]

Figure 23:
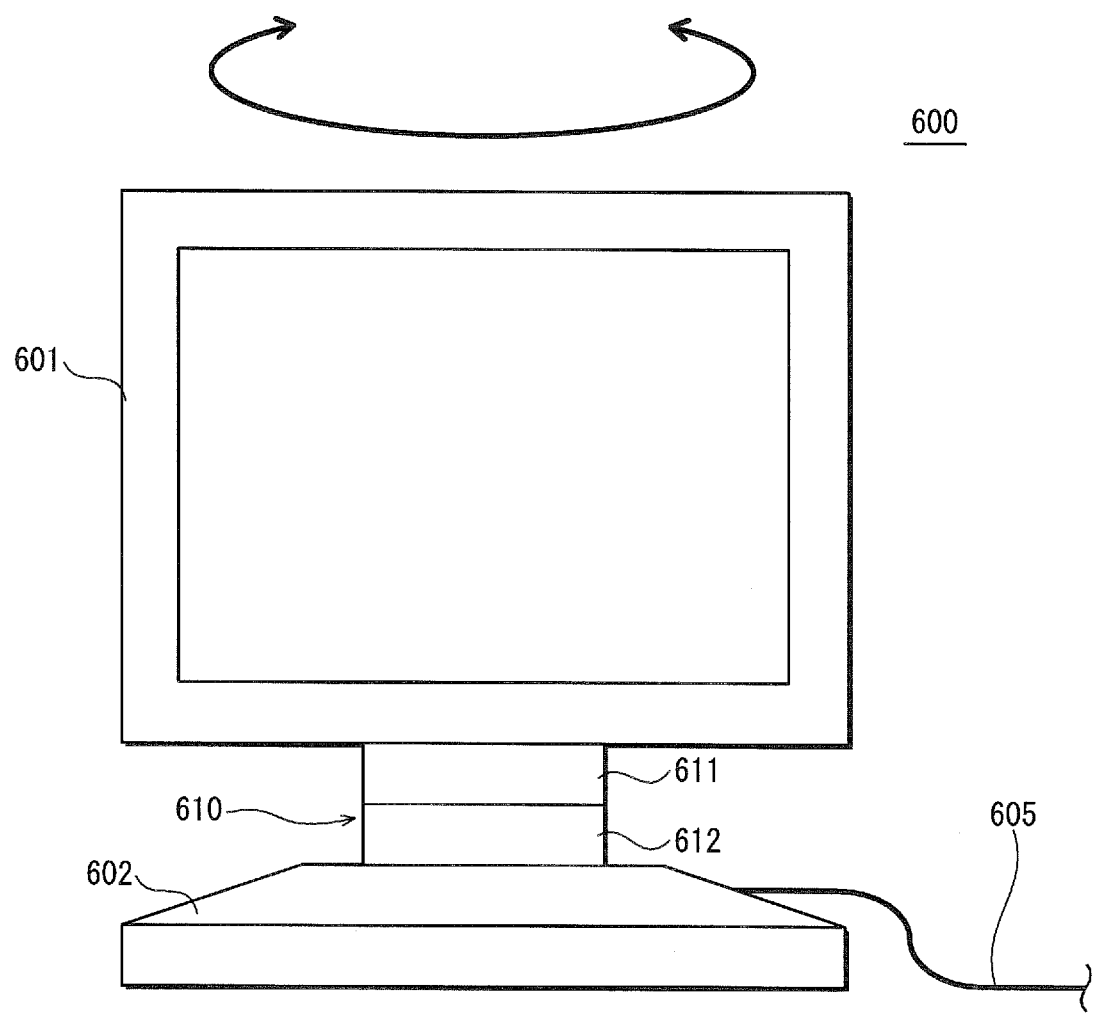
FIG. 23 is an outline view of a display device having a wireless communication system in Modification 2 of Embodiment 5.

FIG. 23 illustrates an example in which a wireless communication device in Embodiment 5 described above is applied to a display device 600.

The display device 600 includes a display unit 601, a stand 602 and a coupling member 610 for coupling the display unit 601 to the stand 602 so that they can turn relative to each other around a vertical axis. The coupling member 610 includes a first member 611 attached to the display unit 601 and a second member 612 attached to the stand 602. A signal line 605 for transmitting a picture signal and the like are connected to the stand 602.

Figure 24:
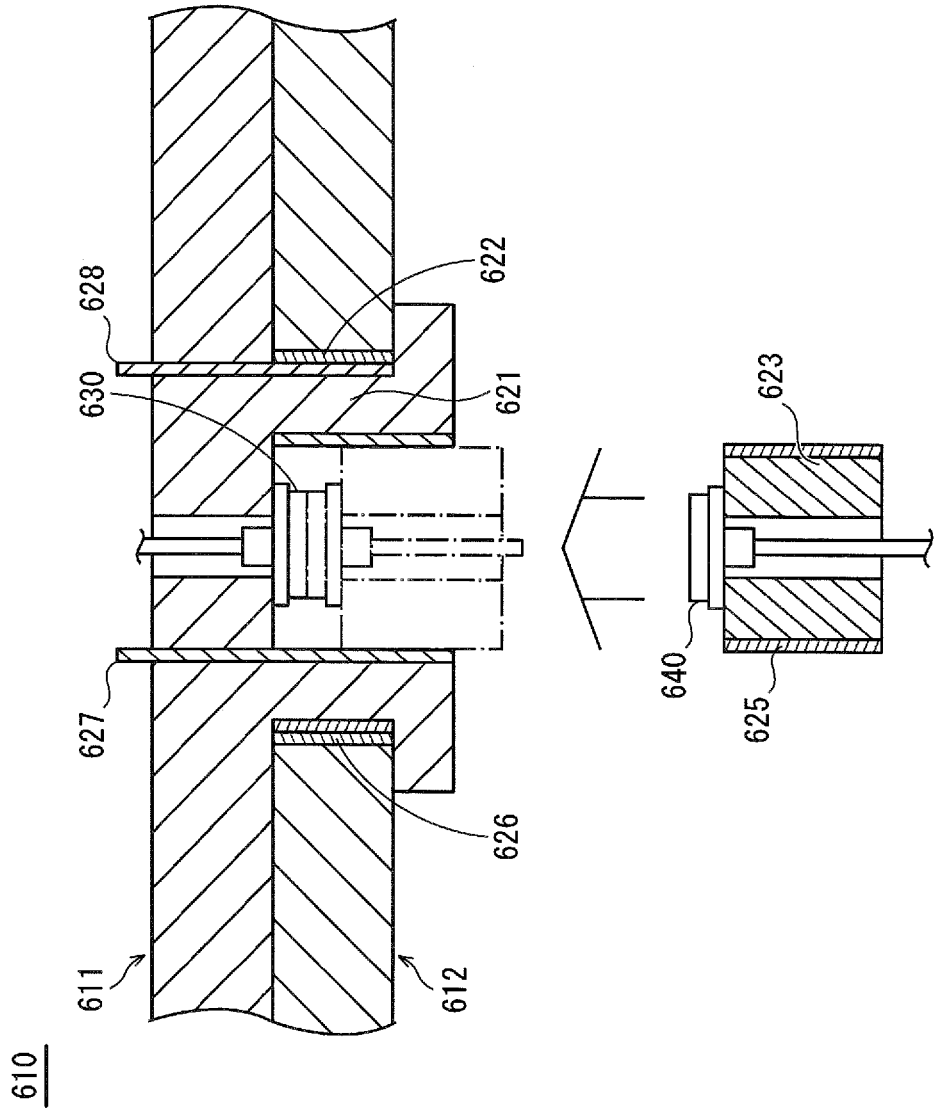
FIG. 24 is a sectional view of a coupling member 610 included in the display device.

FIG. 24 illustrates a cross-section of a principal part of the coupling member 610.

A cylindrical rotary shaft 621 is provided in a bottom plate of the first member 611. One end of the rotary shaft 621 (the lower end of the rotary shaft 621 in FIG. 24) has a flange. On the other hand, an opening 622 into which the rotary shaft 621 is inserted is formed in a top plate of the second member 612. By the rotary shaft 621 being inserted into the opening 622, the first member 611 and the second member 612 included in the coupling member 610 are made to turn relative to each other.

A first wireless communication device 630 is provided in a bottom face of the first member 611 on a center axis of the rotary shaft 621. On the other hand, a cylindrical bearing member 623 inserted into the rotary shaft 621 is provided to the second member 612. A second wireless communication device 640 is provided in a top face of the bearing member 623. Note that, although FIG. 24 illustrates a state where the bearing member 623 is spaced from the rotary shaft 621, in an assembled state of the coupling member 610, the bearing member 623 is fixed to the second member 612 while being inserted into the rotary shaft 621 as indicated by alternate long and two short dashes lines. In a state where the first wireless communication device 630 and the second wireless communication device 640 are in contact with each other, close-coupled wireless communication is established. Note that, when the first member 611 and the second member 612 turn relative to each other, the rotary shaft 621 and the bearing member 623 turn relative to each other. As described above, the first wireless communication device 630 and the second wireless communication device 640 are attached to respective members that are coupled together so as to turn relative to each other.

An electrode 625 is provided on an outer circumference of the bearing member 623, and an electrode 626 is provided on an inner circumference of the opening 622. Electrodes 627 and 628 are respectively provided on an inner circumference and an outer circumference of the rotary shaft 621. Power to be supplied to the display unit 601 is delivered between the electrodes 625 and 627, and between the electrodes 626 and 628.

Figure 25:
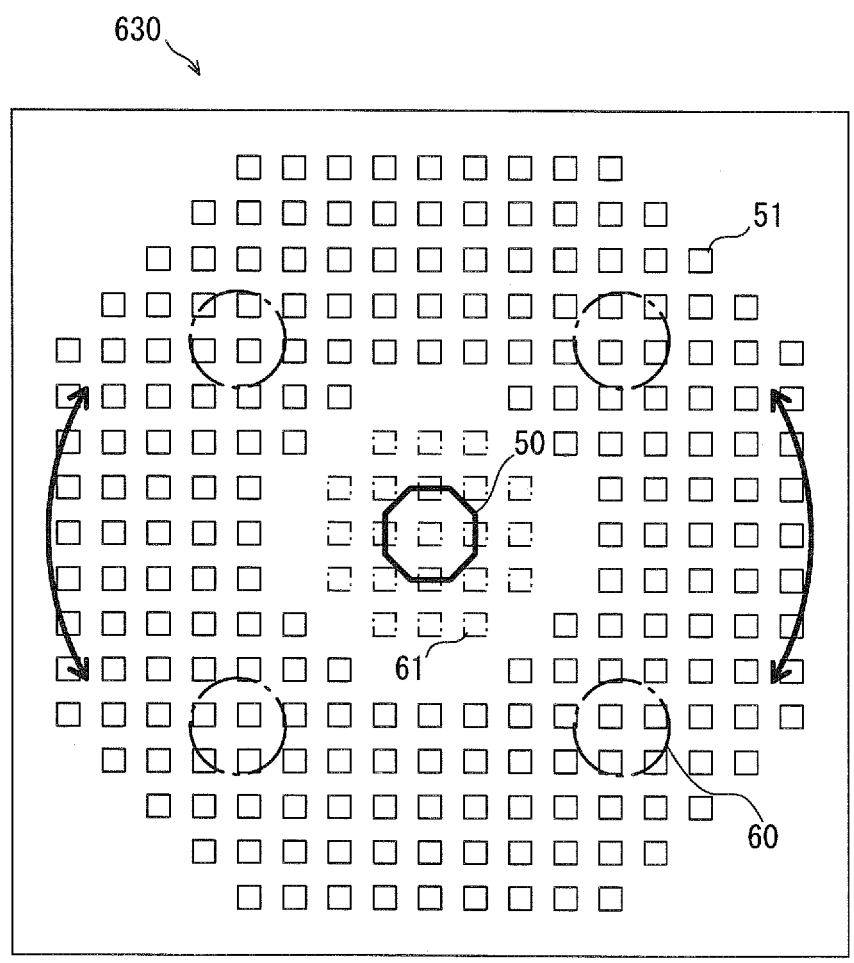
FIG. 25 schematically illustrates an arrangement pattern of antennas included in the wireless communication system in Modification 2 of Embodiment 5.

FIG. 25 schematically illustrates an arrangement pattern of antennas included in each of the first wireless communication device 630 and the second wireless communication device 640. Note that FIG. 25 illustrates the first wireless communication device 630 viewed from the second wireless communication device 640-side. In FIG. 25, antennas 50 and 51 included in the first wireless communication device 630 are indicated by solid lines, and antennas 60 and 61 included in the second wireless communication device 640 are indicated by chain lines.

The first wireless communication device 630 includes the transmission antenna 50 positioned in the center thereof, and the plurality of receiving antennas 51 circumferentially arranged around the transmission antenna 50. The second wireless communication device 640 includes the plurality of transmission antennas 60 circumferentially arranged around the transmission antenna 50, and the plurality of receiving antennas 61 positioned in a part facing the transmission antenna 50 and in a part around the transmission antenna 50.

With such a configuration, it is possible to establish close-coupled wireless communication regardless of the angle between the first wireless communication device 630 and the second wireless communication device 640 when they turn relative to each other around the transmission antenna 50.

In the present modification, one or more antennas connected to respective one or more modules are switched through processing similar to the communication connection update processing 3 in Embodiment 5. When the angle between the first wireless communication device 630 and the second wireless communication device 640 is changed, a change in positional relation is detected in the positional change detection processing, and the communication connection update processing 3 is performed.

Embodiment 6

In Embodiments 1, 2, 3 and 4 described above, a distance between any two adjacent antennas included in the first device is equal to the integer multiple of a distance between any two adjacent antennas included in the second device, in a longitudinal direction and in a transverse direction. Note that the first device indicates the first electronic circuit device or the first wireless communication device, and the second device indicates the first electronic circuit device or the first wireless communication device.

On the contrary, the distance between any two adjacent antennas included in the first device may be slightly larger or smaller than the integer multiple of the distance between any two adjacent antennas included in the second device, in a longitudinal direction and in a transverse direction.

First devices 117, 118 and 119 described later each have a similar configuration to the first device 100 in Embodiment 1, but differ from the first device 100 in the number and the arrangement of antennas. A second device 112 described later has a similar configuration to the first device 100 in Embodiment 1.

For comparison, the following describes a case where the distance between any two adjacent antennas included in the first device is equal to the integer multiple of the distance between any two adjacent antennas included in the second device, in a longitudinal direction and in a transverse direction.

Figure 26A:
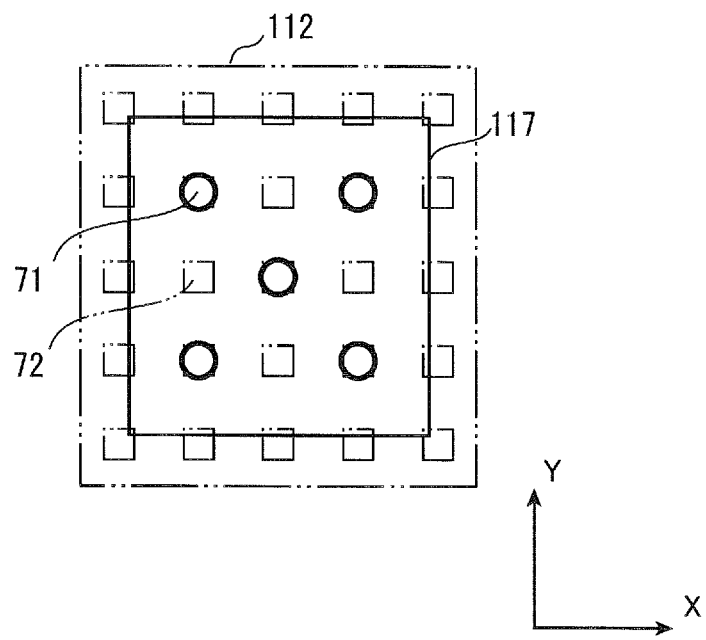
FIGS. 26A and 26B schematically illustrate arrangement patterns of antennas included in an electronic circuit system in Embodiment 6.
Figure 26B:
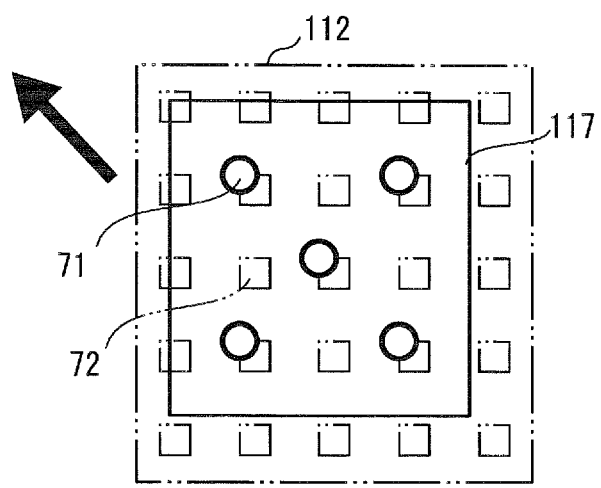

FIGS. 26A and 26B each schematically illustrate the first device 117 and the second device 112 each in a connection state. FIG. 26A illustrates a case where antennas 71 included in the first device 117 and antennas 72 included in the second device 112 are each in optimum positions. FIG. 26B illustrates a case where the positions of the antennas 71 are slightly shifted. Wireless communication between electronic circuit devices closely relates to a distance between antennas, the communication sensitivity and a facing area of two antennas facing each other. The facing area of two antennas facing each other indicates, in an orthogonal projection of each pair of coils viewed in a direction along a center line of one coil of the pair, an area that is enclosed by the one coil and overlaps with an area enclosed by the other coil of the pair.

Here, as with the first device 117 and the second device 112, in the case where a distance between any two adjacent antennas included in the first device is equal to the integer multiple of a distance between any two adjacent antennas included in the second device, maximum performance is achieved when a center of each antenna included in the first device and a center of each antenna included in the second device coincide with each other. When the centers do not coincide with each other, however, it is difficult to detect a direction in which the devices should be shifted to improve the sensitivity.

Figure 27A:
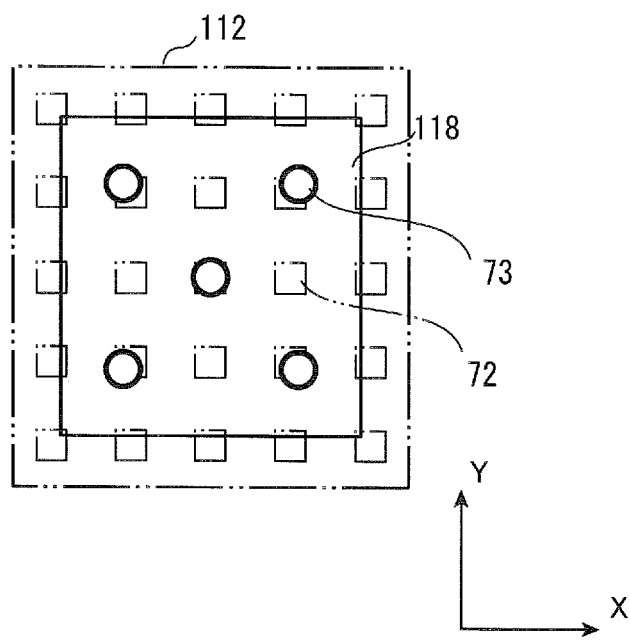
FIGS. 27A and 27B schematically illustrate arrangement patterns of antennas included in an electronic circuit system in Embodiment 6.
Figure 27B:
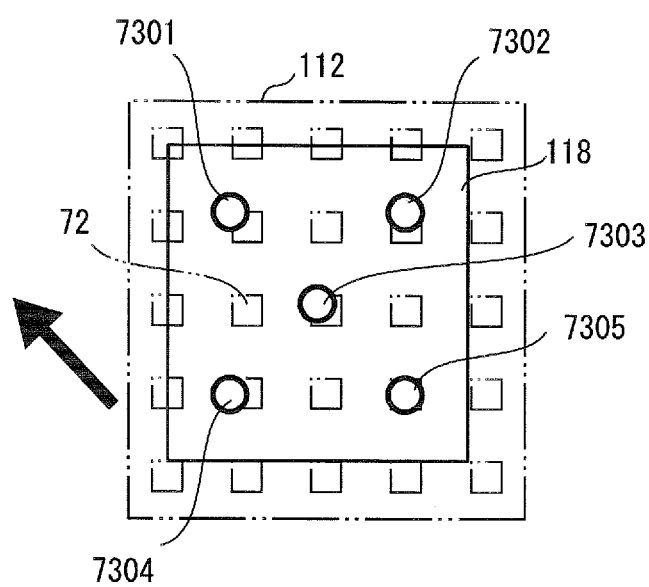

FIGS. 27A and 27B each schematically illustrate the positional relation between antennas included in the first device 118 and the antennas included in the second device 112 that are configured such that the distance between any two adjacent antennas included in the first device 118 is slightly larger than the distance between any two adjacent antennas included in the second device 112 in a longitudinal direction and in a transverse direction.

In FIG. 27A, four antennas 73 (7301, 7302, 7304, 7305) around an antenna 73 in the center have the same receiving signal intensity. When the positional relation between the antennas included in the first device 118 and the antennas included in the second device 112 illustrated in FIG. 27A is changed to that illustrated in FIG. 27B, the receiving signal intensity differs among the antennas 7301, 7302, 7303, 7304 and 7305 included in the first device 118. The receiving signal intensity of the antenna 7301 is simply the lowest, and the receiving signal intensity of the antenna 7305 is simply the highest. In such a case, the first device 118 should be shifted in a direction from one of the antenna 73 having lower receiving signal intensity to another one of the antenna 73 having higher receiving signal intensity. Note that a direction in which the second device 112 should be shifted is opposite to the direction in which the first device 118 should be shifted.

Figure 28A:
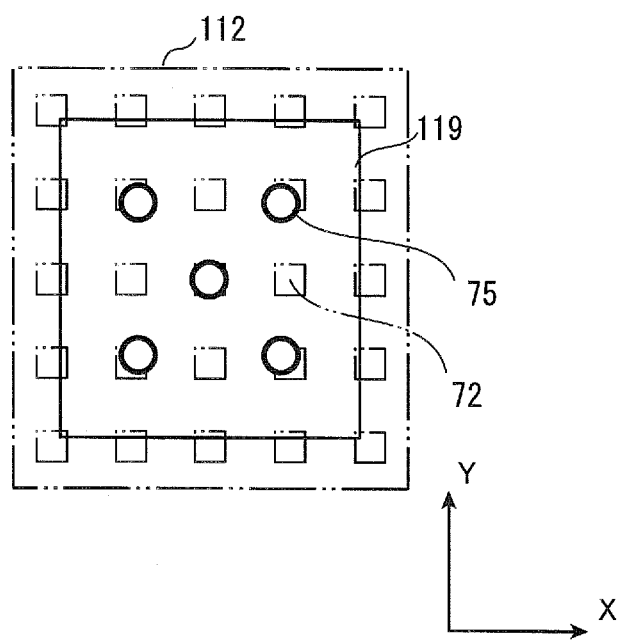
FIGS. 28A and 28B schematically illustrate other arrangement patterns of antennas included in the electronic circuit system in Embodiment 6.
Figure 28B:
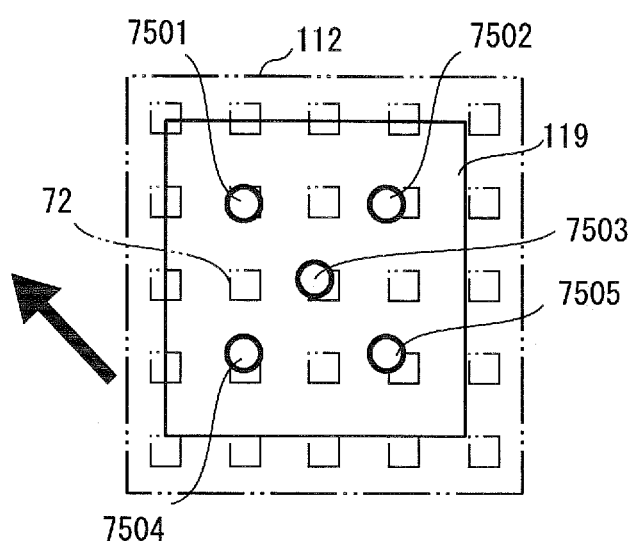

FIGS. 28A and 28B each schematically illustrate the positional relation between antennas included in the first device 119 and the antennas included in the second device 112 that are configured such that the distance between any two adjacent antennas included in the first device 119 is slightly smaller than the distance between any two adjacent antennas included in the second device 112 in a longitudinal direction and in a transverse direction.

In FIG. 28A, four antennas 75 around an antenna 75 in the center have the same receiving signal intensity. When the positional relation between the antennas included in the first device 119 and the antennas included in the second device 112 illustrated in FIG. 28A is changed to that illustrated in FIG. 28B, the receiving signal intensity differs among the antennas 7501, 7502, 7503, 7504 and 7505 included in the first device 119. The receiving signal intensity of the antenna 7501 is simply the highest, and the receiving signal intensity of the antenna 7505 is simply the lowest. In such a case, the first device 119 should be shifted in a direction from one of the antenna 75 having lower receiving signal intensity to another one of the antenna 75 having higher receiving signal intensity.

In each of FIGS. 27A and 28A, the facing area of the antennas included in each of the first devices 118 and 119 and the antennas 72 included in the second device 112 is made to be larger than a half of an area enclosed by an outline of each of the antennas 72 (four sides of each of the antennas 72 when each of the antennas 72 is assumed to be square-shaped). That is to say, the facing area falls within a range that enables the antennas included in each of the first devices 118 and 119 to keep facing the antennas 72 included in the second device 112. Note that, when a size of each of the antennas included in each of the first devices 118 and 119 is different from that of each of the antennas 74 included in the second device 112, the facing area is set based on antennas each having a smaller size.

Therefore, in a longitudinal direction and in a transverse direction, a distance D1 between any two adjacent antennas 73 included in the first device 118 is made to be larger than "N·D2", which is the product of N (N is a natural number) and a distance D2 between any two adjacent antennas 72 included in the second device 112, and to be smaller than "N·D2+L", which is the sum of "N·D2" and a length L of each of the antennas 74 in each of a longitudinal direction and in a transverse direction.

$$N \cdot D2 < D1 < N \cdot D2 + L \quad (1)$$

A distance D3 between any two adjacent antennas 75 included in the first device 119 in a longitudinal direction and in a transverse direction is expressed by:

$$N \cdot D2 - L < D3 < N \cdot D2 \quad (2)$$

Note that the distances D1, D2 and D3 each indicate a distance between centers of any two adjacent antennas in a longitudinal direction and in a transverse direction.

As described above, a distance between any two adjacent antennas included in each of the first devices 118 and 119 is made to be slightly different from a distance between any two adjacent antennas included in the second device 112. That is to say, the arrangement pattern of antennas included in each of the first devices 118 and 119 is made to be slightly different from that of antennas included in the second device 112.

With such a configuration, since the sensitivity differs among antennas when the change in positional relation between antennas occurs, it is possible to notify a user of an optimum direction to change the positional relation between the second device 112 and each of the first devices 118 and 119.

The facing area of two antennas facing each other described above may be made to be larger than 70% of an area enclosed by one of the two antennas. In this case, "L" in each of the above-mentioned expressions (1) and (2) is replaced with "0.6·L".

Embodiment 7

Figure 29:
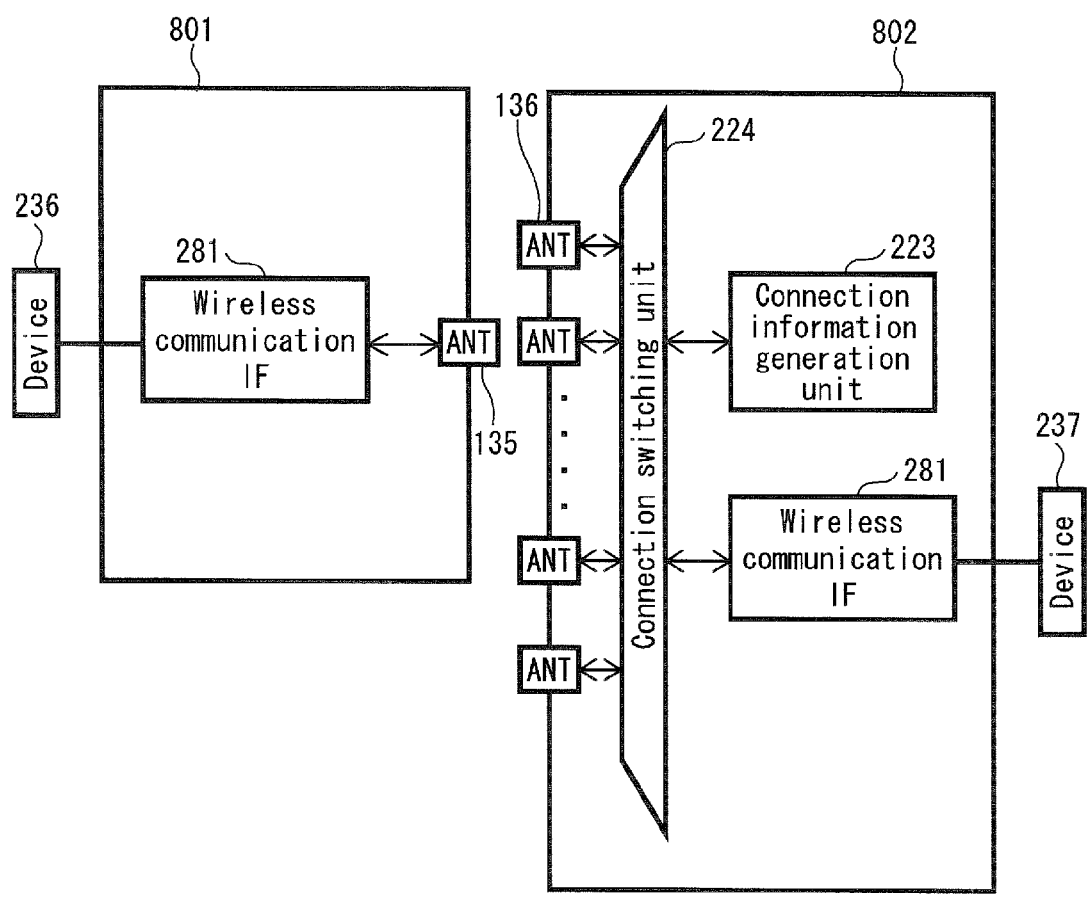
FIG. 29 is a block diagram of a wireless communication system in Embodiment 7.

FIG. 29 illustrates a configuration of a wireless communication system.

In the present embodiment, the wireless communication system is composed of a first wireless communication device 801 and a second wireless communication device 802. The first wireless communication device 801 includes an antenna 135 and a wireless communication IF 281 connected to the antenna 135. The wireless communication IF 281 is connected to an external device 236. The second wireless communication device 802 has a similar configuration to the second wireless communication device 113 described above.

With such a configuration, it is possible to establish close-coupled wireless communication in a state where the antenna 135 included in the first wireless communication device 801 faces one of the plurality of antennas 136 included in the second wireless communication device 802. The second wireless communication device 802 may select one of the antennas 136 for use in wireless communication by using the connection information generation unit 223, and may connect the selected one of the antennas 136 to the wireless communication IF 281 by using the connection switching unit 224. As a result, wireless communication is established between the devices 236 and 237.

When the communication connection update processing is performed, a signal output from the external device 236 is transmitted from the first wireless communication device 801.

Embodiment 8

In Embodiment 1, 2 and 3 described above, each of the memories 221 and 222 is connected to a corresponding one of the antennas 12. However, each of the memories 221 and 222 may be connected to corresponding two of the antennas 12.

A configuration of an electronic circuit system in the present modification is the same as that in Embodiment 2 described above except for an IF connected to each of the connection switching units 210 and 223. Therefore, the same reference numbers are assigned to the same components as that illustrated in FIG. 13. The following describes each component to which the same reference number as that in Embodiment 2 is assigned but which has a different configuration from that in Embodiment 2.

Figure 30:
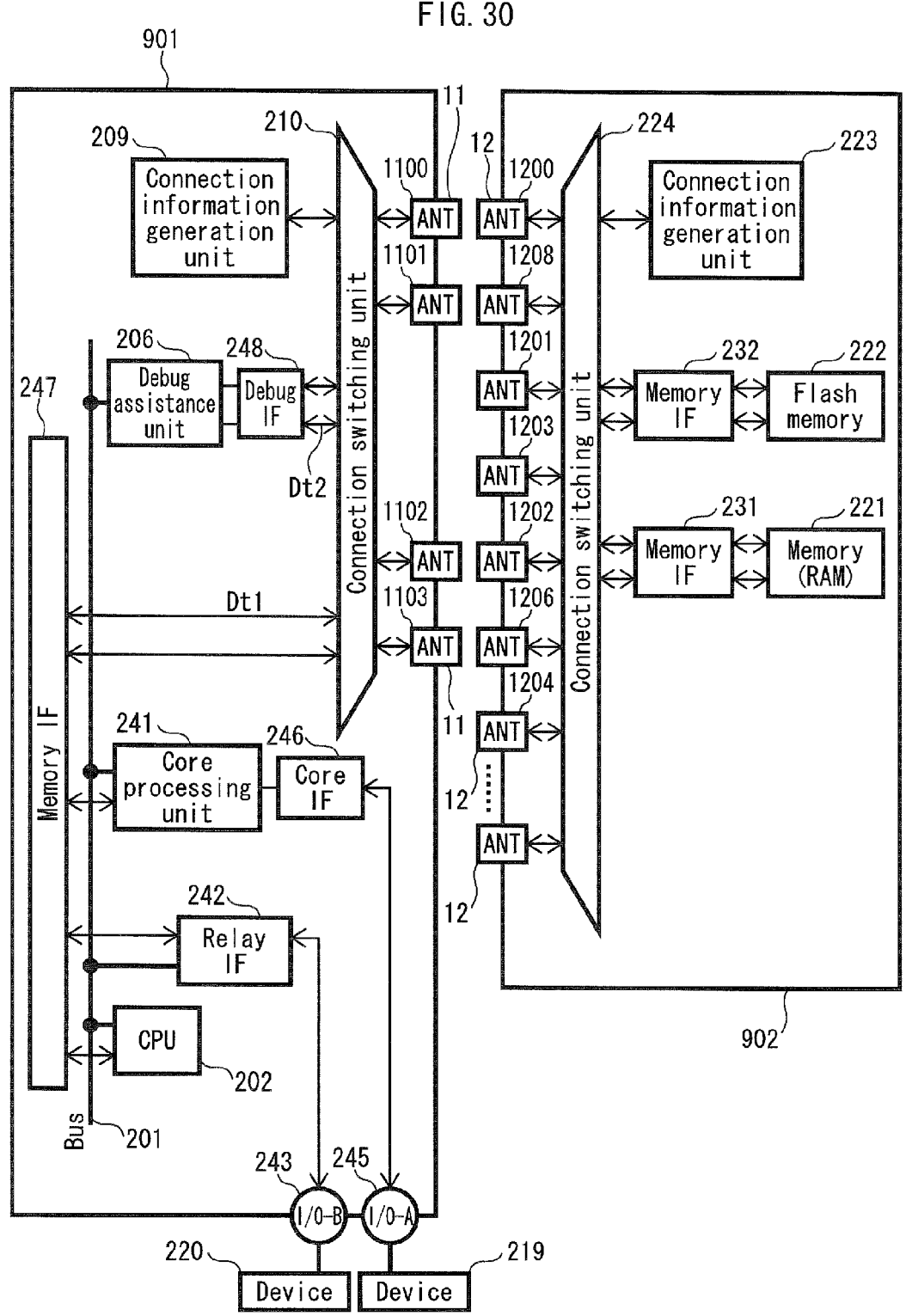
FIG. 30 is a block diagram of an electronic circuit system in Embodiment 8.
Figure 31:
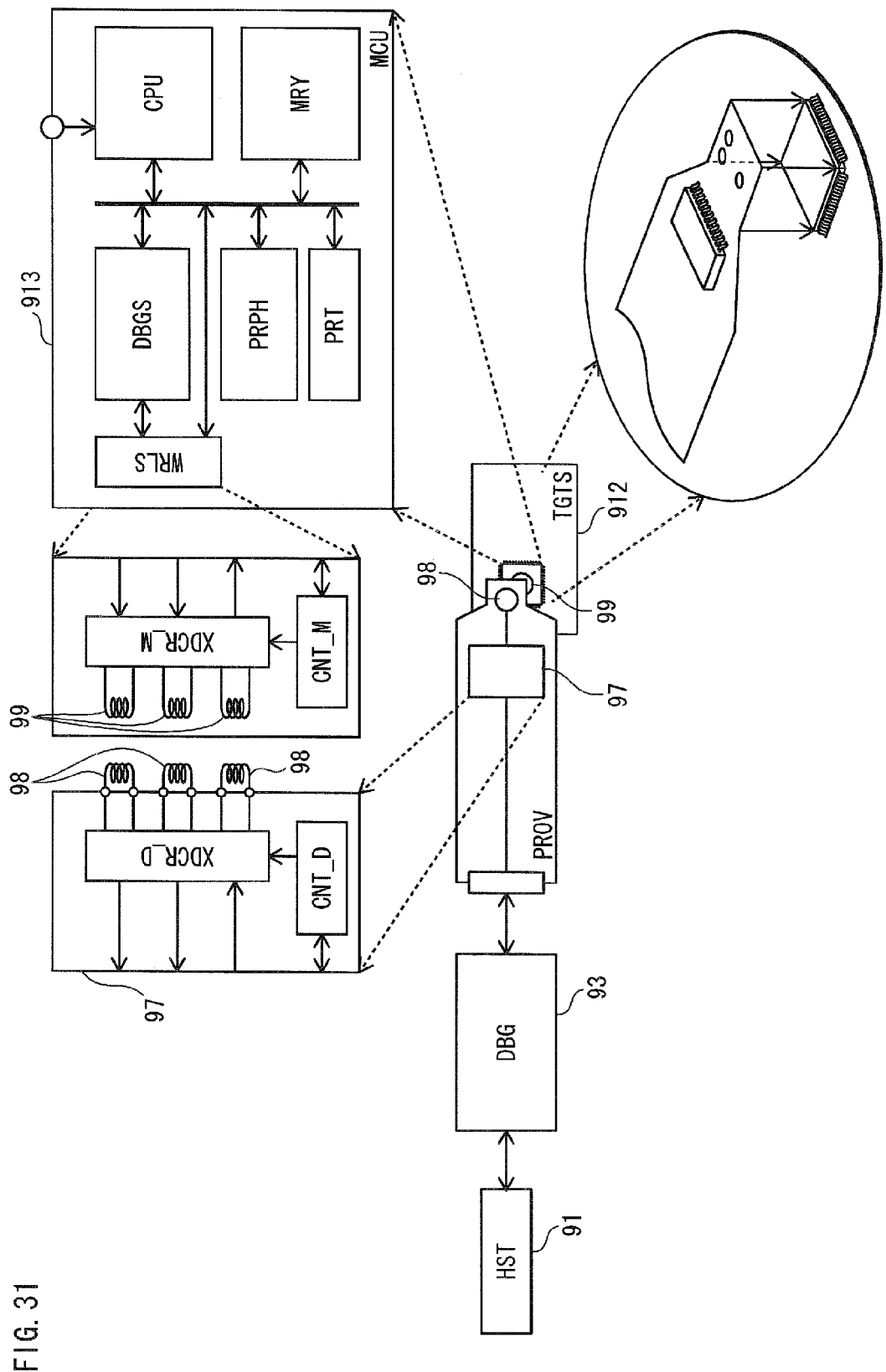
FIG. 31 illustrates a configuration of a conventional device having a wireless communication interface.

FIG. 30 is a block diagram illustrating a configuration of an electronic circuit system in the present modification.

Each of the memory IF 247 and the debug IF 248 included in the first device 901, and the memory IFs 231 and 232 included in the second device 902 includes two serial interface circuits, similarly to the IF 217 in Embodiment 1. The above-mentioned IFs 247 and 248 are each connected to the connection switching unit 209 such that the two serial interface circuits are connected to the connection switching unit 209 via different signal lines, and the above-mentioned IFs 231 and 232 are each connected to the connection switching unit 223 such that the two serial interface circuits are connected to the connection switching unit 223 via different signal lines. As a result, it is possible to connect two antennas to each of the IFs 247, 248, 231 and 232.

Also, the debug assistance unit 206 includes two input/output units that are connected in parallel to the two serial interface circuits included in the debug IF 248. With such a configuration, the debug assistance unit 206 is capable of separately transmitting/receiving signals (e.g. a control signal and data) via the two serial interface circuits. The CPU 202, the relay IF 242 and the core processing unit 241 are each connected to the memory IF 247 via two input/output units similarly to the debug assistance unit 206, although this is not illustrated in FIG. 30.

Here, assume that the following connection relation is set by performing the communication connection update processing 1 or 2. Note that a debug IF 248a indicates a part of the debug IF 248 having a first serial interface circuit, and a debug IF 248b indicates a part of the debug IF 248 having a second serial interface circuit. The same applies to the memory IF 231 and the like.

(a) Debug IF 248a—antenna 1100 . . . antenna 1200—memory IF 231a (b) Debug IF 248b—antenna 1101 . . . antenna 1208—memory IF 231b (c) Memory IF 247a—antenna 1102 . . . antenna 1202—memory IF 232a (d) Memory IF 247b—antenna 1103 . . . antenna 1206—memory IF 232b As shown above, the debug IF 248 included in the first device 901 is connected to the memory IF 231 included in the second device 902 via two pairs of antennas (antennas 1100 and 1200, antennas 1101 and 1208). The same applies to the memory IFs 247 and 232.

One of the two pairs of antennas (e.g. antennas 1100 and 1200) is used for transmitting a control signal (command and address) from the first device 901 to the second device 902. The other one of the two pairs of antennas (e.g. antennas 1101 and 1208) is used for transmitting/receiving data.

The following describes half duplex communication established in processing of reading data from the memory 221 performed by the debug assistance unit 206.

When performing the data reading processing, the debug assistance unit 206 serially transmits a read command and a read address via the debug IF 207a. The debug IF 207b waits to receive data transmitted from the memory 221. Specifically, the debug IF 207b is connected to the driver 151 connected to the antenna 1101 via a control line different from a signal line and a switch similar to the switch 210a. A control signal for switching the driver 151 to a reception state is transmitted via the control line.

The memory IF 231a transfers the read command and the read address after parallel conversion to the memory 221. When receiving the read command and the address from the memory IF 231a, the memory 221 reads data from the specified address and transmits the read data to the memory IF 231b.

Similarly to the debug IF 207b, the memory IF 231b is connected to the driver 161 for driving the antenna 1208 via a control line and the like. When transmitting data using the antenna 1208, the memory IF 231b transmits a control signal to the driver 161 via the control line to switch the driver 161 to a transmission state. The memory IF 231b then temporarily stores the data received from the memory 221 in a buffer, and transmits the data stored in the buffer to the driver 161 for driving the antenna 1208. As a result, the data is wirelessly transmitted from the antenna 1208 to the antenna 1101.

Note that, in processing of writing data to the memory 221, the debug IF 207b switches the driver 151 to a transmission state for data transmission. Also, in the processing of writing data to the memory 221, the memory IF 231b switches the driver 161 to a reception state for data reception.

The half duplex communication using the antennas 1101 and 1208 is established in the above-mentioned manner.

Although one of the two pairs of antennas is used for transmitting a command in the present modification, data may be transmitted/received using the two pairs of antennas.

Although the connection information generation units 209 and 223 are not connected to respective antennas after the communication connection update processing in the present modification, the number of pairs of antennas may be increased by increasing the number of antennas included in the first device 901 to connect the connection information generation units 209 and 223 to the respective antennas.

[Supplement]

(a) The embodiments and modifications described above are merely examples of the present invention. Therefore, various improvements and modifications may be made without departing from the technical scope of the present invention.

(b) In each embodiment described above, description is made by taking a case where each of the first and second electronic circuit devices includes a plurality of antennas as an example. The present invention, however, may have a configuration in which one of the first and second electronic circuit devices includes a single antenna and the other one of the first and second electronic circuit devices includes a plurality of antennas. Even if the present invention has the above-mentioned configuration, it is possible to establish data communication between devices without being affected by the positional relation between devices and sizes of devices as the single antenna can be in an optimum position with respect to one of the plurality of antennas.

(c) In Embodiments 1 to 6 described above, description is made by taking, as an example, an electronic circuit system composed of the first electronic circuit device debugged by a debugger and the second electronic circuit device as the debugger. The electronic circuit system, however, is not limited to a debug system performing debugging. The present invention is applicable to any system performing close-coupled wireless communication between electronic circuit devices.

(d) In Embodiment 1 describe above, description is made by taking, as an example, a case where antennas are installed in each of the first electronic circuit device 100 and the second electronic circuit device 101. The antennas included in each of the first electronic circuit device 100 and the second electronic circuit device 101, however, may be mounted on a package board or an external circuit board such as an electronic circuit board.

(e) In each embodiment described above, wireless communication utilizing magnetic field coupling of near magnetic fields is taken as an example of communication using antennas. In addition to the wireless communication utilizing electromagnetic waves, wireless communication utilizing electric field coupling of near electric fields may be established.

(f) In the communication connection update processing in Embodiment 1 described above, the test signals may be transmitted from all of the antennas in the steps S11 and S23.

(g) In the communication connection update processing in Embodiment 1 described above, the identification information of each antenna may be transmitted instead of the test signal in the steps S11 and S23. In this case, the identification information of each antenna is received in the steps S12 and S21.

(h) The connection information generation unit 209 may be directly connected to the CPU 202, the debug assistance unit 206 and the like via signal lines without being connected to the bus 201 (alternatively, the connection information generation unit 209 may be directly connected to the CPU 202, the debug assistance unit 206 and the like via signal lines and the bus 201). In this case, an instruction to start the communication connection update processing and the like are received from the CPU 202, the debug assistance unit 206 and the like via the signal lines. Also, the connection information generation unit 209 may notify the CPU 202, the debug assistance unit 206 and the like of the completion of the communication connection update processing via the signal lines (the completion may also be notified via the bus 201). Other connection information generation units including the connection information generation unit 213 may also be connected to each module via buses, or may directly be connected to each module via signal lines.

(j) In each embodiment and modification described above, antennas are connected not only to modules included in each electronic circuit but also to the connection information generation unit after the communication connection update processing. This, however, is not essential. All of the selected one or more antennas may be connected to modules. In this case, the change in positional relation may be detected by any modules (e.g. the CPU, the debug processing unit, the debug assistance unit) included in each electronic circuit or an external device.

(k) In each embodiment and modification described above, a driver is connected between each antenna and the connection switching unit. This, however, is not essential. For example, an IF (the wireless communication IF 205, the IF 231 and the like) may function as the driver, or the driver may be omitted.

For example, the IF (the wireless communication IF 205, the IF 231 and the like) may have a function of negotiating about the start of communication with an IF included in a device as a communication target, or a function of transmitting a signal to which a synchronization signal has been added and synchronizing with a receiving signal including a synchronization signal.

(m) In each of Embodiments 1 to 7 and modifications thereof described above, the electronic circuit modules (e.g. the wireless communication IF 205 and the like) and the connection switching unit are serially connected. They, however, may be connected in parallel. Note that, when they are connected in parallel, signals are transmitted to a single module using a plurality of antennas.

Furthermore, modules may be connected to the connection switching unit via a plurality of signal lines to connect them in parallel when there are many antennas to establish communication, and to serially connect them when there are few antennas to establish communication. In this case, the IFs 205 and 217 and the like each may have a serial interface function and a parallel interface function.

Furthermore, the IFs 205 and 217 and the like each may include a plurality of serial interface circuits, and an antenna may be connected to each of the serial interface circuits. In this case, a larger amount of data can be transmitted/received using the plurality of antennas.

(n) In each of Embodiments 1 to 7 and modifications thereof described above, modules included in the first device (the wireless communication IF 205 and the like) and modules included in the second device (memory 221) establish half duplex communication. They, however, may establish full duplex communication. In this case, for example, each module (wireless communication IF 205, the IF 231 and the like) may include a serial interface for transmission and a serial interface for reception, and full duplex communication may be established by using one of two pairs of antennas for transmission and using the other of the two pairs of antennas for reception.

(p) In each of Embodiments 1 to 7 and modifications thereof described above, when there are many signals transmitted between the first and second devices, the number of used antennas may be reduced by converting a signal to be transmitted in parallel into a signal to be serially transmitted within the memory IF 247 and the debug IF 248. Furthermore, a transmission rate at which communication is established using one or more pairs of the antennas 11 and the antennas 12 may be increased, and multiplexing technique and the like may be used.

In contrast, when there are more antennas than signals to be transmitted (modules to be connected), so-called diversity technique may be used to, for example, select a signal of high communication quality by transmitting the same signal using a plurality of pairs of antennas, and to transmit a single signal using a plurality of pairs of antennas while decreasing a transmission rate.

(q) In each of Embodiments 1 to 6 and modifications thereof described above, although the first electronic circuit device (first wireless communication device) is a master device and the second electronic circuit device (second wireless communication device) is a slave device, they may be reversed.

(r) In each embodiment and modification described above, although the communication connection update processing is performed upon receiving the instruction to start the processing from the external device 301, the host PC 228 and the like or upon detecting a change in positional relation in the positional change detection processing, the communication connection update processing may be performed at other timings. For example, when power is supplied to the connection information generation unit, the connection information generation unit may perform the communication connection update processing first. Alternatively, a signal line into which an external signal is to be input may be connected to the connection information generation unit, and the connection information generation unit may perform the communication connection update processing when a command is input into the signal line.

(s) In each embodiment and modification described above, in the communication connection update processing, the connection information is generated based on the results of the test communication processing. In contrast, the connection information generation unit may be configured to obtain information concerning communication such as the results of communication established using antennas. In this case, the connection information generation unit may generate, from the obtained information concerning communication, the connection information indicating the connection state to establish communication using antennas including a non-connection state.

In this case, output of each antenna (or each driver) may be bifurcated to connect one of the output to the connection information generation unit and the other one of the output to the IF 231 and the like. The connection information generation unit may include as many serial interface circuits as antennas, and may individually obtain signals transmitted/received using antennas connected to respective interface circuits.

(t) In each embodiment and modification described above, the test signal is transmitted in the test communication processing. The test signal is a signal to confirm whether the signal can be transmitted/received between two antennas facing each other, and thus is not limited to a specific series of signals (e.g. a repeat of a value "110"). A signal indicating identification information of each antenna or communication data may be used as the test signal. Note that, when a specific series of signals in which one of values "1" and "0" is included more than the other one of the values is used (e.g. when the repeat of the value "110" is used), it is possible to confirm whether a receiving signal is inverted.

(u) In each embodiment and modification described above, the identification information of each of the antennas 11 is transmitted from the first device in the communication connection update processing. Instead of transmitting the identification information of each of the antennas 11, however, the identification information of each of modules to be connected to the antennas 11 may be transmitted, for example. The second device can generate the connection information once each of modules connected to the antennas 12 included in the second device using the antennas 11 included in the first device is identified.

In this case, the connection information generation unit 213 included in the second device may have stored, in the storage unit, the module correspondence information indicating correspondence between pieces of identification information of modules included in the first device and pieces of identification information of modules included in the second device. The second device may set the connection relation between the antennas and the modules included in the second device (generate the connection information) in accordance with the module correspondence information so that the modules included in the second device appropriately correspond to respective modules included in the first device.

(v) The following describes a configuration and advantages of various handheld terminals pertaining to each embodiment.

(1) An electronic circuit system pertaining to each embodiment is an electronic circuit system comprising a first electronic circuit device and a second electronic circuit device, the first electronic circuit device including a first antenna and a first electronic circuit connected to the first antenna, the second electronic circuit device including a plurality of second antennas and a second electronic circuit connected to one or more of the plurality of second antennas, the first and second electronic circuit devices establishing close-coupled wireless communication with each other in such a state that a part of the first electronic circuit device in which the first antenna is positioned and a part of the second electronic circuit device in which the plurality of second antennas are positioned face each other, wherein the second electronic circuit device further includes: a connection information generation unit configured to select one of the plurality of second antennas to be paired with the first antenna for use in close-coupled wireless communication, and generate connection information indicating that the selected second antenna is to be connected to the second electronic circuit; and a connection switching unit configured to switch the one or more second antennas connected to the second electronic circuit in accordance with the connection information.

In the electronic circuit system described in this section, the second electronic circuit device (hereinafter, referred to as a "second device") includes the plurality of second antennas, the connection information generation unit and the connection switching unit, and connects the one or more of the plurality of second antennas for use in wireless communication to the second electronic circuit. In addition, the second device establishes wireless communication in a state where one of the plurality of second antennas face the first antenna included in the first electronic circuit device (hereinafter, referred to as a "first device"). Therefore, the positional relation between the first and second devices is selected from among a plurality of positional relations enabling the first and second devices to establish wireless communication. The electronic circuit system is less likely to be limited by the positional relation between the first and second devices. Hereinafter, the first and second devices are also collectively referred to as "two devices".

Note that, in the connection information, a target to be connected to the selected second antenna is the second electronic circuit included in the second device itself. A target to be switched by the connection switching unit is the one or more second antennas connected to the second electronic circuit included in the second device itself.

(2) The electronic circuit system pertaining to each embodiment may be an electronic circuit system comprising a first electronic circuit device and a second electronic circuit device, the first electronic circuit device including a plurality of first antennas and a first electronic circuit connected to one or more of the plurality of first antennas, the second electronic circuit device including a plurality of second antennas and a second electronic circuit connected to one or more of the plurality of second antennas, the first and second electronic circuit devices establishing wireless communication with each other in such a state that a part of the first electronic circuit device in which the plurality of first antennas are arranged and a part of the second electronic circuit device in which the plurality of second antennas are arranged face each other, wherein the first electronic circuit device further includes: a first connection information generation unit configured to select one or more of the plurality of first antennas to be paired with respective one or more of the plurality of second antennas for use in wireless communication, and generate first connection information indicating that the selected one or more first antennas are to be connected to the first electronic circuit; and a first connection switching unit configured to switch the one or more first antennas connected to the first electronic circuit in accordance with the first connection information, and the second electronic circuit device further includes: a second connection information generation unit configured to select one or more of the plurality of second antennas to be paired with respective one or more of the plurality of first antennas for use in wireless communication, and generate second connection information indicating that the selected one or more second antennas are to be connected to the second electronic circuit; and a second connection switching unit configured to switch the one or more second antennas connected to the second electronic circuit in accordance with the second connection information, the first connection information generation unit is connected to the plurality of first antennas via the first connection switching unit, the second connection information generation unit is connected to the plurality of second antennas via the second connection switching unit, the first and second connection information generation units perform test communication processing of experimentally transmitting and receiving signals using the plurality of first antennas and the plurality of second antennas, and respectively generate the first connection information and the second connection information based on results of the test communication processing.

In the electronic circuit system described in this section, the first device includes the plurality of first antennas, the first connection information generation unit and the first connection switching unit, and the second device includes the plurality of second antennas, the second connection information generation unit and the second connection switching unit. In this case, the first and second devices need to learn about antennas for use in wireless communication. By the second connection information generation unit performing the test communication processing, the second device learns about the antennas for use in wireless communication. Therefore, when the positional relation between the first and second devices is selected from among the plurality of positional relations enabling the first and second devices to establish wireless communication, it becomes easy to connect antennas and electronic circuits.

(3) In the electronic circuit system pertaining to each embodiment, the first connection switching unit may switch the one or more first antennas connected to the first electronic circuit by switching one or more of first signal lines via which the one or more first antennas are connected to the first electronic circuit, the second connection switching unit may switch the one or more second antennas connected to the second electronic circuit by switching one or more of second signal lines via which the one or more second antennas are connected to the second electronic circuit, the first connection information generation unit may select two or more of the plurality of first antennas to be paired with respective two or more of the plurality of second antennas, and generate first connection information indicating that the selected two or more first antennas are to be connected to the first electronic circuit via two or more of the first signal lines, the second connection information generation unit may select two or more of the plurality of second antennas to be paired with respective two or more of the plurality of first antennas, and generate second connection information indicating that the selected two or more second antennas are to be connected to the second electronic circuit via two or more of the second signal lines, in the test communication processing, the first connection information generation unit may transmit pieces of identification information that differ among the plurality of first antennas from each of the plurality of first antennas, and when the transmitted pieces of identification information are received, the second connection information generation unit may determine the two or more second signal lines via which the selected two or more second antennas are connected to the second electronic circuit, based on the received identification information.

In the electronic circuit system described in this section, the plurality of signal lines are connected to each electronic circuit. It is necessary that at least the second connection switching unit appropriately connects the one or more second antennas for use in wireless communication to respective one or more of second signal lines. By, for example, receiving the identification information of each first antenna transmitted from the first device, the second device identifies the one or more first antennas to be paired with the respective one or more second antennas used to receive the identification information.

After the one or more first antennas are identified, the one or more second antennas are appropriately connected to the respective one or more second signal lines in the following manner.

For example, when the connection relation between the one or more first antennas and the respective one or more first signal lines is already defined, the one or more second antennas are appropriately connected to the respective one or more second signal lines by identifying the one or more first antennas. In this case, the second device has stored, in the storage unit, information indicating correspondence between the identification information of each first antenna and each second signal line.

When, for example, the second connection information generation unit has stored information about each first signal line, the second connection information generation unit generates connection information indicating one or more first signal lines via which the respective one or more first antennas are connected, and transmits the generated connection information to the first device. According to the connection information transmitted to the first device, the connection relation between the one or more second antennas and the respective one or more second signal lines is defined.

Note that the identification information transmitted from the first device may be identification information of each first signal line (or electronic circuit module) via which a corresponding one of the first antennas is connected. The second device generates the connection information once each of modules connected to the second antennas via the first antennas is identified.

(4) In the electronic circuit system pertaining to each embodiment, the number of the plurality of second antennas may be greater than the number of the selected two or more second antennas.

In the electronic circuit system described in this section, the number of second antennas is greater than the number of second antennas for use in wireless communication. Therefore, at least one of the following is possible: to increase the positional relations enabling the two devices to establish wireless communication; and to adapt to a difference in the number and the arrangement of the first antennas.

(5) In the electronic circuit system pertaining to each embodiment, the first electronic circuit device may further include a first circuit board on which a plurality of first coils functioning as the plurality of first antennas are formed, the second electronic circuit device may further include a second circuit board on which a plurality of second coils functioning as the plurality of second antennas are formed, and the first and second circuit boards may be positioned close to each other in such a state that a surface of the first circuit board on which the plurality of first coils are formed and a surface of the second circuit board on which the plurality of second coils are formed face each other.

In the electronic circuit system described in this section, when wireless communication utilizing inductive coupling (magnetic field coupling) between coils is established, it is necessary to arrange antennas included in the two devices so as to be close to each other as a communication distance (e.g. 5 mm or less) is very short in such wireless communication. In the electronic circuit system described in this section, by forming the coils on the circuit board, it becomes easy to handle the two devices as it becomes easy to arrange the coils functioning as the antennas included in the two devices so as to be close to each other.

(6) In the electronic circuit system pertaining to each embodiment, in an orthogonal projection of each pair of the plurality of first and second coils viewed in a direction along a center line of one coil of the pair, more than half of an area enclosed by the one coil of the pair may overlap with an area enclosed by the other coil of the pair.

In wireless communication utilizing inductive coupling, it is necessary to arrange the coils functioning as the antennas so as to face each other. In this case, wireless communication is established if more than half of the area enclosed by the one coil overlaps with the area enclosed by the other coil when the two coils are viewed in a direction along the center line of the one coil. Note that, when the sizes of the two coils differ from each other, a smaller one of the two coils is the one coil. Furthermore, more than 70% of the area enclosed by the one coil may overlap with the area enclosed by the other coil.

(7) In the electronic circuit system pertaining to each embodiment, one or more signals may be intermittently transmitted/received between the first and second connection information generation units using one or more pairs of the plurality of first and second antennas, and when intensity of each of the one or more signals becomes equal to or lower than a threshold, the first and second connection information generation units may perform the test communication processing and respectively generate the first connection information and the second connection information.

When a signal becomes unable to be transmitted/received between the one or more pairs of antennas, the change in positional relation between the two devices is judged to occur. By performing the test communication processing, it becomes possible to select antennas to establish wireless communication again after the change in positional relation occurs. The threshold may be a value indicating signal intensity when more than half of the area enclosed by the one coil does not overlap with the area enclosed by the other coil, contrary to the case described in the previous section. Note that, when transmission antennas and receiving antennas are used, the signal may be transmitted/received using two pairs of antennas.

(8) In the electronic circuit system pertaining to each embodiment, the first connection information generation unit may select the one or more first antennas to be paired with the respective one or more of the plurality of second antennas based on communication quality of each of the plurality of first antennas in the test communication processing, and the second connection information generation unit may select the one or more second antennas to be paired with the respective one or more of the plurality of first antennas based on communication quality of each of the plurality of second antennas in the test communication processing.

In the electronic circuit system described in this section, when two antennas receive a signal transmitted from a single antenna, one of the two antennas of high communication quality is selected in accordance with such a selection criterion that an antenna having high receiving signal intensity or an antenna with less noise is selected.

(9) In the electronic circuit system pertaining to each embodiment, an arrangement pattern of the plurality of second antennas may correspond to an arrangement pattern composed of a plurality of duplicates of a mirror image of an arrangement pattern of the plurality of first antennas.

In the electronic circuit system described in this section, there are a plurality of positional relations enabling the two devices to establish wireless communication. Note that the mirror image includes a mirror image after the two devices turn relative to each other.

(10) In the electronic circuit system pertaining to each embodiment, an arrangement pattern of the plurality of second antennas may include a second arrangement pattern similar to a mirror image of a first arrangement pattern of the plurality of first antennas, and when the plurality of first antennas arranged in the first arrangement pattern and the plurality of second antennas arranged in the arrangement pattern including the second arrangement pattern face each other, a distance between any two adjacent first antennas of the plurality of first antennas in at least one direction may be longer or shorter than a distance between two second antennas of the plurality of second antennas facing the two adjacent first antennas.

In the electronic circuit system described in this section, the distance between any two adjacent first antennas is slightly different from the distance between two second antennas facing the two adjacent first antennas in one direction. With this configuration, when the positional relation between the two devices is slightly different from an optimum positional relation, the receiving signal intensity differs among antennas. Therefore, it is possible to learn about a direction in which the two devices should be shifted based on the difference in receiving signal intensity. Note that a distance between any two adjacent antennas included in the two devices falls within a range enabling wireless communication using one or more pairs of antennas facing each other.

(11) In the electronic circuit system pertaining to each embodiment, at least one of the first and second electronic circuits may include a plurality of electronic circuit modules, when the first electronic circuit includes the plurality of electronic circuit modules, the electronic circuit modules each may be connected to one or more of the plurality of first antennas via the one or more first signal lines, and the first connection switching unit may switch the one or more first signal lines via which the one or more first antennas are connected to each of the electronic circuit modules, and when the second electronic circuit includes the plurality of electronic circuit modules, the electronic circuit modules each may be connected to one or more of the plurality of second antennas via the one or more second signal lines, and the second connection switching unit may switch the one or more second signal lines via which the one or more second antennas are connected to each of the electronic circuit modules.

In the electronic circuit system described in this section, the plurality of electronic circuit modules are included in at least one of the first and second electronic circuits. By the connection information generation unit generating appropriate connection information, the electronic circuit modules are appropriately connected to respective antennas.

(12) The electronic circuit device pertaining to each embodiment may be an electronic circuit device comprising a plurality of antennas and an electronic circuit connected to one or more of the plurality of antennas, and establishing close-coupled wireless communication with another electronic circuit device including another antenna and another electronic circuit connected to the other antenna in such a state that a part of the electronic circuit device in which the plurality of antennas are positioned and a part of the other electronic circuit device in which the other antenna is positioned face each other, the electronic circuit device further comprising: a connection information generation unit configured to select one of the plurality of antennas to be paired with the other antenna for use in close-coupled wireless communication, and generate connection information indicating that the selected antenna is to be connected to the electronic circuit; and a connection switching unit configured to switch the one or more antennas connected to the electronic circuit in accordance with the connection information.

The electronic circuit device described in this section produces a similar effect to the electronic circuit system described in the section (1).

(13) The wireless communication device in each embodiment may be a wireless communication device comprising a plurality of antennas one or more of which are connected to an electronic circuit, and establishing close-coupled wireless communication with another wireless communication device including another antenna connected to another electronic circuit in such a state that a part of the wireless communication device in which the plurality of antennas are positioned and a part of the other wireless communication device in which the other antenna is positioned face each other, the wireless communication device further comprising: a connection information generation unit configured to select one of the plurality of antennas to be paired with the other antenna for use in close-coupled wireless communication, and generate connection information indicating that the selected antenna is to be connected to the electronic circuit; and a connection switching unit configured to switch the one or more antennas connected to the electronic circuit in accordance with the connection information.

The wireless communication device described in this section produces a similar effect to the electronic circuit system described in the section (1).

INDUSTRIAL APPLICABILITY

The electronic circuit system, the electronic circuit device and the wireless communication device pertaining to the present invention is useful as a device having a wireless communication interface that can realize a combination of the first electronic circuit device and the second electronic circuit device for general use. They are also applicable to a sliding-type mobile phone, a wireless communication connector for connecting movable parts of equipment such as a robot and the like.

REFERENCE SIGNS LIST 11 to 18 antennas
20, 30 transmission antenna
21, 31 receiving antenna
22, 32 receiving antenna group
71 to 75 antennas
91 host computer
93 debugger
97 wireless communication interface IC
98, 99 coil
100, 110, 117, 118, 119 first electronic circuit device
101, 111, 112 second electronic circuit device
114 first wireless communication device
115 second wireless communication device
205 wireless communication IF
206 debug assistance unit
209, 213 connection information generation unit
210, 213 connection switching unit
221, 222 memory
228 host PC
231, 232 IF
233 bus 236 external device
237 external device
241 core processing unit
245 memory IF
247 memory IF
248 debug IF
251, 252 memory IF
281 wireless communication IF
309, 313 connection information generation unit
310 circuit board
320 coil
500 mobile phone
801 wireless communication device
802 wireless communication device

The invention claimed is:

1. An electronic circuit system comprising a first electronic circuit device and a second electronic circuit device, the first electronic circuit device including a first antenna and a first electronic circuit connected to the first antenna, the second electronic circuit device including a plurality of second antennas and a second electronic circuit connected to one or more of the plurality of second antennas, the first and second electronic circuit devices establishing close-coupled wireless communication with each other in such a state that a part of the first electronic circuit device in which the first antenna is positioned and a part of the second electronic circuit device in which the plurality of second antennas are positioned face each other, wherein
the second electronic circuit device further includes:
a connection information generation unit configured to, when one or more of the plurality of second antennas each receive a communication connection update processing command transmitted from the first antenna, select one of the plurality of second antennas to be paired with the first antenna for use in close-coupled wireless communication, and generate connection information indicating that the selected second antenna is to be connected to the second electronic circuit; and
a connection switching unit configured to switch the one or more second antennas connected to the second electronic circuit in accordance with the connection information,
a signal is intermittently transmitted/received by the connection information generation unit using the pair of antennas for use in close-coupled wireless communication, and
when intensity of the signal becomes equal to or lower than a threshold, the connection information generation unit selects one of the plurality of second antennas to be paired with the first antenna for use in close-coupled wireless communication, and generates the connection information.

2. An electronic circuit system comprising a first electronic circuit device and a second electronic circuit device, the first electronic circuit device including a plurality of first antennas and a first electronic circuit connected to one or more of the plurality of first antennas, the second electronic circuit device including a plurality of second antennas and a second electronic circuit connected to one or more of the plurality of second antennas, the first and second electronic circuit devices establishing wireless communication with each other in such a state that a part of the first electronic circuit device in which the plurality of first antennas are arranged and a part of the second electronic circuit device in which the plurality of second antennas are arranged face each other, wherein the first electronic circuit device further includes:
a first connection information generation unit configured to select one or more of the plurality of first antennas to be paired with respective one or more of the plurality of second antennas for use in wireless communication, and generate first connection information indicating that the selected one or more first antennas are to be connected to the first electronic circuit; and
a first connection switching unit configured to switch the one or more first antennas connected to the first electronic circuit in accordance with the first connection information, and
the second electronic circuit device further includes:
a second connection information generation unit configured to select one or more of the plurality of second antennas to be paired with respective one or more of the plurality of first antennas for use in wireless communication, and generate second connection information indicating that the selected one or more second antennas are to be connected to the second electronic circuit; and
a second connection switching unit configured to switch the one or more second antennas connected to the second electronic circuit in accordance with the second connection information,
the first connection information generation unit is connected to the plurality of first antennas via the first connection switching unit,
the second connection information generation unit is connected to the plurality of second antennas via the second connection switching unit,
the first and second connection information generation units perform test communication processing of experimentally transmitting signals either from the plurality of first antennas or from the plurality of second antennas to the other plurality of antennas and receiving, through the plurality of antennas from which the signals have been transmitted, signals transmitted from two or more of the other plurality of antennas, and respectively generate the first connection information and the second connection information based on results of the test communication processing,
one or more signals are intermittently transmitted/received between the first and second connection information generation units using one or more pairs of the plurality of first and second antennas, and
when intensity of each of the one or more signals becomes equal to or lower than a threshold, the first and second connection information generation units perform the test communication processing and respectively generate the first connection information and the second connection information.

3. The electronic circuit system of claim 2, wherein
the first connection switching unit switches the one or more first antennas connected to the first electronic circuit by switching one or more of first signal lines via which the one or more first antennas are connected to the first electronic circuit,
the second connection switching unit switches the one or more second antennas connected to the second electronic circuit by switching one or more of second signal lines via which the one or more second antennas are connected to the second electronic circuit,
the first connection information generation unit selects two or more of the plurality of first antennas to be paired with respective two or more of the plurality of second antennas, and generates first connection information indicating that the selected two or more first antennas are to be connected to the first electronic circuit via two or more of the first signal lines, the second connection information generation unit selects two or more of the plurality of second antennas to be paired with respective two or more of the plurality of first antennas, and generates second connection information indicating that the selected two or more second antennas are to be connected to the second electronic circuit via two or more of the second signal lines, in the test communication processing, the first connection information generation unit transmits pieces of identification information that differ among the plurality of first antennas from each of the plurality of first antennas, and when the transmitted pieces of identification information are received, the second connection information generation unit determines the two or more second signal lines via which the selected two or more second antennas are connected to the second electronic circuit, based on the received identification information.

4. The electronic circuit system of claim 3, wherein the number of the plurality of second antennas is greater than the number of the selected two or more second antennas.

5. The electronic circuit system of claim 4, wherein the first electronic circuit device further includes a first circuit board on which a plurality of first coils functioning as the plurality of first antennas are formed, the second electronic circuit device further includes a second circuit board on which a plurality of second coils functioning as the plurality of second antennas are formed, and the first and second circuit boards are positioned close to each other in such a state that a surface of the first circuit board on which the plurality of first coils are formed and a surface of the second circuit board on which the plurality of second coils are formed face each other.

6. The electronic circuit system of claim 5, wherein in an orthogonal projection of each pair of the plurality of first and second coils viewed in a direction along a center line of one coil of the pair, more than half of an area enclosed by the one coil of the pair overlaps with an area enclosed by the other coil of the pair.

7. The electronic circuit system of claim 6, wherein an arrangement pattern of the plurality of second antennas includes a second arrangement pattern similar to a mirror image of a first arrangement pattern of the plurality of first antennas, and when the plurality of first antennas arranged in the first arrangement pattern and the plurality of second antennas arranged in the arrangement pattern including the second arrangement pattern face each other, a distance between any two adjacent first antennas of the plurality of first antennas in at least one direction is longer or shorter than a distance between two second antennas of the plurality of second antennas facing the two adjacent first antennas.

8. The electronic circuit system of claim 5, wherein an arrangement pattern of the plurality of second antennas corresponds to an arrangement pattern composed of a plurality of duplicates of a mirror image of an arrangement pattern of the plurality of first antennas.

9. The electronic circuit system of claim 3, wherein at least one of the first and second electronic circuits includes a plurality of electronic circuit modules, when the first electronic circuit includes the plurality of electronic circuit modules, the electronic circuit modules are each connected to one or more of the plurality of first antennas via the one or more first signal lines, and the first connection switching unit switches the one or more first signal lines via which the one or more first antennas are connected to each of the electronic circuit modules, and when the second electronic circuit includes the plurality of electronic circuit modules, the electronic circuit modules are each connected to one or more of the plurality of second antennas via the one or more second signal lines, and the second connection switching unit switches the one or more second signal lines via which the one or more second antennas are connected to each of the electronic circuit modules.

10. The electronic circuit system of claim 2, wherein the first connection information generation unit selects the one or more first antennas to be paired with the respective one or more of the plurality of second antennas based on communication quality of each of the plurality of first antennas in the test communication processing, and the second connection information generation unit selects the one or more second antennas to be paired with the respective one or more of the plurality of first antennas based on communication quality of each of the plurality of second antennas in the test communication processing.

11. An electronic circuit device comprising a plurality of antennas and an electronic circuit connected to one or more of the plurality of antennas, and establishing close-coupled wireless communication with another electronic circuit device including another antenna and another electronic circuit connected to the other antenna in such a state that a part of the electronic circuit device in which the plurality of antennas are positioned and a part of the other electronic circuit device in which the other antenna is positioned face each other, the electronic circuit device further comprising:

a connection information generation unit configured to, when one or more of the plurality of antennas each receive a communication connection update processing command transmitted from the other antenna, select one of the plurality of antennas to be paired with the other antenna for use in close-coupled wireless communication, and generate connection information indicating that the selected antenna is to be connected to the electronic circuit; and a connection switching unit configured to switch the one or more antennas connected to the electronic circuit in accordance with the connection information, wherein a signal is intermittently transmitted/received by the connection information generation unit using the pair of antennas for use in close-coupled wireless communication, and when intensity of the signal becomes equal to or lower than a threshold, the connection information generation unit selects one of the plurality of antennas to be paired with the other antenna for use in close-coupled wireless communication, and generates the connection information.

12. A wireless communication device comprising a plurality of antennas one or more of which are connected to an electronic circuit, and establishing close-coupled wireless communication with another wireless communication device including another antenna connected to another electronic circuit in such a state that a part of the wireless communication device in which the plurality of antennas are positioned and a part of the other wireless communication device in which the other antenna is positioned face each other, the wireless communication device further comprising:
- a connection information generation unit configured to, when one or more of the plurality of antennas each receive a communication connection update processing command transmitted from the other antenna, select one of the plurality of antennas to be paired with the other antenna for use in close-coupled wireless communication, and generate connection information indicating that the selected antenna is to be connected to the electronic circuit; and
- a connection switching unit configured to switch the one or more antennas connected to the electronic circuit in accordance with the connection information, wherein
- a signal is intermittently transmitted/received by the connection information generation unit using the pair of antennas for use in close-coupled wireless communication, and
- when intensity of the signal becomes equal to or lower than a threshold, the connection information generation unit selects one of the plurality of antennas to be paired with the other antenna for use in close-coupled wireless communication, and generates the connection information.

13. An electronic circuit system comprising a first electronic circuit device and a second electronic circuit device, the first electronic circuit device including a plurality of first antennas and a first electronic circuit connected to one or more of the plurality of first antennas, the second electronic circuit device including a plurality of second antennas and a second electronic circuit connected to one or more of the plurality of second antennas, the first and second electronic circuit devices establishing wireless communication with each other in such a state that a part of the first electronic circuit device in which the plurality of first antennas are arranged and a part of the second electronic circuit device in which the plurality of second antennas are arranged face each other, wherein
  the first electronic circuit device further includes:
  - a first connection information generation unit configured to select one or more of the plurality of first antennas to be paired with respective one or more of the plurality of second antennas for use in wireless communication, and generate first connection information indicating that the selected one or more first antennas are to be connected to the first electronic circuit; and
  - a first connection switching unit configured to switch the one or more first antennas connected to the first electronic circuit in accordance with the first connection information, and
  the second electronic circuit device further includes:
  - a second connection information generation unit configured to select one or more of the plurality of second antennas to be paired with respective one or more of the plurality of first antennas for use in wireless communication, and generate second connection information indicating that the selected one or more second antennas are to be connected to the second electronic circuit; and
  - a second connection switching unit configured to switch the one or more second antennas connected to the second electronic circuit in accordance with the second connection information,
  the first connection information generation unit is connected to the plurality of first antennas via the first connection switching unit,
  the second connection information generation unit is connected to the plurality of second antennas via the second connection switching unit,
  the first and second connection information generation units perform test communication processing of experimentally transmitting signals either from the plurality of first antennas or from the plurality of second antennas to the other plurality of antennas and receiving, through the plurality of antennas from which the signals have been transmitted, signals transmitted from two or more of the other plurality of antennas, and respectively generate the first connection information and the second connection information based on results of the test communication processing,
  the first connection switching unit switches the one or more first antennas connected to the first electronic circuit by switching one or more of first signal lines via which the one or more first antennas are connected to the first electronic circuit,
  the second connection switching unit switches the one or more second antennas connected to the second electronic circuit by switching one or more of second signal lines via which the one or more second antennas are connected to the second electronic circuit,
  the first connection information generation unit selects two or more of the plurality of first antennas to be paired with respective two or more of the plurality of second antennas, and generates first connection information indicating that the selected two or more first antennas are to be connected to the first electronic circuit via two or more of the first signal lines,
  the second connection information generation unit selects two or more of the plurality of second antennas to be paired with respective two or more of the plurality of first antennas, and generates second connection information indicating that the selected two or more second antennas are to be connected to the second electronic circuit via two or more of the second signal lines,
  in the test communication processing, the first connection information generation unit transmits pieces of identification information that differ among the plurality of first antennas from each of the plurality of first antennas,
  when the transmitted pieces of identification information are received, the second connection information generation unit determines the two or more second signal lines via which the selected two or more second antennas are connected to the second electronic circuit, based on the received identification information,
  the number of the plurality of second antennas is greater than the number of the selected two or more second antennas,
  the first electronic circuit device further includes a first circuit board on which a plurality of first coils functioning as the plurality of first antennas are formed,
  the second electronic circuit device further includes a second circuit board on which a plurality of second coils functioning as the plurality of second antennas are formed,
  the first and second circuit boards are positioned close to each other in such a state that a surface of the first circuit board on which the plurality of first coils are formed and a surface of the second circuit board on which the plurality of second coils are formed face each other, and
  in an orthogonal projection of each pair of the plurality of first and second coils viewed in a direction along a center line of one coil of the pair, more than half of an area enclosed by the one coil of the pair overlaps with an area enclosed by the other coil of the pair.

* * * * *